United States Patent [19]

de Remer et al.

[11] Patent Number: 5,412,801
[45] Date of Patent: May 2, 1995

[54] GAP RECOVERY FOR OFF-SITE DATA STORAGE AND RECOVERY SYSTEMS

[75] Inventors: James C. de Remer, Sausalito; Thomas D. Childers, Mill Valley; James T. Flesher, San Francisco, all of Calif.

[73] Assignee: E-Net, San Francisco, Calif.

[21] Appl. No.: 466,508

[22] Filed: Jan. 17, 1990

[51] Int. Cl.⁶ ............................................. G06F 12/16
[52] U.S. Cl. .................................. 395/575; 395/600; 371/10.1; 371/29.1; 371/65; 364/DIG. 1; 364/243; 364/243.2; 364/265; 364/266.5; 364/282.1; 364/285; 364/285.1; 364/285.2
[58] Field of Search ............... 395/575, 600; 371/10.1, 371/29.1, 65, 16.5,

[56] References Cited

U.S. PATENT DOCUMENTS

| | | | |
|---|---|---|---|
| 4,053,752 | 10/1977 | DeJohn et al. | 395/575 |
| 4,084,231 | 11/1978 | Capozzi et al. | 395/425 |
| 4,507,751 | 3/1985 | Gawlick et al. | 395/575 |
| 4,646,229 | 2/1987 | Boyle | 395/600 |
| 4,686,620 | 8/1987 | Ng | 395/600 |
| 4,710,870 | 12/1987 | Blackwell et al. | 395/575 |
| 4,714,995 | 12/1987 | Materna et al. | 395/600 |
| 4,814,971 | 3/1989 | Thatte | 395/575 |
| 4,945,474 | 7/1990 | Elliott et al. | 395/575 |
| 5,010,560 | 4/1991 | Janney et al. | 377/20 |
| 5,036,518 | 7/1991 | Tseung | 371/32 |
| 5,043,866 | 8/1991 | Myre, Jr. et al. | 395/600 |
| 5,067,107 | 11/1991 | Wade | 395/500 |
| 5,089,958 | 2/1992 | Horton et al. | 395/575 |

OTHER PUBLICATIONS

Burkes, D. L., "Design Approaches for Real-Time Transaction Processing Remote Site Recovery," Research Report, IBM 1990.
E-Net Geneal Information Manual, published prior to Jul. 1987, pp. 1–5.
E-Net 1 Installation and Operations Guide, Release 1.1.
E-Net General Information brochure, pp. 1–4.
Brochures Entitled E-Net1, E-Net2, E-Net4, E-Net7, published prior to Sep. 27, 1988; E-Net Corporation.
Disaster Recovery, Business Software Review, Apr. 1989.
Televault Technology literature, published prior to Oct. 4, 1988, 3 pages.
Sungard Recovery Services, Information Bulletin, published prior to Oct. 4, 1988, 3 pages.

*Primary Examiner*—Paul V. Kulik
*Attorney, Agent, or Firm*—Christie, Parker & Hale

[57] ABSTRACT

A method for creating a control record for use in future machine recovery of gaps in a complete series of journal data formed by a computing machine from a complete series of transactional data. Copy is formed of the series of journal data for transmission to a remote site. A plurality of data group records are formed. Each data group record identifies a different boundary of each of a plurality of data groups in the series of journal data. The presence is detected of a gap in the copy of the journal data for transmission. One of the data group records is created for a boundary of each gap.

49 Claims, 23 Drawing Sheets

E-NET 1 REGION INITIALIZATION FLOW

DBMS INTERFACE INITIALIZATION FLOW

FIG. 8
T-RECORD 51

| RECORD LENGTH | RECORD TYPE | DBMS ORIGIN CODE | DATA GROUP # | SEQUENCE # | ORIGINAL DATA LENGTH BEFORE COMPRESSION | TIMESTAMP | DATA |
|---|---|---|---|---|---|---|---|
| 18714 | 20H | C001 | 46 | 1095 | 22780 | 12/28/89 12:07 | |
| 302 | 304 | 308 | 310 | 312 | 314 | 316 | 49 |

STATE 1

STATE 2

STATE 3

STATE 4

ROUTINES INVOKED WHEN FIFO QUEUE FILLS TO THE POINT WHERE AN ADDITIONAL RECORD CANNOT BE PLACED ON THE FIFO QUEUE

OUTPUT LOGIC

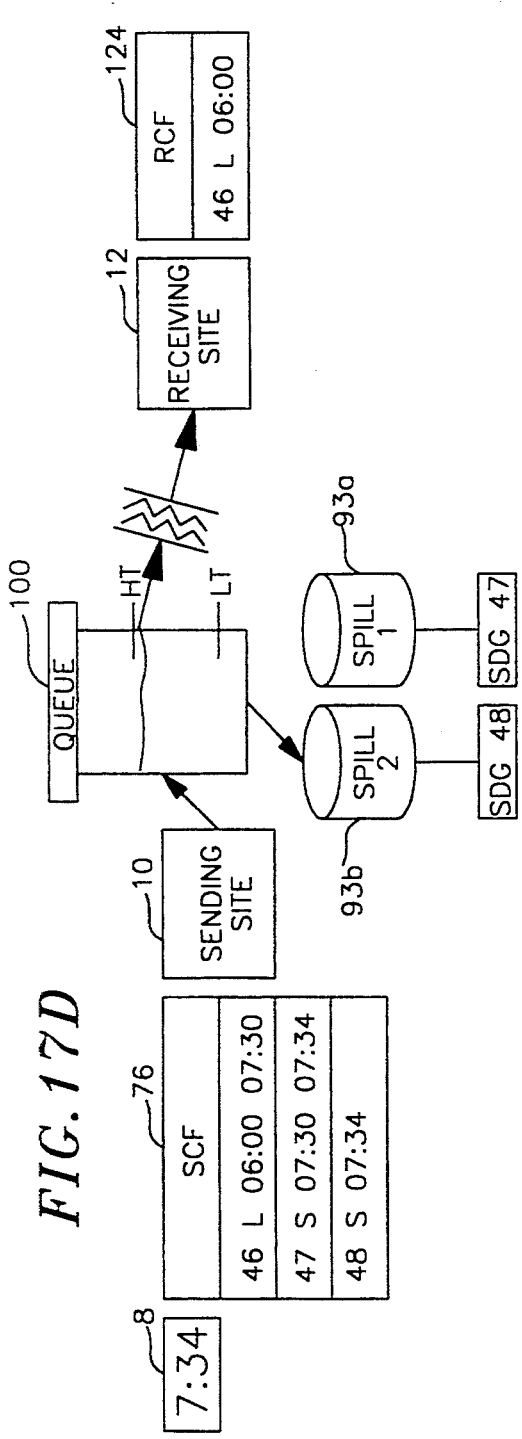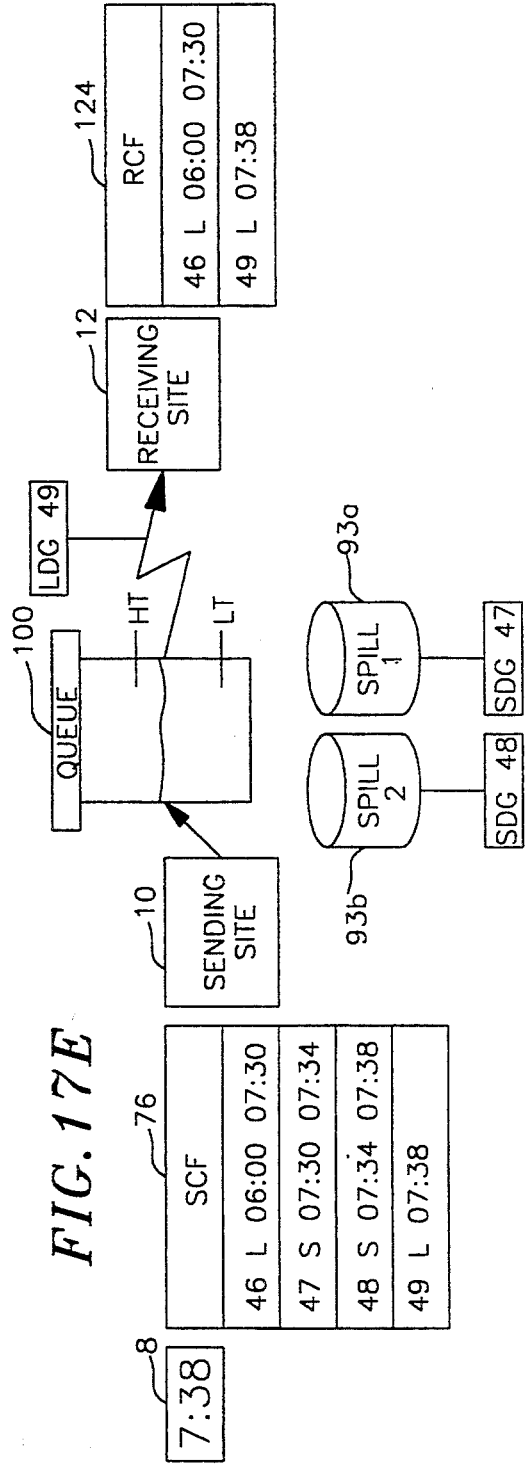

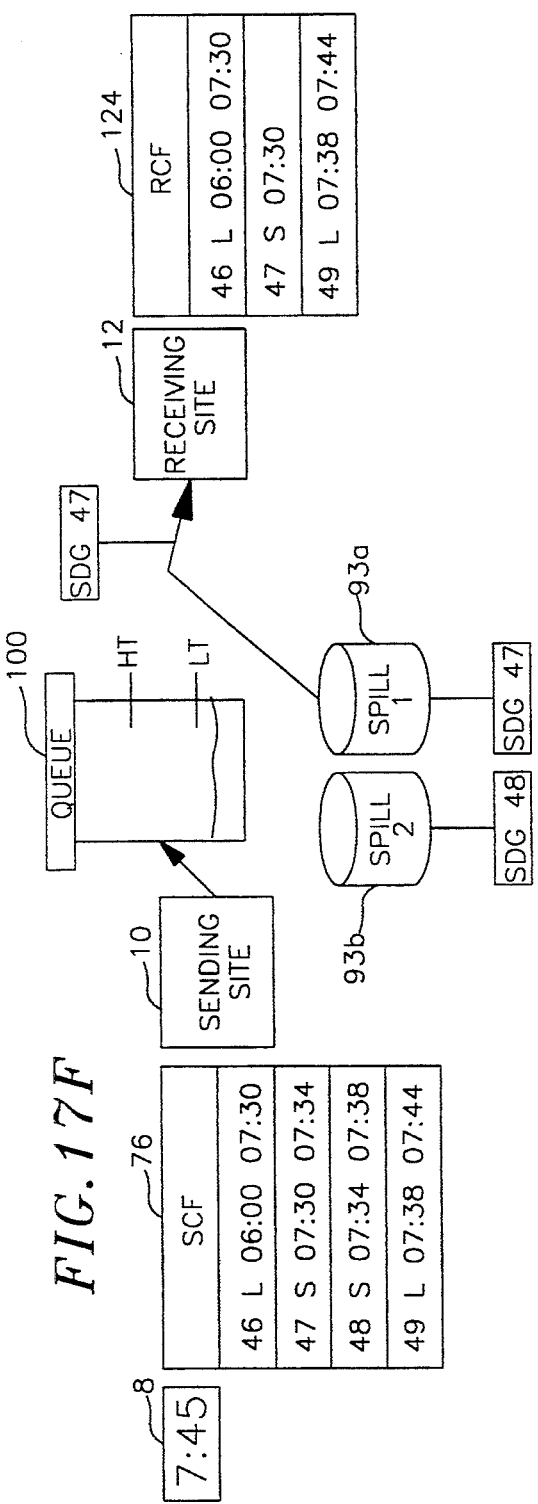
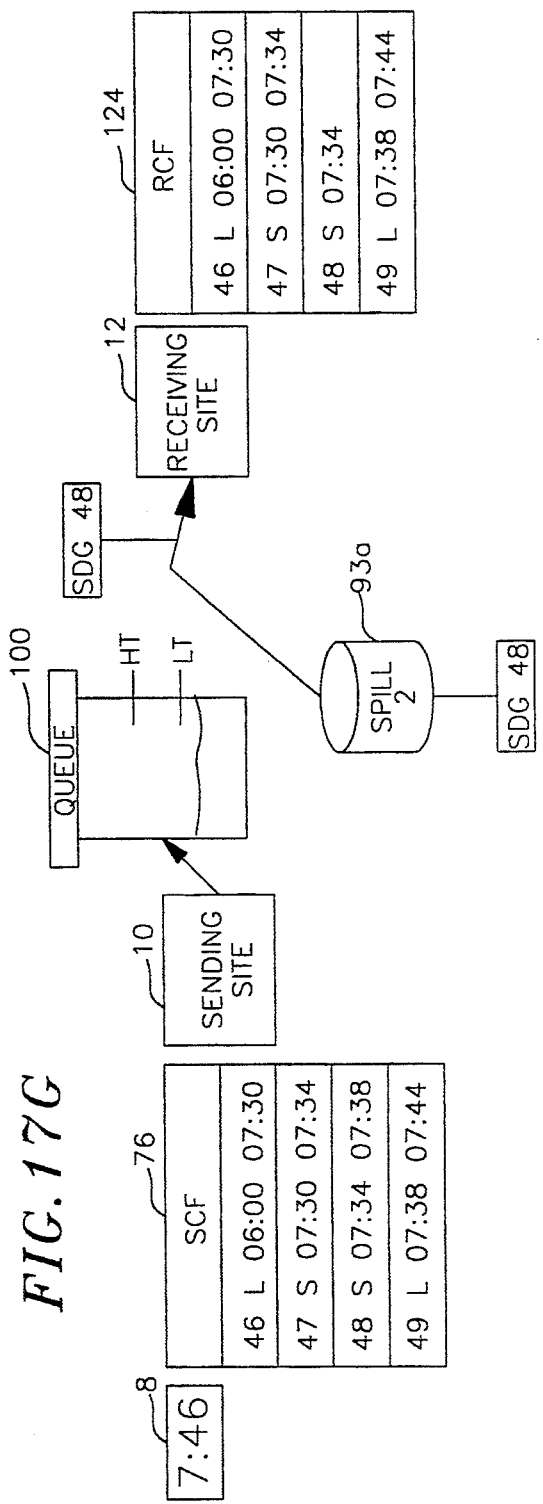
FIG. 17F
FIG. 17G

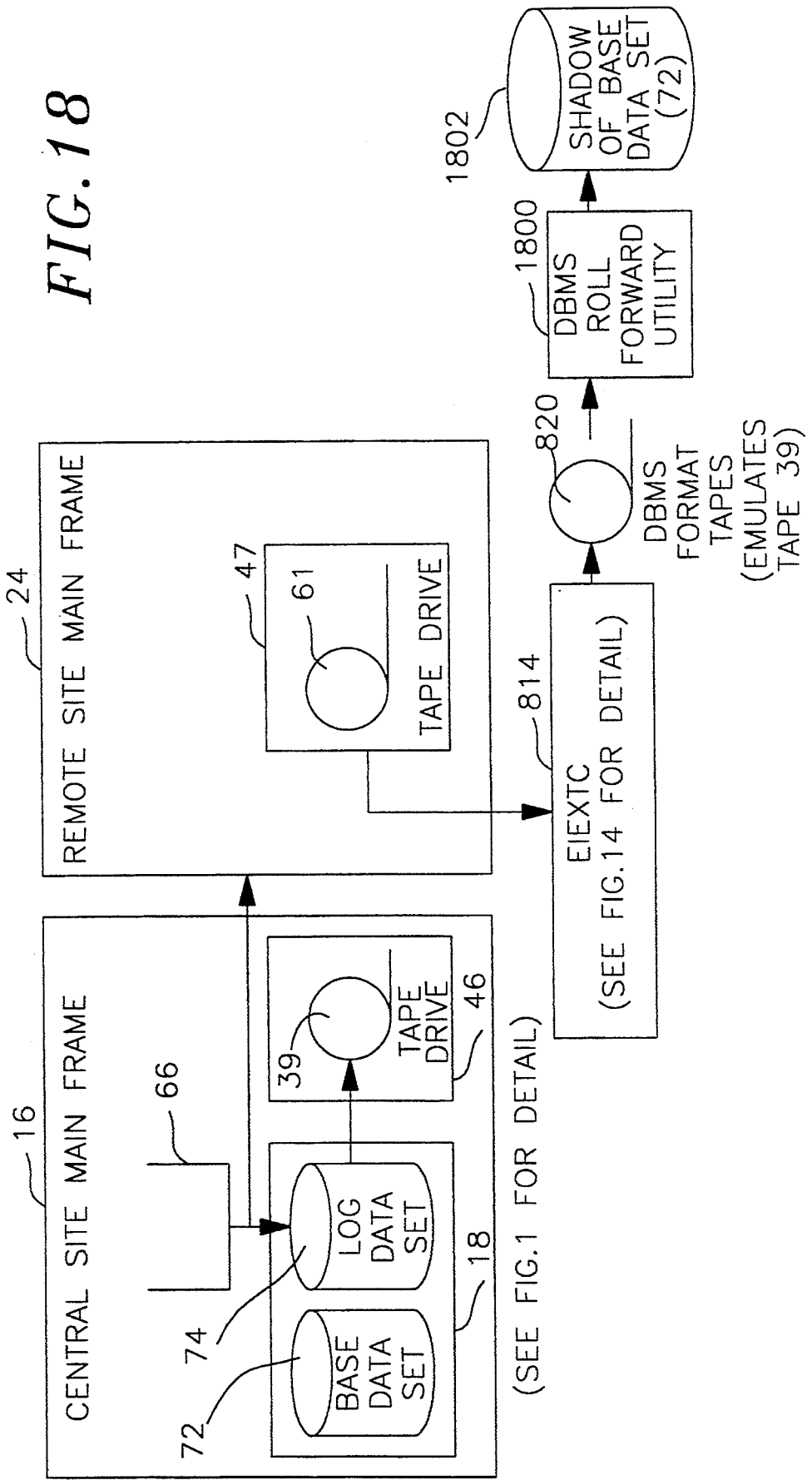

GAP RECOVERY FOR OFF-SITE DATA STORAGE AND RECOVERY SYSTEMS

FIELD OF THE INVENTION

The current invention is in the field of remote reliable database change log duplication.

BACKGROUND OF THE INVENTION

Since the automation of business operations, data managers have worried about how to recover from a loss of data, be it from computer malfunction, natural disaster, or human error. Typically, businesses make image copies of the current state of their data on tape and send the tapes to an off-site location for storage in the event of a disaster at the on-site location. In the event of a total disaster, the business can easily restart their operations with the data in the state it was when the last off-site backup was made. This approach suffers from several drawbacks. Transactions occurring after the backup copies are made are lost and have to be recovered by some method other than via the off-site backups. For some businesses, this reentry would just add to the nightmare of the disaster. For example, a bank's automatic teller users or an airline's agents would have to reenter days or weeks worth of on-line activity. Full image backups of this type should be made as frequently as possible to minimize the number of transactions that would have to be reentered. At a typical computer site, backup could be done as often as once a day if there is a period during the day in which little or no activity is taking place. Minimal activity periods are needed for this scheme, since, in many installations, no transactions can be entered while the data is being backed up. Having to stop computer operations presents a problem to sites that are working 24 hours per day. Often, the value of computer equipment is measured by the number of hours per day that it can be actively operating, so increasing downtime and resource usage for backups decreases the value of the equipment. One solution to this problem is that the computer system make instantaneous backups. As each transaction is created and written to disk, it is also written to tape. While this does keep information more up to date and doesn't require any downtime, the disadvantage of this approach is that the perceived response time of the computer is increased to unacceptable levels since the processor must now do twice as much writing to computer peripherals. This instantaneous information, commonly called log or journal data, can be used in combination with the backups and a utility generally provided by the DBMS vendor which would reconstruct the current data from the backups and the log information which shows each successive change to the database. For this to be done reliably requires that every single record of a change to the database be known since changes later in time are directly dependent on changes that were done earlier in time. If earlier changes are not recorded, later changes will have a tendency to corrupt the data. Generally in a recovery process, a data administrator would not use any record of changes that occurred after the point where information about the changes had been lost. This is a case where having no data is actually preferable to having some incomplete data. There is currently no easy way, aside from making complete image backups of the databases, to insure that the journal of database changes which has been moved off-site is actually a complete set of all changes made to the database. Without this assurance, a prudent data administrator would abandon the entire change log back to the last complete image backup. The present invention solves each of these shortcomings of the prior art.

One embodiment of the present invention is known as E-NET1 Release 2.0. An earlier version, Release 1.1 of E-NET1 which is prior art to the present invention, solved some of the problems associated with data recovery, but failed to solve most of the problems that other prior art also failed to solve. E-NET1 Release 1.1 could not handle abnormal terminations of the operating system at the sending site, nor the abnormal termination of E-NET1 Release 1.1. Any gaps in the data that were created in such situations remained as gaps in the data. No capability existed within Release 1.1 to recover a loss of data, and users were required to restore the lost data manually. While E-NET1 Release 1.1 could move log data from a central site to a remote site via electronic communication lines, it required the communication lines to be operating and throughput to be high enough so that the sending queue at the central site did not overflow, since queue overflow in Release 1.1 resulted in lost data. E-NET1 Release 2.0 is referred to hereafter for brevity as E-NET1.

SUMMARY OF THE INVENTION

An embodiment of the invention is a method for creating a control record for use in future machine recovery of gaps in a complete series of journal data formed by a computing machine from a complete series of transactional data. The method includes forming a copy of the series of journal data for transmission to a remote site, forming a plurality of data group records, each data group record identifying a different boundary of each of a plurality of data groups in the series of journal data, detecting the presence of a gap in the copy of the journal data for transmission, and creating one of said data group records for a boundary of each gap.

An embodiment of the invention is also a method of logging a complete series of journal data, which are created and stored in a computing machine at a central site, to a remote site. The method is characterized in that there may be a gap in the data created at the central site that is being received at the remote site. The method involves copying the journal data as it is being stored at the central site, testing for a gap in the copied data, creating a data group identifier for a group of data in the copied data which in the series is outside of the gap, creating a data group identifier for the gap, and transmitting to the remote site for logging a copy of any of the data including the data in the gap and the data group identifiers including the gap data group record.

An embodiment of the invention is also a method for logging at a remote site for future recovery in the event of a failure at the central site, a copy of a complete series of journal data. The journal data is computed at the central site from a complete series of transactional data. The method is characterized in that there may be a gap in the copy of the journal data received at the remote site. The method involves forming a unique series of incrementally valued data group identifiers each of which identifies a different boundary in the complete series of journal data, forming at least one said data group identifier for such data gap, and transmitting the data group identifiers, including such gap data group identifier to the remote site along with the corresponding data group.

An embodiment of the invention is also a method of using a computing machine for recreating data from journal data stored on readable tape at a remote site without the use of the database which was the source of the journal data. The method involves reformatting the journal data from such tape into a form usable by a roll-forward recovery utility program, detecting duplications in such journal data, removing such duplications, recording the data without the duplications, and processing the data without the duplication with a roll-forward recovery utility program to recreate a copy of the original data.

BRIEF DESCRIPTION OF THE DRAWINGS

FIG. 8 is a diagram showing the structure of a T-record and an example the contents of a T-record;

FIGS. 17A, 17B, 17C, 17D, 17E, 17F, 17G, and 17H are block diagrams showing usage of spill files; and FIG. 18 is a block diagram of database shadowing.

DETAILED DESCRIPTION OF THE PREFERRED EMBODIMENTS

INDEX

I. DBMS AND MAINFRAME OPERATION, GENERALLY
II. GENERAL DESCRIPTION OF OFF-SITE DATA STORAGE
III. DETAILED DESCRIPTION
  A. NORMAL OPERATION OF SENDING AND RECEIVING DATA
  B. SPILL FILE OPERATIONS
  C. GAP CREATION
  D. GAP RECOVERY
  E. DBMS RECOVERY
  F. EXAMPLE OF SPILL FILE USAGE
  G. E-NET1 SHUTDOWN
  H. DATABASE SHADOWING OPERATION
IV. SUMMARY
V. TABLES
1.
  A. UP-TO-DATE BASE DATASET
  B. BACKUP BASE DATASET
  C. CHANGE LOG DATASET
2.
  A. SUCCESSFUL RECREATION OF BASE DATA
  B. ATTEMPTED RECREATION OF BASE DATA
3. DCF DATA STRUCTURE
  A. ARCHIVED DATA RECORD STRUCTURE
  B. DCF CONTROL RECORD STRUCTURE
4.
  A. ECVT STRUCTURE
  B. SCOM STRUCTURE
5. SCF DATA STRUCTURE
  A. SCF CONTROL RECORD STRUCTURE
  B. DBMS CONTROL RECORDS STRUCTURE
  C. DATA GROUP RECORDS STRUCTURE
6. SCF CONTENTS EXAMPLE
7. DBMS PARAMETER FILE STRUCTURE
8. E-NET1 PARAMETERS FILE EXAMPLE
9. RCF DATA STRUCTURE
10. RCF CONTENTS EXAMPLE
11. USER PARAMETERS FILE EXAMPLE
12. DCF/SCF/RCF CONTROL RECORD STRUCTURE DETAIL
13. GAP RECOVERY CONTROL FILE EXAMPLE

I. DBMS AND MAINFRAME OPERATION, GENERALLY

Figure 1:
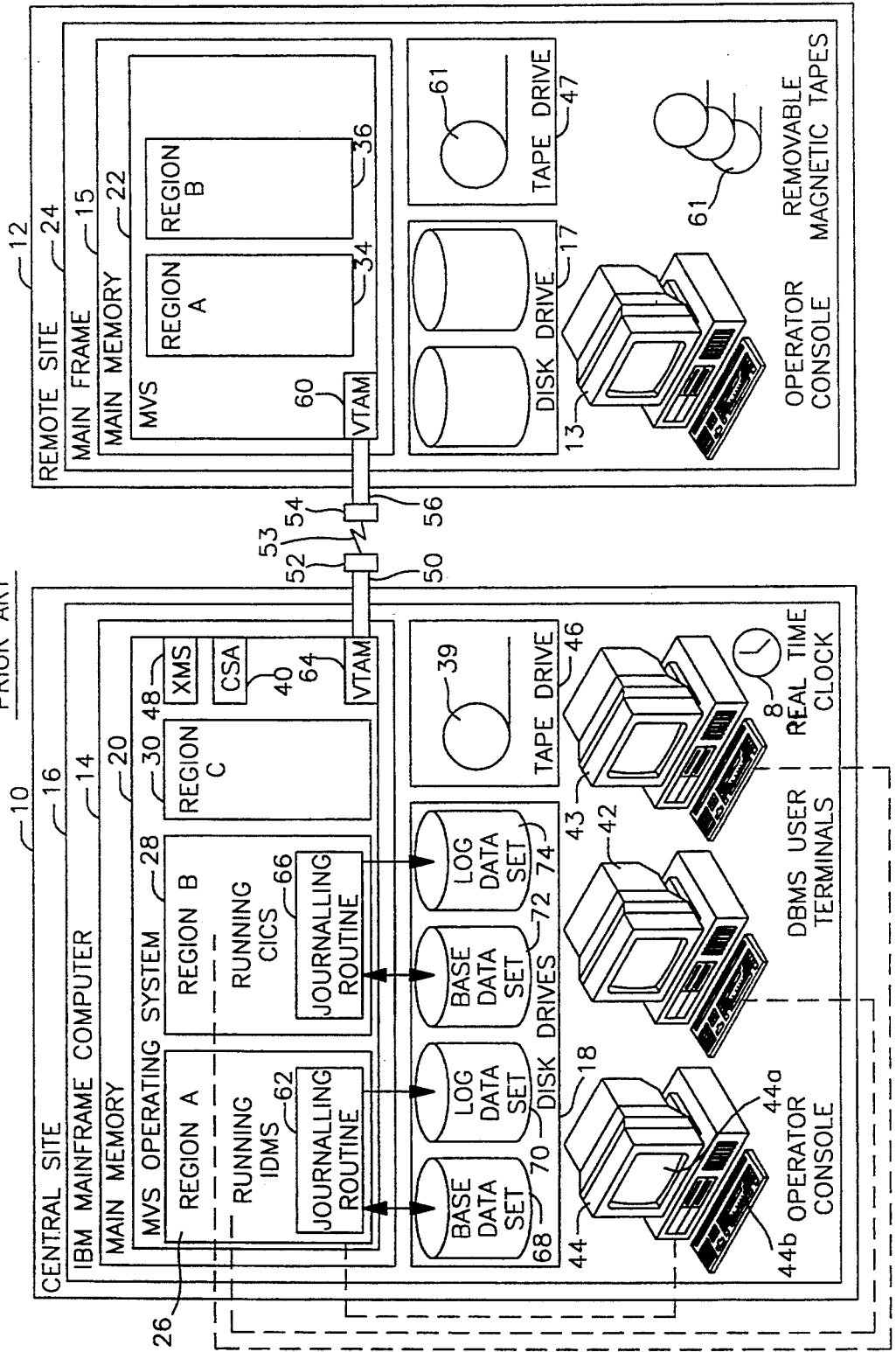
FIG. 1 is a block diagram of a central mainframe site and a remote mainframe site.

FIG. 1 depicts a typical computer site. All of the programs and data discussed subsequently reside in one of two physical locations, the central site 10 and the remote site 12. The central site 10 is where the computer activity of interest is occurring, and the remote site 12 is used to assist in the recovery of the central site in the event of a disaster at the central site. FIG. 1 is a bank computer operation and is disclosed by way of example, but the scope of the invention is in no means so limited. The central site could be a bank data center, a bank branch, or a check processing center. In a bank branch, the computer, by way of example, keeps track of customer's accounts, so as to allow a teller to quickly find a customer's balance, updates customer information when a deposit is made, and updates a customer's name or address. The central site 10 houses a mainframe computer ("mainframe") 16 by way of example, the Model 3090 by International Business Machines Corporation (IBM). The mainframe 16 has such typical components as main memory 14, for the storage of programs and data while the computer is operating; a tape drive 46 for writing to and reading from removable reels of magnetic storage tapes 39; magnetic storage disks and disk drives (disk memory) 18, for storage of data and programs for retrieval by the mainframe 16 and for storage into main memory 14, such disk memory also being used for storage of data and programs while the computer is not operating; user terminals 42, 43 for accepting data and commands relating to the manipulation of data contained in the mainframe 16; an operator console 44, for receiving messages on screen 44a and issuing commands on keyboard 44b relating to the operation of the mainframe 16; and communications interface 50 to a modem 52, for the purpose of electronically sending data from the mainframe 16 to remote locations over communication line 53, which can be a normal telephone line, a dedicated phone line, or other means of transmitting data. Although it will be understood that the central site typically includes multiple user terminals, operator consoles, disk memories, tape drives, communication links, modems, and even multiple mainframes tied together as one large, virtual mainframe, many such duplications have not been shown for simplicity.

The mainframe 16, when first initialized by applying power or using reset procedures loads a program from a predetermined location in disk memory 18 into main memory 14 that controls the hardware of the mainframe and the software being used on the mainframe. This program is known as the "operating system". The operating system program Multiple Virtual Storage (MVS) 20, is loaded into main memory 14 and controls the tape drive 46 and disk memory 18 as well as the operator console 44 and user terminals 42, 43. MVS 20 also controls the placement of programs and data into main memory 14, as well as allocating unused main memory for use by the various executing programs loaded into main memory. MVS logically divides main memory 14 into multiple regions, sometimes called "address spaces" to allow multiple operations or programs to execute simultaneously. FIG. 1 depicts three regions: A region 26, B region 28, and C region 30, but the number of regions is not limited to three. MVS keeps track of what is happening in each of the regions, creating new regions from unused memory and removing regions and programs after the programs have finished their operation.

By way of example, the program, Integrated Database Management Software (IDMS), a product of Computer Associates International, Inc. (formerly a product of Cullinet Software, Inc.), is loaded and running in A Region and the program, Customer Information Control System (CICS), a product of IBM, is loaded and running in B Region. No programs are running in C Region. The programs of each region do not generally interact with each other, but do interact with their own MVS-allocated terminals and disks. However, MVS provides inter-region interaction by the use of an extra-regional memory area known as the Common System Area (CSA) 40, and subprograms of MVS collectively known as Cross Memory Services (XMS) 48. MVS also includes subprograms collectively known as Virtual Telecommunications Access Method (VTAM) 64 for controlling communications through the modem 52.

The programs IDMS and CICS are commonly called Database Management Systems (DBMSs). The purpose of a DBMS is to accept input data from users, store data in an orderly fashion, and retrieve it for later users. Although a detailed discussion will not be given of each DBMS, a discussion of the detailed operation of one DBMS, CICS, will provide one skilled in the art an understanding of how to make and use the invention. Further information will be found for MVS in *MVS/Extended Architecture Overview*, published by IBM (First Ed., 3/1984, Order #GC28-1348-0 File S370-34), for *IDMS in IDMS/R Concepts and Facilities*, published by Associates Computer International, Inc. (formerly published by Cullinet Software, Inc.) (Rev. 0.0, 9/1986, Order #TDDB-010010000), for CICS in *CICS General Information*, published by IBM (4th. Ed., 2/1987, Order #GC33-0155-3), for IMS in *IMS/VS Version 2 General Information Manual*, published by IBM (2nd. Ed., 6/1987, Order #GC26-4180-1), and for CPCS in *Check Processing Control System Program Reference and Operations Manual*, published by IBM (9th. Ed., 6/1988, Order #SH20-1228-8), and for further information about VTAM communications, *VTAM Programming*, published by IBM (3rd. Ed., 9/1985, Order #SC27-0611-2 File S370/4300/30XX-50), the disclosure each of which is incorporated by reference herein.

Mainframe 16 running MVS operating system 20, uses terminal 42 for interaction with the IDMS program running in A Region, and user terminal 43 for interaction with the CICS program running in B Region. Further, MVS has allocated several files, called datasets, two of which are shown at 72 and 74 in disk memory 18, for use by CICS. Base dataset 72 contains information vital to the bank, namely data concerning its customer accounts. Table 1A shows typical data contained in the base dataset 72.

If the information contained in base dataset 72 were lost or inaccessible, the disruption to the bank's business would be disastrous. Possible causes of such data loss are varied. The data might be lost due to hardware or software failure, or due to a natural disaster. The data could be temporarily lost as a result of a central site power failure, or an operating system stoppage. If the power is lost, or the operating system stops abnormally, the data stored in main memory 14 is lost, but the data stored in disk memory 18 can usually be accessed normally once power to the mainframe and the operating system is restored. The operating system should not normally stop absent an operator command to shutdown. The condition of abnormal operating system failure is designated ABEND (ABnormal ENDing).

To avoid total loss of data in the case of permanent failure of the disk memory 18, or erasure of the dataset 72, the mainframe operator makes backup copies of the data stored in disk memory 18. Typically this is done during a period when no DBMS programs are running, and on a regular daily, weekly, or other basis. As shown in the example backup data of Table 1B, the bank backs up its data at the beginning of every month. A backup is typically done by an operator issuing a command at console 44 which starts image backup program 106 copying the data from disk memory 18 to tapes 39. The tapes 39 are then sent off-site for secure storage. Typically, this step makes an entire copy of all data. A backup of an entire database is called an image backup since an image of all the data is taken. The opposite of an image backup is an incremental backup where data is not backed up at once, but is backed up in increments.

Image backup procedures have drawbacks. If the data is saved at the beginning of the month, and a disaster occurs in the middle of the month, the data restored from tape would be a half month out of date. For a bank, this would be unacceptable. Customer balances would not reflect deposits and withdrawals that occurred during that half month. A backup could be made more often, but even a daily backup would be out of date if the disaster occurred in the middle of the day. Another drawback to image backups is that, since an exact copy of the entire database must be made, in most installations no part of the database can be changed during the backup process. Because no changes can be made while the image backup copy is being taken, the mainframe's operations must be suspended while the backup is in progress. Since computer downtime is costly, backups must be kept to a minimum. Further costs accrue if the computer center is operated 24 hours a day, since work must stop during the backup.

Banks and other businesses that process transactional data store change logs. A change log is a dataset showing all the changes to a base dataset that have occurred since the last backup. The DBMS software packages, CICS, IDMS, and IMS, include programs which automatically produce change log datasets. Table 1C lists an example of change log dataset 74, and details all the changes made to the base dataset 72, Table 1A. Since a record of a change could take up much less disk space than the data which could have been altered by the change, the log dataset 74, sometimes called journal data, is continuously backed up to tape for safekeeping.

When a disaster strikes, the operator loads the backup data from the last image backup and, in some installations, the change log from tapes 39 onto the disk memory 18, and issues a command via the operator console 44 to initiate a roll-forward recovery program (not shown in FIG. 1) provided by the supplier of the DBMS software. Roll-forward recovery programs are well known in the art and read a record of a change from the log dataset 72, Table 1C, and use the record to determine how the base dataset 72, Table 1B, was changed. Knowing how the base dataset 72 changed, the recovery program can change the restored backup data to reflect the change. After all the change records are applied to the backup data in chronological order, the backup data will have changed to accurately reflect the most current base data.

Table 2A illustrates an example of the operation of the roll-forward recovery process. Table 1B depicts the base dataset 72 as it was restored, current as of Jul. 7, 1989, but out of date as of Jul. 20, 1989, the time of an assumed disaster. Table 1B indicates that the customer account 01-6056 had a credit limit of $1,000 as of Jul. 1, 1989. In the time between Jul. 1, 1989 and Jul. 20, 1989, several changes were made to the value of the credit limit, as shown by Table 1C.

Changes to base dataset 72, Table 1A, are made by a CICS user issuing commands to the DBMS main program 83 in region B (shown in FIG. 2) via user terminal 43. DBMS main program 83 acts upon a command by changing the value stored in the base dataset 72 and adding a record of the change to log dataset 74, Table 1C. The modification of base dataset 72 and the writing to log dataset 74 is done by a subroutine of CICS, journalling routine 66. The journalling routine 66 ensures that every change to base dataset 72 is logged to the log dataset 74. The credit limit for the account 01-6056, changed four times between Jul. 1, 1989 and Jul. 20, 1989, as shown in Table 1C, lines 1, 6, 9, and 16. After the assumed Jul. 20, 1989 disaster, the correct value of the credit limit can be restored by taking the backup value $1,000, in Table 1B, and applying the changes of lines 1, 6, 9, and 16, in order, to arrive at the final value of $6,000. The same can be done for the balance and the interest rate. All other accounts and base data can similarly be restored using this method.

Most DBMSs typically have the built-in ability to create log datasets in tandem with base datasets, and include roll-forward processing capability, as well as the ability to periodically archive data from log datasets to tapes 39 using what is called a batch job. However, the change log dataset is often lost in the same disaster that destroys the base dataset. Ideally, the change log data should be moved off-site as soon as it is created. One problem with continually sending change log data off-site is the possibility of losing at least one record of the log. While losing one record out of possibly millions of records may not seem like a problem, the effect of one missing record in a complex system could be compounded to the point where it would be better to have none of the records than to have all but one of the records.

The ill effects of a missing log record are illustrated by Tables 2A and 2B. Table 2A depicts the correct restoration of the balance of account 01-6056 using the backup base dataset of Table 1A and the log dataset of Table 1C. The changing balance is shown in the "Balance" column of Table 2A as the prior balance is adjusted by the change amount in each log record of Table 1C. The final correct balance is $645.00.

The fact that the change log records are applied in order is critical in DBMSs where data "ripples," i e. . where one change in a datum causes a change in another datum, which in turn causes another datum to change, and so on to a point where the full effect of a given change of a datum cannot be readily ascertained. In the example, rippling of data occurs because a change in the account balance of account 01-6056 causes a change in other data relating to the amount of interest paid to the account, which causes a change in the data relating to the total amount of interest the bank has paid to accounts and the total amount of deposits which the bank has, which affects still further data relating to the entire balance sheet of the bank. Thus, the effect of each change to the data base cannot be known unless the change is applied to a database that is in the same state as the original database was at the time the change was originally applied.

Table 2B depicts the same process as Table 2A, but with a missing change log record number 17 of Jul. 14, 1989, at 10:01, increasing the balance by $210. Recreating the balance from the prior value and the change log records works fine up until the missing record number 17. From that point on, the balance is incorrect. Finding the missing value and adding another change record at the end of the change log is unacceptable since the effect on rippling is different depending on the order of the change records. Further, the order in which the changes occurred must be known. The backup data can only be brought up to date to the point just before the first missing record number 17, so the value of the backup data is related to the availability of the log of all the changes made to the data.

The present invention involves a method and means for getting the log data to a remote site for safekeeping as soon as possible after a change to the base data is made. The log data is moved quickly, since the length of time it would take for the data to be moved is the length of time for which the base data would be out of date. For example, if a log record representing a change to a base dataset is sent for safekeeping one second from the time the change was made, the reconstructed base data after a disaster would also be at least one second out of date. However, the base data can only be reliably updated to the point of the first gap in the log data however small the gap. If a disaster occurs a month after the first gap, a recovered base dataset would be a month out of date. For this reason, any change logging method must ensure that no gaps occur in the log data sent off-site for remote safekeeping, and if gaps do occur, that the gap data is recovered and sent to the remote site so that the data remains complete up to the moment before a disaster strikes the central site.

Referring again to FIG. 1, the remote site 12 is geographically remote from the central site so that data logged there is not destroyed in the event of a natural disaster or power outage in the area of the central site 10. The remote site 12, houses a mainframe 24 similar to the mainframe 16 which in turn contains much the same hardware and software that is described above for the central site, except as described below. In some situations, the remote site could be used as a replacement for the entire operation of the central site.

Mainframe 24 has main memory 15, disk drive (disk memory) 17, tape drive 47, reels of magnetic storage tapes (tapes) 61, MVS operating system 22, communications interface 56, modem 54, and operator console 13. MVS 22 is the same as MVS 20 and controls the allocation and execution of programs in the multiple regions A 34 and B 36 of main memory 15.

II. GENERAL DESCRIPTION OF OFF-SITE DATA STORAGE

Figure 2:
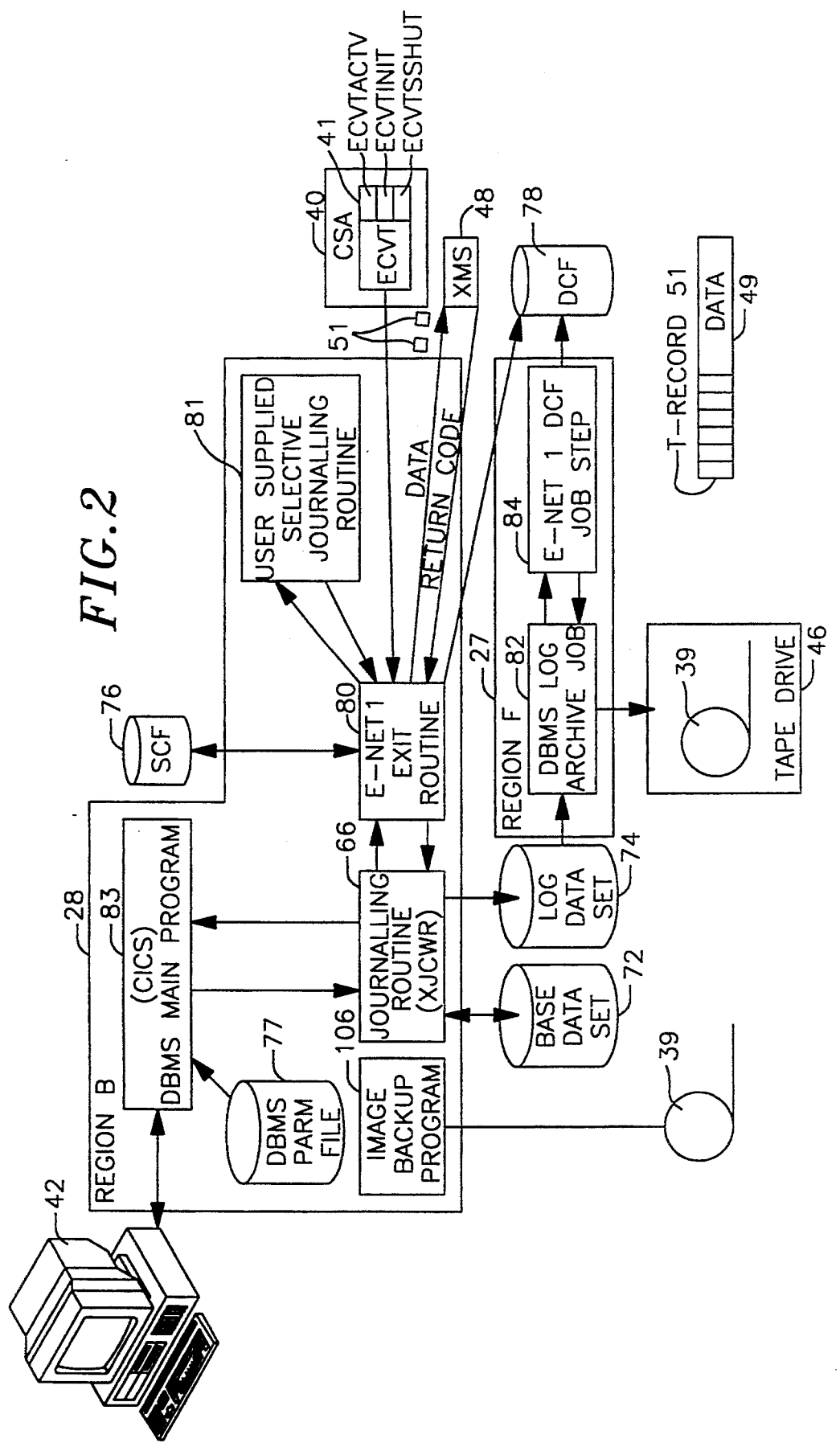
FIG. 2 is a block diagram of a DBMS region of mainframe main memory.
Figure 3:
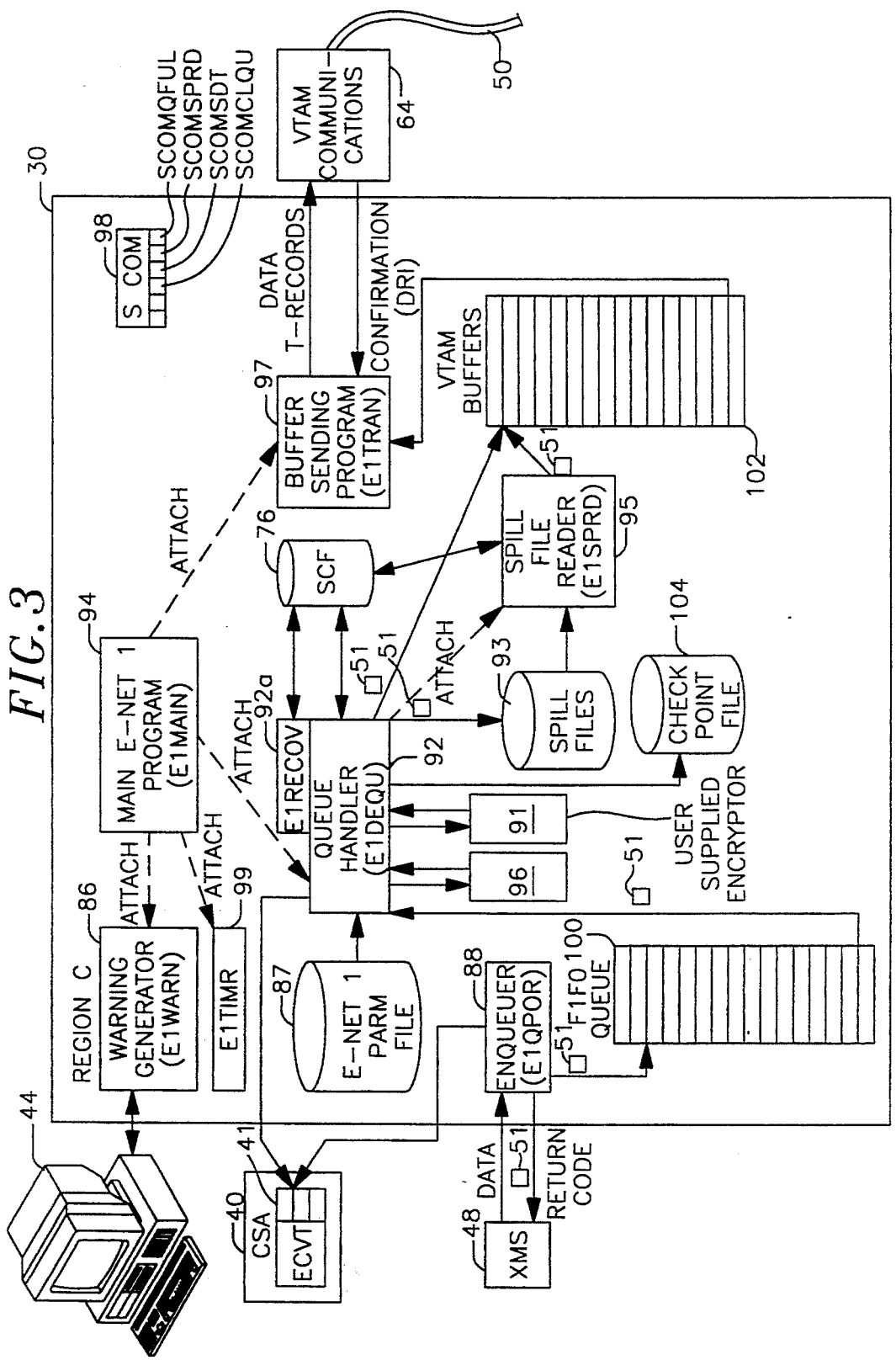
FIG. 3 is a block diagram of an E-NET1 region of mainframe main memory.

FIGS. 2 and 3 depict the mainframe 16 of FIG. 1 in greater detail with the addition of E-NET1, and embody the present invention. With the addition of E-NET1, the computer program E-NET1 causes copies of log records to be sent from the central site 10 to the remote site 12 as the log records are created by journalling routine 66, and recovers log records to fill in missing data gaps in the transmitted data. Gaps occur when the sending site ABENDs, when E-NET1 terminates operation abnormally, when the DBMS that is generating the data is initiated before initiating E-NET1, if the remote site ABENDs, if communication between central and remote sites fails, or if the memory for E-NET1 overflows.

E-NET1 manipulates and transfers log data in data structures known as transmission records (T-records) 51. Each time journalling routine 66 writes log data to log dataset 74, the exit routine extracts selected data from the log data, as described below, and if any records are extracted, a T-record is created by exit routine 80, and the selected data is duplicated in the data field 49 (see FIG. 8). The data written each time by journalling routine 66 varies in number of bytes each time, but generally does not exceed 30,000 bytes. After creating a T-record in memory and copying log data into the data field 49, exit routine 80 fills in the record length field 302 with the total number of bytes of the T-record, fills in the record type field 304 with the value 20 hex, indicating that the T-record contains data, fills in the DBMS origin code field 308 with the DBMS origin code which was specified when CICS was initiated, and fills in the Original Data Length Before Compression field 314 with the number of bytes contained in the data field. The Data Group Number (#) field 310 and Sequence Number (#) field 312 are not filled in by exit routine 80.

E-NET1 runs in its own region, C Region (see FIG. 3), with a small routine located in B Region. Therefore the response time of the DBMS appears to the user to be the same as if E-NET1 were not running. Because the copying of T-records 51 is done directly from one main memory location to another, E-NET1 does not affect the access times for the disk memory 18.

While the embodiment depicted in FIGS. 2 and 3 has only one DBMS, namely CICS, and one B region 28, running E-NET1, several DBMSs and multiple regions could be running multiple copies of E-NET1 simultaneously. Also, E-NET1 may run on several types of mainframes such as the IBM Models 4341, 4381, 3081, 3083, 3084, 3090, and compatible machines that can run the IBM Multiple Virtual Storage/Extended Architecture operating system (MVS/XA), Version 2, Release 1 or greater, or the IBM Multiple Virtual Storage/Enterprise Systems Architecture operating system (MVS/ESA), Version 3, Release 1 or greater. E-NET1 can operate with several DBMSs, such as IDMS, IMS, CICS, CPCS, but the invention is not limited to specific DBMSs or specific sizes or types of computers. For example, the computer could be a mini-computer if the mini-computer had sufficient power. Although only one DBMS will be described, essentially the same description would apply to any other DBMS, except where noted.

Generally, an embodiment of the invention works by capturing copies of log data as they are written to disk memory by the DBMS, organizing the data into T-records, queuing the T-records, recovering lost T-records (gaps), and sending the T-records over communications lines to the remote site, where the data is eventually stored in suitable archive media. An embodiment of the invention also has the ability to restore the data in the archive media at the remote site into a form suitable for use by roll-forward recovery programs.

III. DETAILED DESCRIPTION

A. NORMAL OPERATION OF SENDING AND RECEIVING DATA

Normal operation, which is comparatively simple, will be discussed first, and the more complex operations in adverse conditions will be discussed subsequently.

Refer now to FIGS. 2 and 3. As the T-records are moved from B region to C region and then to remote site 12, the progress of this movement is tracked by various parts of E-NET1, and the status of the data movement is stored in the Sending Control File (SCF) 76. The structure of SCF 76 will be discussed in more detail below. Database Control File (DCF) 78 is filled with data relating to the data stored on tapes 39. The DCF 78, the structure of which is illustrated in Table 3, is filled with data by the E-NET1 DCF jobstep 84 and by the E-NET1 exit routine 80.

Jobstep is a term known in the art for describing a set of statements in a Job Control Language file (JCL). JCL is a method of initiating programs for execution and a method of locating the data which the executing program will need to execute properly. This method is well known in the art. A JCL file, which is stored in disk memory 18, sets up a program for execution along with creating pointers to data for use by the program and performs housekeeping and initialization tasks, consists of jobsteps, each of which indicates an action to be taken. Upon operator or program request, mainframe 16 will read the requested JCL file and preform in order the actions specified by each jobstep. The result of a request can be altered by altering the JCL file for that request. For example, DBMS main program 83 regularly moves data from log dataset 74 to tape drive 46 by means of a JCL file known as the DBMS Log Archive Job 82. This JCL file, or examples and recommended usage, is supplied as part of the CICS program by its manufacturer. A jobstep, the E-NET1 DCF jobstep 84, has been added to the file so that whenever data is archived to tape drive 46 using the JCL file, an extra step is done, namely to process the E-NET1 DCF jobstep, which fills a record in DCF 78 with data relating to location and contents of the data being written to tape drive 46 by DBMS Log Archive Job 82.

DCF 78 is read by E-NET1 gap recovery programs, and is used to find the location on tapes 39 of specific log data records, for recovery of data from the gaps being recovered. DCF 78 also indicates which log data records exist, but which have yet to be written to tapes 39.

Checkpoint file 104 contains data written by the E-NET1 queue handler subprogram (E1DEQU) 92, shown in FIG. 3. The data in the checkpoint file (discussed in detail below) relates to the progress and success of the data sending operation performed by E-NET1. The checkpoint file 104 is read during a recovery of central site 10 to determine the last T-record 51 successfully sent by E-NET1 at the point in time when disaster struck. If multiple regions are running E-NET1, as discussed previously, each region would have its own unique, separate SCF, DCF, and checkpoint files.

The SCF, DCF, and checkpoint files are stored in disk memory 18. By way of example, each of these files is physically implemented in two identical files residing on two different physical disk drives.

Figure 5:
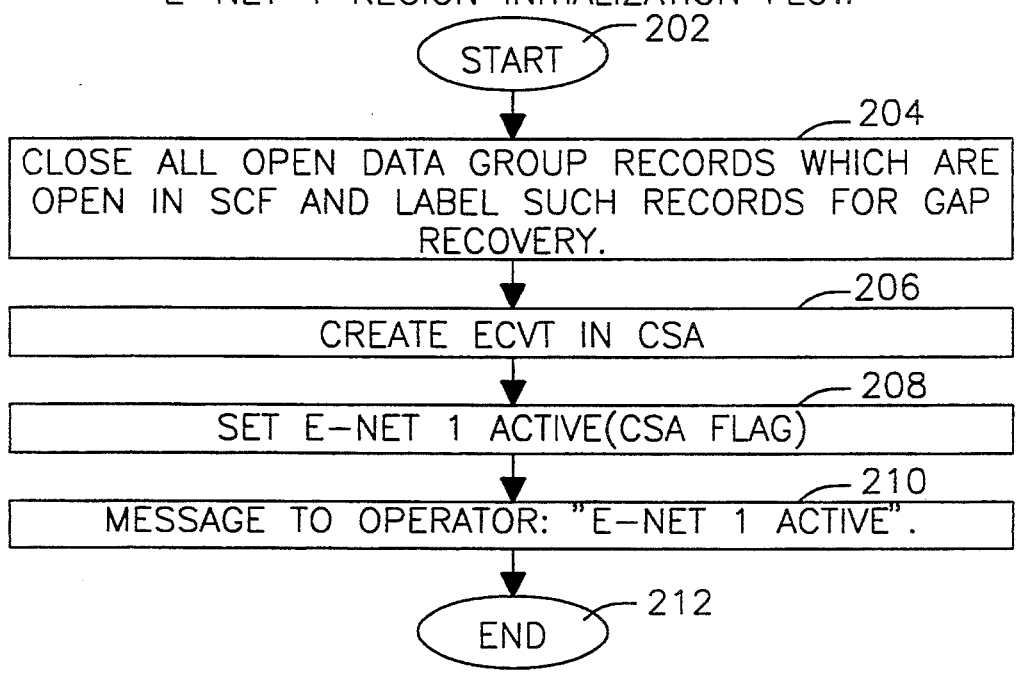
FIG. 5 is a logic flow diagram illustrating the E-NET1 region initialization.

FIG. 5 depicts the logic flow when starting execution of E-NET1 in the E-NET1 C Region 30. During flow block 202, the program image of E-NET1 is loaded from disk memory 18 into main memory 14 and assigned by the operating system 20 to C Region 30. The particular region assigned for E-NET1 is important for the purposes of the present invention, and is assigned based on logic internal to MVS operating system 20.

Consider now some of the programs and flags which are loaded and created. The main E-NET1 program, E1MAIN 94, attaches and controls other processes (shown in FIG. 3), and the enqueuer 88, which runs independently from the main program, is loaded.

Two status flag areas of memory are created. One is the E-NET1 Communications Vector Table 41 (ECVT), having the structure of Table 4A. The ECVT is used to communicate the status of E-NET1 from the E-NET1 region to other regions, such as the DBMS regions. Since the ECVT is accessed by many different regions, it is located in an area of main memory set aside by the MVS operating system in the mainframe for region-to-region communications, the Common System Area (CSA) 40. A Sending Communications block (SCOM) 98, depicted in Table 4B is a memory area which holds status information for use within the E-NET1 region, including flag SCOMQFUL indicating that the queue is full, flag SCOMQMTY indicating that the queue is empty, flag SCOMGRIP indicating that gap recovery is in progress, and flag SCOMSDT indicating that the VTAM session is active (see Table 4B).

In flow block 204, E-NET1 checks the SCF 76 for any records therein that indicate that E-NET1 had previously abnormally terminated as discussed below.

As shown in Tables 5 and 6, SCF 76 is a "duplexed Virtual Sequence Access Method Key Sequenced DataSet" (duplexed VSAM KSDS). The key features of this type of file, as known in the art, are that it is a dataset, is physically duplicated (duplex), consists of multiple records that can be accessed in a logical order (VSAM), and the logical order is based on the value of a key datum stored with the record (KSDS). The key value in each record of SCF for identifying and retrieving the record is a combination of a data group number (data group #) and a DBMS ID and this key is used to identify and locate a record in the SCF, and identify the type of record.

The SCF file contains three types of records. The three types of structures are depicted in Tables 5A, 5B and 5C and are the SCF control record identified by a data group number (#) of 0 and a DBMS ID of 0 (Table 5A); DBMS control records identified by a data group number (#) of 0, and a non-zero DBMS ID field (Table 5B); and Data Group records identified by a non-zero data group number (Table 5C).

Within broader concepts of the invention, SCF records generally, and Data Group records in particular may be fixed or variable length records, logical records or physical records. Also, within broader concepts of the invention, Data Group numbers and sequence numbers, also known as indicators, may be a series incrementally valued numbers or may be parts of a linked list identifying the next data group or data blocks in the series of data groups or data blocks respectively. For example, using incrementally valued numbers, a series of data groups can be inspected for missing data groups by checking, in series, that each number is represented by a data group. A missing data group results in a skipped number. Similarly, a linked list of data groups and data group records could be used in place of incrementally valued numbers. The inspection for missing data groups would, in the latter case, consist of checking each record in the list in series. Likewise, use of sequence numbers is preferred, but not essential. Within broader concepts, data group records representing live data groups, data group records representing spill data groups, and data group records representing gap data group records need not be put in one SCF file, but each type of record could be stored to separate control records or files.

A data group is a set of T-records 51 whose continuity is not in question. The idea of data groups is important to the operation of E-NET1. All data handled by E-NET1 has an associated Data Group number (#). In normal operation, all data sent by E-NET1 is unquestionably continuous, and is contained in a single Data Group. If E-NET1 is aborted and restarted, there would be a question of continuity of data. If E-NET1 could not send data to remote site 12 as fast as it was being generated, causing E-NET1 to buffer the data to disk memory 18 or causing E-NET1 to lose data, there would also be a question of continuity. Therefore, the data from before an abort and the data after the abort must be included in different data groups. E-NET1 handles the assignment of data groups using the SCF.

There is one record per dataset for each key value, so there is one SCF control record per SCF dataset. An example of the contents of an SCF control record is illustrated in Table 6. The SCF control record appears at the logical top of the file since it has the lowest key value. This record, as indicated on Table 5A contains information about the SCF file itself such as flags indicating if either of the SCF files in the duplexed pair is bad, and the multi-user information relating to the SCF file (Data Cluster VSI length and Data Cluster VSI Level #) which is required for handling multiple simultaneous accesses to the file. Rather than closing and opening the SCF every time a series of records are written to the SCF by a single process, the SCF is left open to improve performance, but the multi-use information relating to the SCF, which is in the SCF control record, is updated to allow multiple processes (such as gap recovery) to correctly access the SCF without having to close the file after each series of reads and/or writes by a single process.

The contents of two DBMS control records are shown in Table 6 below the SCF control record. The purpose of DBMS control records is to allow E-NET1 to track in DBMS Type and DBMS ID (Table 5B) which DBMSs regions are in use and the type of each DBMS. Generally, one DBMS control record exists for each DBMS which is used with E-NET1. These records also keep track, in Selective Journal Exit Name, the name of the exit routine to be used to selectively filter the records coming from the DBMS represented by the DBMS type field of the record.

All other records in the SCF 76 of Table 6 below the SCF control record and the DBMS control records, are data group records having the format depicted in Table 5C. Referring to the data group records, the DBMS ID is blank (filled with hex '0' characters) unless the record represents gap data, in which case the DBMS ID is the DBMS ID of the DBMS which created the gap. Each data group record contains two timestamps, a starting timestamp indicating the beginning time for the T-records included in the Data Group and an ending timestamp giving the ending time of the T-records included in the Data Group. Timestamps consist of the date (i.e., Julian century, year and day of year) and time when the T-record was created. The date and 24 hour time (in tenths of a second) is read directly from the T-records 51. Timestamps can be created by a program making a request to the mainframe to read the time and date from real-time clock 8, which is maintained by the mainframe, but the current embodiment reads the date and time directly from the T-record, to arrive at the time the T-record was created instead of the time E-NET1 received the T-record.

The timestamp from the creation time of the T-record, rather than the receipt of the T-record, is preferred, since gap recovery will be extracting information based on the creation time, not the receipt time. Within broader concepts of the invention, timestamps are preferred but not essential. Instead, data group numbers, and preferably sequence numbers, can be used in place of timestamps to reference data groups and T-records, recover data and gaps of data.

Although the date portion of the timestamp is stored in SCF 76 whenever the time portion of the timestamp is stored, Table 6 does not show the date portion, for simplicity. If a data group record represents a data group that contains log records currently being generated, the end timestamp for that data group record is blank, since the time and date are that of an event that has not yet occurred. Table 5C depicts the Status flag in a bit representation, but for clarity the Status flag is depicted in Table 6 as a logical representation, showing both the type of the Data Group (DG TYPE) and the status of the record (STATUS).

The structure of the SCF 76 file is by way of example, and is the preferred layout, but other layouts may be devised within the scope of the invention. For example, although beginning and ending timestamps are disclosed and preferred, one may use a single timestamp in each control record, i.e., a timestamp for the beginning (or end) of one data group and merely imply the end (or beginning) of the preceding (or next) data group from the one timestamp. Within the scope of the invention, one may even replace the use of timestamps with the use of a linked list referencing the next data group or blocks in a series of data groups of blocks, which would be an alternate method of determining the boundaries of the data groups in a series of data groups.

Refer now to FIG. 5 and consider operation when bringing up an E-NET1 region. A blank ending timestamp (in Table 6) indicates to E-NET1, in the flow of block 204, whether E-NET1 had abnormally terminated. When E-NET1 previously terminates normally, E-NET1 records an ending timestamp for all data group records which have blank ending timestamps. Thus, when E-NET1 is restarted normally, E-NET1, during block 204, will not find any data group records in the SCF 76 that have blank ending timestamps. During block 204, E-NET1 will place a current timestamp into the location for the ending timestamp for each open (unended) Data Group record in SCF 76 and label each such record a "gap" record by setting the corresponding bit in the Status flag (Table 5C) for that record. Also for each DBMS control record that was found to be open, a Data Group record is created at the end of the SCF 76 and is assigned a new data group number. E-NET1 determines the value of newly created data group numbers by looking at the SCF and finding the highest numbered data group number used and adding one to that data group number. In the example of Table 6, the highest data group number in use is 6, so if E-NET1 needs a new data group number, the new data group would be data group 7.

E-NET1 then proceeds to the flow of block 206, and initializes the ECVT and SCOM memory areas. Once E-NET1 finishes initializing itself, E-NET1 then proceeds to block 208 and sets E-NET1 status flag ECVTACTV in the ECVT 41 (FIG. 2) to indicate that E-NET1 is active and accepting data. E-NET1 sends a message to the operator console 44 indicating that E-NET1 is active and running at flow block 210, and that installation is complete, leaving E-NET1 to run without further operator interaction at flow block 212.

Figure 6:
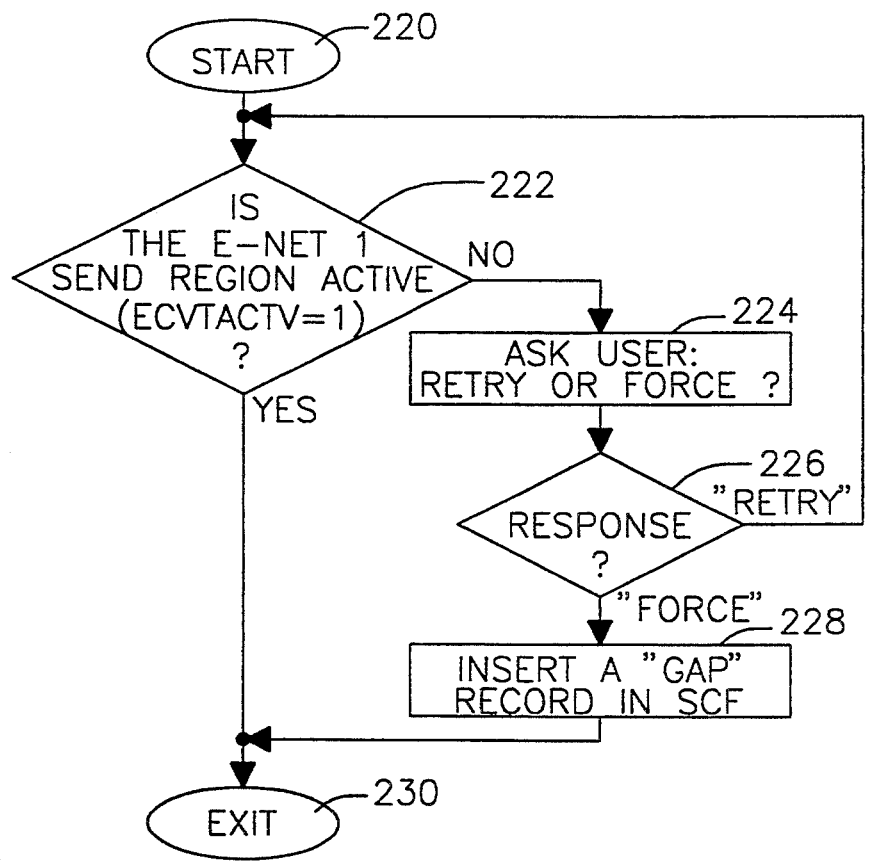
FIG. 6 is a logic flow diagram illustrating DBMS interface initialization.
Figure 7:
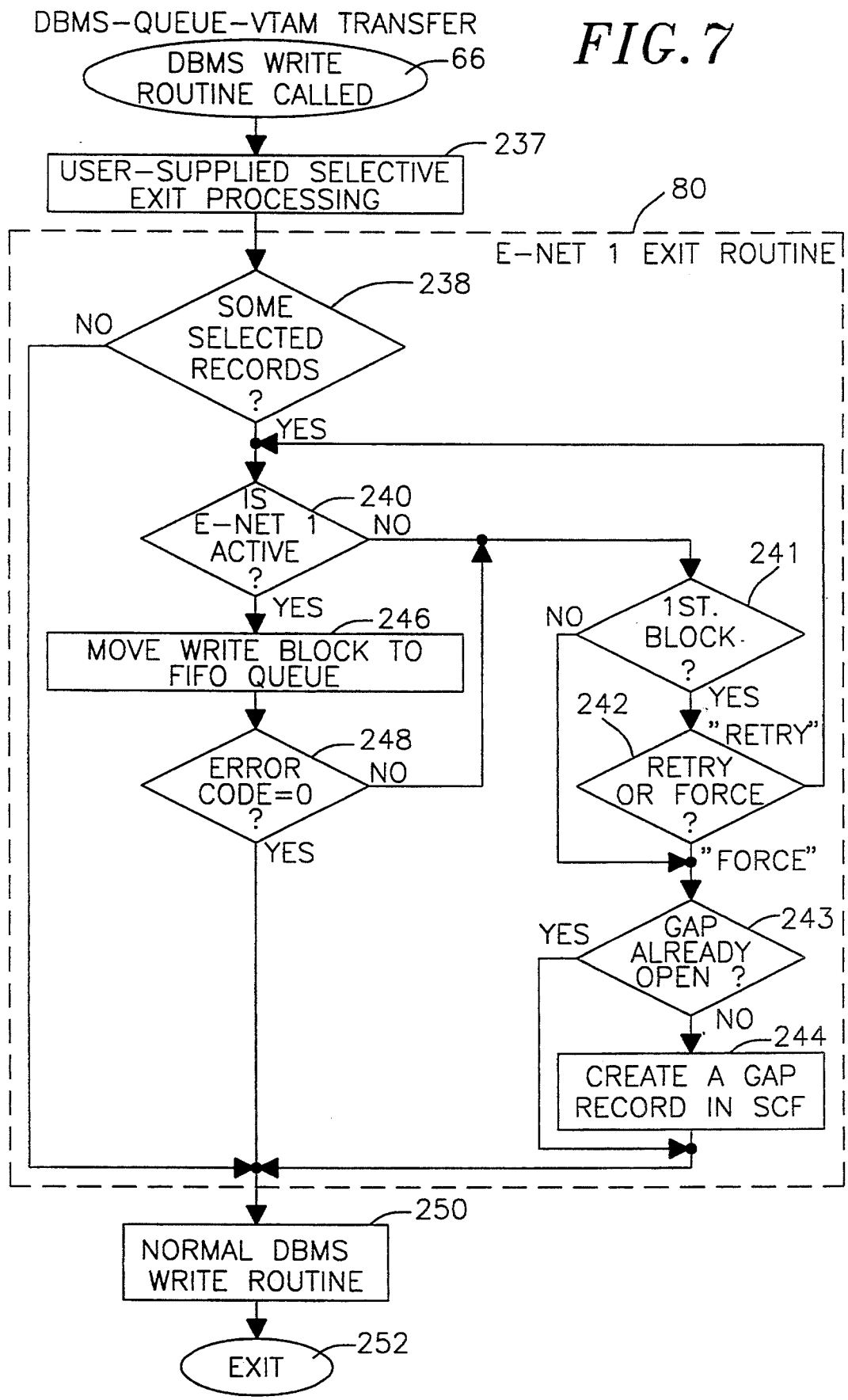
FIG. 7 is a logic flow diagram illustrating the DBMS write routine.

When the DBMS main program 83 is started in B region and attempts its first write operation to disk memory 18, the DBMS main program executes programs illustrated in the logic flow of FIG. 6; then the logic flow of FIG. 7. The IDMS and CPCS DBMS programs also work in this manner, but for IMS the logic of FIG. 6 is executed immediately when IMS is started, without waiting for the first write operation.

The flow of FIG. 6 starts at block 220 when the operator issues a command at the console 44 for the operating system to start up a region containing the CICS as the DBMS main program, using a JCL file associated with CICS. The operating system then executes the jobsteps listed in the JCL file. Additional programming steps have been added, through the process of installation, to the JCL file causing it to execute the program steps illustrated in FIG. 6. Flow proceeds to block 222 and the JCL program checks the CSA 40 for the existence of the ECVT 41 (FIG. 2), and if the ECVT exists, the program checks the E-NET1 status flag ECVTACTV to see if it is set, indicating that E-NET1 is active. If E-NET1 is active, the program initialization ends and control passes normally to block 230 to the DBMS main program. If the ECVT is not found in the CSA, or the flag ECVTACTV is not set, the program then steps to block 224 and sends a message to the display 44a of operator console 44 requesting that the operator make a decision to hold up the loading of CICS until E-NET1 is loaded and active, or to force the loading of CICS without E-NET1 running. The program then checks the response at 226, and if the operator requested a retry, presumably starting E-NET1 before responding, the program moves back to block 222 to recheck the E-NET1 status as described above. If the operator had responded that CICS should be forced, i.e., started anyway without E-NET1, the program proceeds to block 228, and inserts a gap data group record in the SCF (i.e., at the end of the last record in Table 6). indicating that CICS will be running without E-NET1. Running a DBMS without E-NET1 is one of the conditions that trigger creation of gap data group records and the need to do gap recovery. Summarizing, a gap data group record is inserted into the SCF 76, and the Data Group field of the record is filled with the next available data group number, the DBMS ID field is filled with the DBMS ID for the DBMS, found from the DBMS dependent parameters file 77, the starting timestamp field is filled with the current time and date; and the status flag indicating that the record is a gap record, is set. After the gap data group record is created and stored in SCF 76, the program proceeds normally past block 230 for execution of the CICS program. If the particular DBMS had been used previously with E-NET1, the DBMS control record for that DBMS would already exist in the SCF. If the DBMS record already exists, a new DBMS control record will not be created and the old DBMS control record will be used, but the old one will be "reopened," by filling the starting timestamp field with the current time.

During installation of E-NET1, E-NET1 exit routine 80 (FIG. 2) is linked into the journalling routine 66, so that while the DBMS is running, any write access of disk memory 18 done by the journalling routine (XJCWR in CICS) 66 requires a call to exit routine 80. The actual name of the journalling routine differs from DBMS to DBMS, but can be found in the documentation for the specific DBMS, with the exception of IMS. For IMS, the source program which writes the journal code must be modified. As part of the installation, the DCF 78 file must be created and E-NET1 DCF jobstep 84 is attached to CICS to gather the data necessary for the DCF. Table 3 illustrates the structure of the DCF 78.

The DCF 78 is used by E-NET1 gap recovery programs, discussed subsequently, to locate log records on tape 39 when the records are needed for the gap recovery process. Like the SCF, the DCF is a duplexed VSAM KSDS type file. One DCF record is formed for each contiguous block of log records on tape 39. The key fields for each DCF record in the DCF file are Log/Journal number (#), which identifies the dataset which was the source of the data, and the starting date and starting time of the data. E-NET1 DCF jobstep 84 is added to the JCL file that is supplied with CICS for archiving log records. The added jobstep is the operation of executing program 84, and the JCL file is used to perform the general function of archiving log records. This jobstep writes a record to the DCF 78 showing where on tape 39 to find the data.

The step of installing E-NET1, which needs to be done only once for each DBMS, is slightly different for each DBMS, but the goal is the same: attach an exit routine to capture data as it is written to a log or journal dataset, and provide a means to track the location on tape of records archived from the log or journal dataset.

The steps of attaching exit routines and adding jobsteps are conventional and are known to those skilled in the art. The details of the steps vary from DBMS to DBMS. For example, when installing IDMS, an exit routine 80 and an archive copy routine 84 are "link-edited" into the IDMS program image. For IMS, only the exit routine 80 is used, as IMS already maintains the data for locating data on archive tape in a file labelled "RECON," eliminating the need for E-NET1 to separately track such information.

Log records are generally not written to log dataset 74 one at a time, but rather are kept by DBMS main program 83 until several records are ready to be written to disk. Journalling routine 66 is only called by the DBMS main program 83 when the block of records is ready to be written to disk. Table 1C shows an example of how multiple records are blocked. A first block of records 1–10 would become one logical block, records 11–20 would become another logical block, etc. Multiple record blocking increases the speed of DBMS operations by limiting the amount of disk access required to write log records. In the example of Table 1C, to write all 28 records would require only 3 write-to-disk operations. Typical block size would be larger than 10 records/block, but 10 is used for purposes of illustration. Each time journalling routine 66 writes data to log dataset 74, a new T-record 51 is created by exit routine 80, and the T-record 51 contains a copy of the data written. T-records 51 are illustrated in FIGS. 2, 3, 4, and 8.

FIG. 7 depicts the logic flow for the DBMS main program 83 which writes data to log dataset 74 and using E-NET1 exit routine 80 (FIG. 2), creates a T-record and transfers it to C Region 30, where the T-record comes under the control of E-NET1 (more specifically, the enqueuer (E1QPOR) 88) if E-NET1 is active, and handles the case where E-NET1 is not active. The E-NET1 exit routine 80 is added to the journalling routine 66 during installation. Although block 250 of FIG. 7 depicts that the normal DBMS Write Routine 250 occurs after the E-NET1 exit routine 80, the write routine could come first. Whenever the internal logic of the DBMS main program 83 decides to write a block of data which it has generated to disk memory 18, such data, consisting of one or more log records, DBMS main program 83 executes the journalling routine 66 (FIG. 2). At block 237, the program calls user-supplied selective journalling routine 81. This program, supplied by the user, is well known in the art and indicates to the exit routine 80 which records, if any, of the block to be written to disk memory 18 should be ignored, and which should be sent to the E-NET1 C region 30 (FIG. 3). Some users may choose not to provide this routine 81, and consequently, E-NET1 will store every log record generated by CICS. When routine 81 returns control to the journalling routine 66, the flow proceeds to block 238. If routine 81 returns with no records selected, control proceeds to block 250 without activating any other part of the exit routine 80 indicated in FIG. 7. If the routine 81 has selected some records, control passes to block 240. During flow block 240, the flag ECVTACTV of ECVT 41 in the CSA 40 (FIG. 2) is checked to find the status of E-NET1, and if E-NET1 is not active, control passes to block 241.

If the block to be written is the first block written since the DBMS was started, E-NET1 will give the operator an opportunity to fix the problem and retry the operation. To this end during block 242, the operator is asked to make a selection on console 44 (FIG. 1) between a RETRY operation or a FORCE operation. If the operator keys in a RETRY, control passes back to block 240. If the user keys in a FORCE, control passes to block 243, where a check is made to see if a gap data group record is open, indicating that a gap in the data already exists. If a gap does not exist, block 244 is entered, where a gap record is created. If a gap exists, control passes to block 250.

The embodiment depicted in FIG. 7 only requests at block 241 a response from the operator when the first write operation fails. An alternate embodiment would request operator action whenever any write operation fails. This could be accomplished by having block 241 always respond with "yes" regardless of whether or not the write operation is the first one. Another embodiment would never request operator action. This could be accomplished by having block 241 always respond with "no" regardless of whether or not a write operation is the first one.

To create a gap data group record, any open live type data group record in SCF 76 (Tables 5C, 6), i.e., with a blank or an ending timestamp, is closed by putting a current timestamp into the ending timestamp field of the record, and a new data group record is created in the SCF 76 for a new gap data group. If a DBMS control record (Tables 5B, 6) does not exist in the SCF 76 for the current DBMS, a DBMS control record will be added to the SCF 76 containing a current starting timestamp. The existence of a DBMS control record is found by searching the SCF 76 for a record with a data group number of 0 and a DBMS identifier equal to the DBMS identifier stored in the DBMS parameter file 77 (FIG. 2), the structure of which is shown in Table 7. This DBMS identifier is also the DBMS identifier used when a new DBMS control record is added to the SCF 76. A DBMS control record is created during block 244 of FIG. 7 during the first execution of this logic after the start up of the DBMS.

FIG. 8 shows the word format or structure of a T-record 51 (FIG. 2) and an example T-record 51. The exit routine fills the DBMS Origin Code field 308 with the DBMS code read from the DBMS dependent parameters file 77, and fills the original length field 314 with the length of the data field before compression. The data group number field 310 and the sequence number field 312 are filled by the queue handler 92 when T-record 51 is removed from the FIFO queue 100 and a data group number (#) and sequence number are assigned to the T-record. The Timestamp field 316 is filled in with the time of creation of the T-record.

The time of creation may be determined differently for different DBMSs. By way of example, in a T-record from a CICS DBMS, the timestamp can be read from the beginning of the data field 49, in an area known in the art as a "CICS label record". In a T-record from an IDMS DBMS, the timestamp can be read from the beginning of the data field 49, in an area known in the art as an "IDMS TIME record". In a T-record from an IMS DBMS, the timestamp is determined by looking at all the IMS log records stored in a data field and setting the timestamp equal to the latest timestamp value found in an IMS log record.

The other fields stored in a T-record are the overall length field 302, which changes from time to time as the T-record is compressed, encrypted, decompressed and decrypted and which indicates the current size of the T-record, and a Record Type field 304 in which all records containing actual data will have a Record Type of 20 H (hex) and those without data have either an 80 H, 40 H, or 10 H. T-records having a Record Type of 80 H are E-NET1 Startup Header Records. An E-NET1 Startup Header Record is sent to the remote site each time E-NET1 first starts up. The only other field used in such a T-record is the Timestamp field which indicates the time at which E-NET1 was started. T-records having a Record Type of 40 H are E-NET1 Shutdown Trailer Records. An E-NET1 Shutdown Trailer Record is the last T-record to be sent to the remote site before E-NET1 shuts down at the central site. The only other field used in such a record is the Timestamp field, which contains the time at which the T-record was created. T-records having a Record Type of 10 H are Data Group Header Records. A Data Group Header Record is sent to the remote site just before the first T-record of each data group is sent. This type of T-record contains a data group number in the Data Group Number field 310, and a timestamp in the Timestamp field 316 which is a copy of the starting timestamp stored in the SCF 76 for the data group specified in the Data Group Number field.

The Record Type 304 is a byte field. The DBMS Origin Code 308 is a 2-byte field where the first byte is a character, the second byte has three digits with a range of only 000–255, the data group number 310 and sequence number 312 are full words, the original length 314 is a full word, and the data field 49 is a variable length, up to 32735 bytes.

Referring back to FIGS. 3 and 7, if E-NET1 is found to be active during block 240, a pointer to the enqueuer (E1QPOR) 88 located in a different region, C region 30 (FIG. 3), is read from the ECVT 41, in the variable ECVTPCN0 (Table 4A). The pointer is then passed to XMS 48, provided as part of the operating system, which maintains a table to convert the pointers to program locations, and which handles moving T-records from B region 28 to C region 30. XMS 48 invokes the enqueuer routine 88, to be discussed. If the enqueuer routine is able to put the T-records passed by XMS onto the FIFO queue 100 during block 246, the enqueuer will pass back a return code of 0. If the enqueuer cannot place the T-records onto the FIFO queue, i.e. because the FIFO queue has filled to capacity, the enqueuer will return a non-zero return code. Normally, the queue handler 92 will prevent the FIFO queue 100 from filling to capacity. If the return code is non-zero, control proceeds from block 248 to block 241, to give the operator an opportunity to retry moving the T-record to FIFO queue 100. If the error code is 0, indicating that the data has been successfully written onto the FIFO queue, control passes from block 248 to block 250. After the block of data is written to log dataset 74 during block 250 control is passed back from routine 66 to DBMS main program 83 at block 252.

The activity of enqueuer 88 is initiated only by XMS 48. When initiated, the enqueuer 88 attempts to place a T-record incoming from XMS onto the FIFO queue 100, and returns a code to XMS indicating the success of the operation.

E1MAIN 94, the main E-NET1 program, controls the attachment of a warning generator 86 (E1WARN), a wake-up timer (E1TIMR) 99, the queue handler (E1-DEQU) 92, a spill file reader (E1SPRD) 95, and a buffer sending program (E1TRAN) 97. The wake-up timer (E1TIMR) starts up the queue handler and the spill file reader at regular intervals so that they have a chance to handle the changing status of flags in the SCOM memory area 98 and in the SCF 76. The queue handler 92 moves T-records out of the FIFO queue 100 and prepares the T-records for transfer to the remote site 12, as well as initiates gap and spill file recovery as necessary. During normal operation, the logic of gap recovery and spill file handling will not be used. Under normal conditions, the queue handler moves T-records from the FIFO queue 100 to the VTAM buffers 102. The queue handler 92 assigns the data group 310 and sequence numbers 312 (FIG. 8) to the T-records 51 as they are taken off the queue. The data group number to be assigned is read from the last open data group record in the SCF 76. The sequence number to be assigned is remembered by the queue handler, and is a sequential number which increases by one for every T-record 51 read from the FIFO queue, and is set back to 1 every time a new data group is formed. Thus, a T-record 51 has a unique identifier of the data group 310 in combination with the sequence number 312.

The checkpoint file 104 (FIG. 3) contains the data group number and sequence number of the last successfully transmitted T-record, as well as a timestamp of that last T-record. For a T-record to be determined to have been successfully transmitted, the VTAM buffer for that T-record must have been released for reuse. The operation of transmission and transmission confirmation, which releases the buffers, is discussed subsequently.

The queue handler, E1DEQU, and E1TRAN track which buffers in FIFO queue 100 and VTAM buffer 102 are free by means of a flag associated with each buffer. Another embodiment uses two linked lists, one to track which buffers are occupied and one to track which buffers are free.

The regular interval for updating the checkpoint file 104 is specified as a number of T-records and the number is kept in a variable, CKPTINT of the E-NET1 parameters file (see Table 8). Table 8 shows the format and example contents of the E-NET1 parameters file 87. The file 87 is a text file with multiple lines, each line having a variable identifier and a variable value. CKPTINT in the example of Table 8 is set to record a checkpoint every 1000 T-records. A checkpoint is simply a marker indicating the latest T-record successfully received by the remote site and confirmed by the remote site. The checkpoint is used as the starting point for a recovery.

Referring to FIG. 3, the E-NET1 parameters file 87 also contains the values QUESIZE for the size of the FIFO queue 100 in kilobytes, the queue high threshold percentage QUETHHI, queue low threshold percentage QUETHLO, and queue warning threshold percentage QUEWARN, respectively. The flow of the queue handler 92 (E1DEQU) is determined in part by these values. Under normal operation, the FIFO queue 100 never fills up to the queue high threshold, but is emptied to the VTAM buffers 102 and transmitted to the remote site 12 at a rate at least as fast as the rate the data is being collected by the enqueuer 88. If the FIFO queue 100 were to fill up past the QUEWARN percentage, E1DEQU 92 sends a command via E1MAIN 94 to the warning generator E1WARN 86, which would then display a message on the operator's console 44 to the effect that the FIFO queue has filled past its warning level.

The queue handler (E1DEQU) compresses the data field of the T-record as it is read from the FIFO queue for efficient handling and transfer of data. After compression, E1DEQU encrypts the data if a user-supplied encryption program 91 is made available to E1DEQU. To make the encryption program available to E1DEQU, the user names the program "E1CRPT" and includes it in a link-edit of E1DEQU. If the user supplies an encryption routine 91 (FIG. 3), the user must also supply a decryption routine 816 (FIG. 14), to be used in the event that database recovery is needed. E1DEQU calls the encryption routine 91 if used, passing the routine a T-record with an unencrypted data field 49, and the encryption routine returns control to E1DEQU, passing back the T-record 51 with the data field 49 encrypted.

Buffer sending program E1TRAN 97 is another program started and attached by the E-NET1 main program E1MAIN 94. E1TRAN passes data from the VTAM buffers 102 to the operating system supplied VTAMcommunications programs 64 which move the data to the remote site. E1TRAN invokes the communication programs. The VTAM buffers are not released by E1TRAN 97 for reuse until E1TRAN receives a return confirmation from the remote site 12 via VTAM communication programs 64. This ensures that data will not be discarded before it is safely copied to disk memory 17 at the remote site 12. This feature ensures that no data is lost if the communication line 53 or the remote site mainframe 24 unexpectedly fails. VTAM communications programs 64 on mainframe 16, communication programs 60 on mainframe 24, communications interfaces 50, 56, modems 52, 54, and communication line 53 are collectively referred to as a "VTAMlink." Alternate embodiments of the present invention may use means other than those depicted in FIG. 1 to communicate from the central site to the remote site, such as a direct hardware link, or dedicated wires. Significantly, such communication links operate similarly to the embodiment depicted in FIG. 1, and each is generally referred to as a "VTAM link." The effects of the remote site failing to confirm receipt of data blocks is discussed below along with spill file operations. If confirmations are not received in a timely manner, FIFO queue 100 fills, and the creation of spill files becomes necessary.

Figure 4:
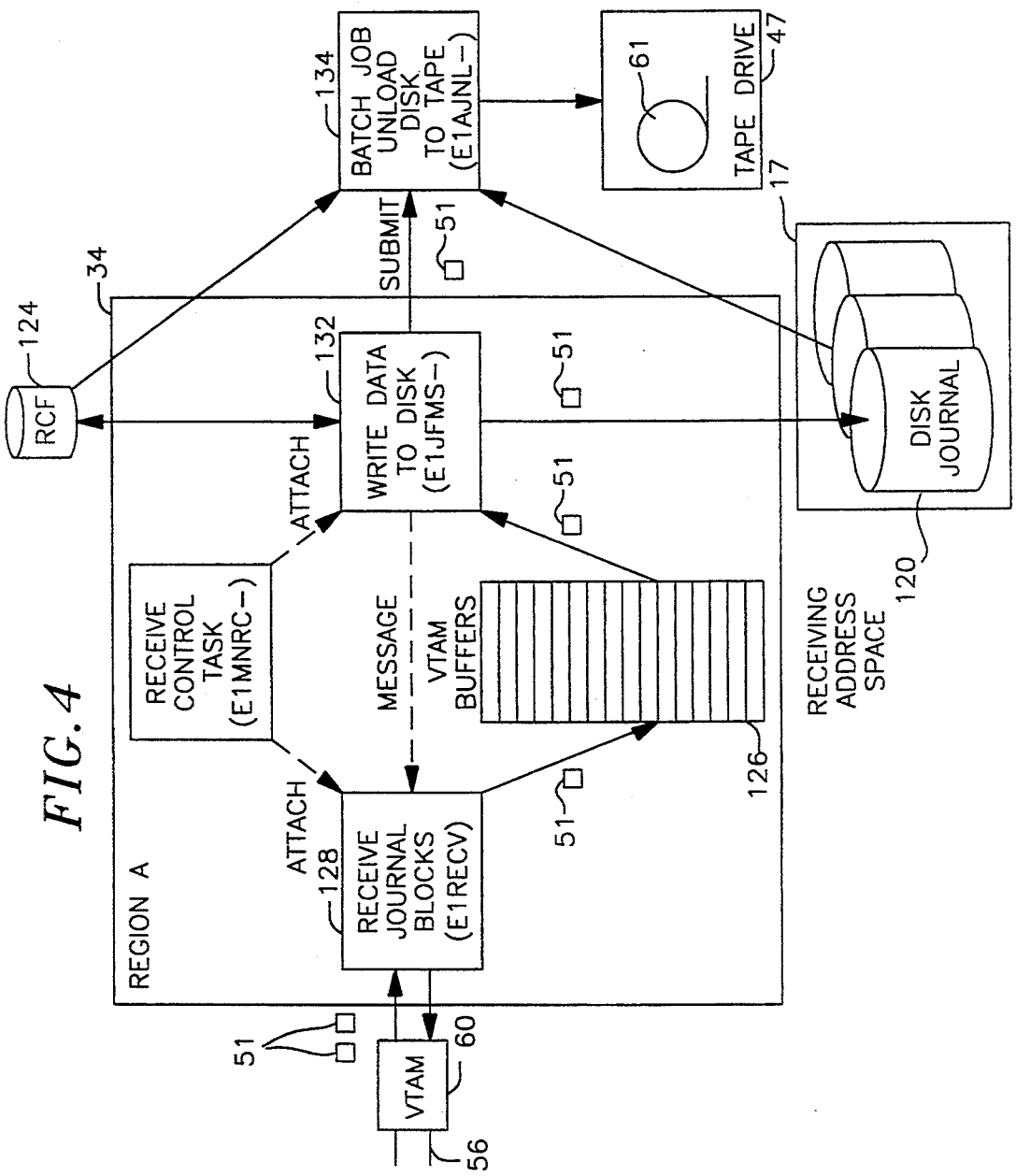
FIG. 4 is a block diagram of a receiving E-NET1 region of the remote site mainframe main memory.

FIG. 4 depicts the remote site 12 with the E-NET1 remote site software installed and running in the A region 34 of mainframe 24 (FIG. 1). B region 36 is shown in FIG. 1 along with A region 34 for illustration of the multiple regions of the main memory 15 or remote mainframe 24, but only one region is used at the remote mainframe 24 for E-NET1. Region 36 is empty and is not running any programs. The receive control task program E1MNRC 130 is a program initially loaded to control the E-NET1 receiving region 34. After attaching and starting the receive journal blocks program E1RECV 128 and the write-data-to-disk program E1JFMS 132, E1MNRC 130 is not active. E1RECV 128 receives the T-records 51 as sent by E1TRAN 97 (FIG. 3) running on the central site mainframe 16, and puts the T-record 51 into VTAM buffers 126. E1JFMS 132 then removes the T-records 51 in the order received, from the VTAM buffers 126 and puts the T-records into a disk journal file 120 in disk memory 17 (FIG. 1). When a T-record 51 is written with certainty to the file 120, E1JFMS 132 posts a message to E1RECV 128 to the effect that a data block was securely written to disk. E1JFMS 132 then frees the VTAM buffer containing the just written data block, for reuse by E1RECV 128. When E1RECV receives the message from E1JFMS, a VTAM confirmation is sent to the central site over communication line 53 (FIG. 1). This confirmation is known in the art as a "DRI" or Definite Response Confirm. VTAM confirmation is done as taught and described in the VTAM manual supplied by IBM with the VTAM product which is incorporated herein by reference.

When E1JFMS 132 fills a file 120, it initiates the unload disk to tape routine (unloader) 134, which moves the file 120 to tape drive 47 which copies the file 120 onto a removable magnetic tape 61.

The Receive Control File (RCF) 124 contains data relating to the progress of data being received and the location of received data. The structure of the RCF 124 is shown in Table 9. Table 10 shows typical data contained in the RCF.

Table 9 shows the format of each record in the RCF 124. Each record represents a contiguous series of T-records 51, all of which are stored in a single location. The first four fields shown in Table 9 indicate the start and end of the extent of the T-records 51 in the contiguous series. A T-record is uniquely identified by its data group number and sequence number, thus the first four fields of a record in the RCF 124 identify a first and a last T-record. In addition, the starting timestamp indicates the time applicable to first T-record of the series and the ending timestamp indicative of the time applicable to the last T-record of the series. The Dataset Name field indicates which file 120 in disk memory 17 contains the T-records. After the data in file 120 is moved to tape 61, the Unit Type, Volume Serial Number, and File Sequence Number fields indicate which tape the series of T-records was written to.

Table 10 depicts an example RCF. The first series of T-records, as shown in the first line of Table 10, begins with the T-record with a data group number of 1 and a sequence number of 1, and the series ends with the T-record with a data group number of 1 and a sequence number of 1299. The second series of T-records, as shown in the second line of Table 10, begins with the T-record with a data group number of 1 and a sequence number of 1300, and the series ends with the T-record with a data group number of 1 and a sequence number of 1503. The third series of T-records, as shown in the third line of Table 10, begins with the T-record with a data group number of 2 and a sequence number of 1, and the series ends with the T-record with a data group number of 2 and sequence number of 306.

A record is created in the RCF whenever E1JFMS 132 writes a T-record to file 120 and finds no open records in the RCF to record the fact that the T-record was written to file 120. An open record is defined as one that has blank ending data group number (#) and sequence number (#) fields. Whenever a file 120 is filled, E1JFMS program 132, writes the data group number, sequence number and timestamp of the last written T-record 51 into the ending data group number, ending sequence number and ending timestamp fields of the last open record of the RCF 124, thus closing the record. The next time E1JFMS 132 writes a data block 49 to file 120, a new open record, as depicted in Table 9, will be created in the RCF 124 as, for example, at the end of Table 10. When a file 120 fills up, E1JFMS 132 will close the file, start to fill a new file 120, and initiate, via a method known in the art as submitting, the batch JCL job E1AJNL 134. The size of each file 120 is selected to closely match the capacity of the tapes 61 so that one file 120 should just completely fill one tape. The batch JCL job E1AJNL 134 moves the data from a file 120 in a disk memory 17 to tape drive 47 which in turn writes the data to a tape 61. The batch JCL job E1AJNL 134 routine then frees up the file 120 for reuse by E1JFMS 132.

The write-data-to-disk program E1JFMS 132, when processing two T-records 51 that are out of order relative to one another, will close the currently open RCF record (Table 9) by filling in the ending data group number, ending reference number and ending timestamp field using data group number, sequence number and timestamp of the first T-record. Furthermore, a new open RCF record will be created with the starting data group number, starting sequence number and starting timestamp fields filled in using the data group number, sequence number and timestamp of the second T-record.

The tapes 61 containing the T-records 51 derived originally from the log datasets 70, 74 at the central site 10 are stored for use in future recovery in case recovery is ever necessary because of a disaster or the like at the central site. DBMS recovery using these tapes is discussed subsequently.

B. SPILL FILE OPERATIONS

If the queue handler 92 (FIG. 3) cannot empty the FIFO queue 100 due to the communication line 53 being down, or due to data being generated too quickly, E1DEQU 92 will "spill" the FIFO queue into a dataset (i.e., spill file 93) to keep the FIFO queue from overflowing. When E1DEQU 92 cannot fill spill files 93, which would be the case if disk memory 18 (FIG. 1) fills to capacity, E1DEQU 92 allows the FIFO queue 100 to fill completely, which triggers the enqueuer E1QPOR 88 to stop accepting data from XMS 48, which in turn generates a gap data record in the SCF 76 when the first non-zero return code (as shown in FIG. 7) is sent back to exit routine 80 (FIG. 2). This process is discussed in detail subsequently, during the discussion of gap creation. The spill files are saved for transmission until the communication line 53 is restored to operation, or when the DBMS activity slows to the point that the spill files 93 can be sent.

Referring to the flow diagram of FIGS. 9 A, B, C and D, the queue handler E1DEQU 92 is always in one of four states identified as the normal state 1; the queue spilling state 2; the co-process state 3; and the queue filling state 4. FIGS. 9A–D illustrate a high threshold level HT and a low threshold LT of data in FIFO queue 100 which will be referred to in the subsequent discussion.

Information used to control the flow of E1DEQU 92 (FIG. 3) comes from other programs. For example, the status of VTAM is known by the buffer sending program E1TRAN 97. E1TRAN 97 keeps several flags (see Table 4B) in SCOM 98 updated showing the status of VTAM. E1DEQU 92 determines the status of the VTAM buffers by looking to see if a flag in SCOM has been set. The flags in SCOM 98 and their meaning are shown in Table 4B. When set, the flag SCOMSDT indicates that VTAM is operational. The flag is set and reset by E1TRAN based on its internal logic.

Figure 9B:
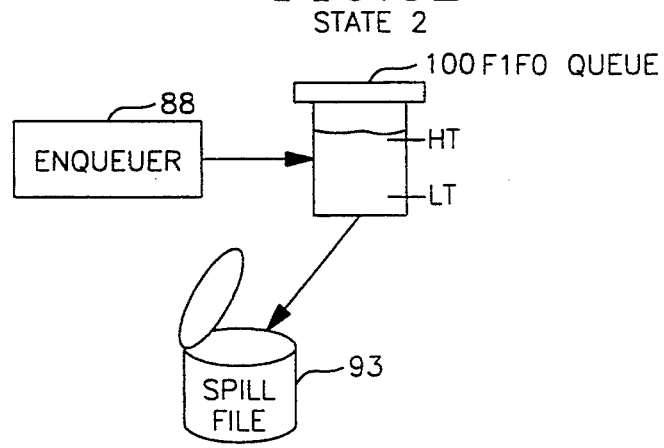
Figure 9C:
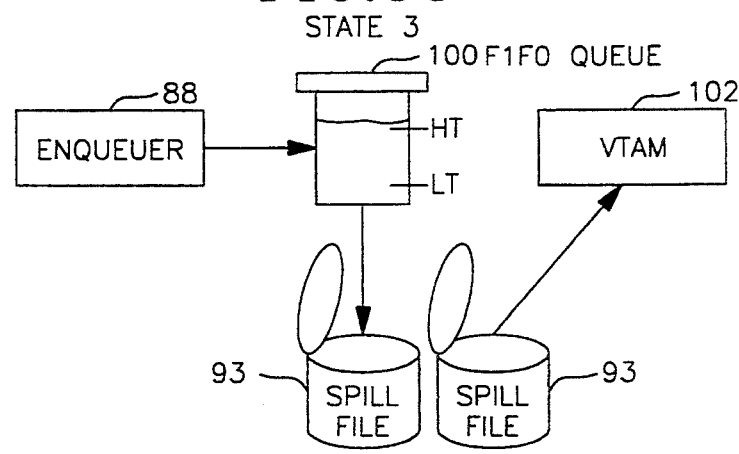
Figure 10A:
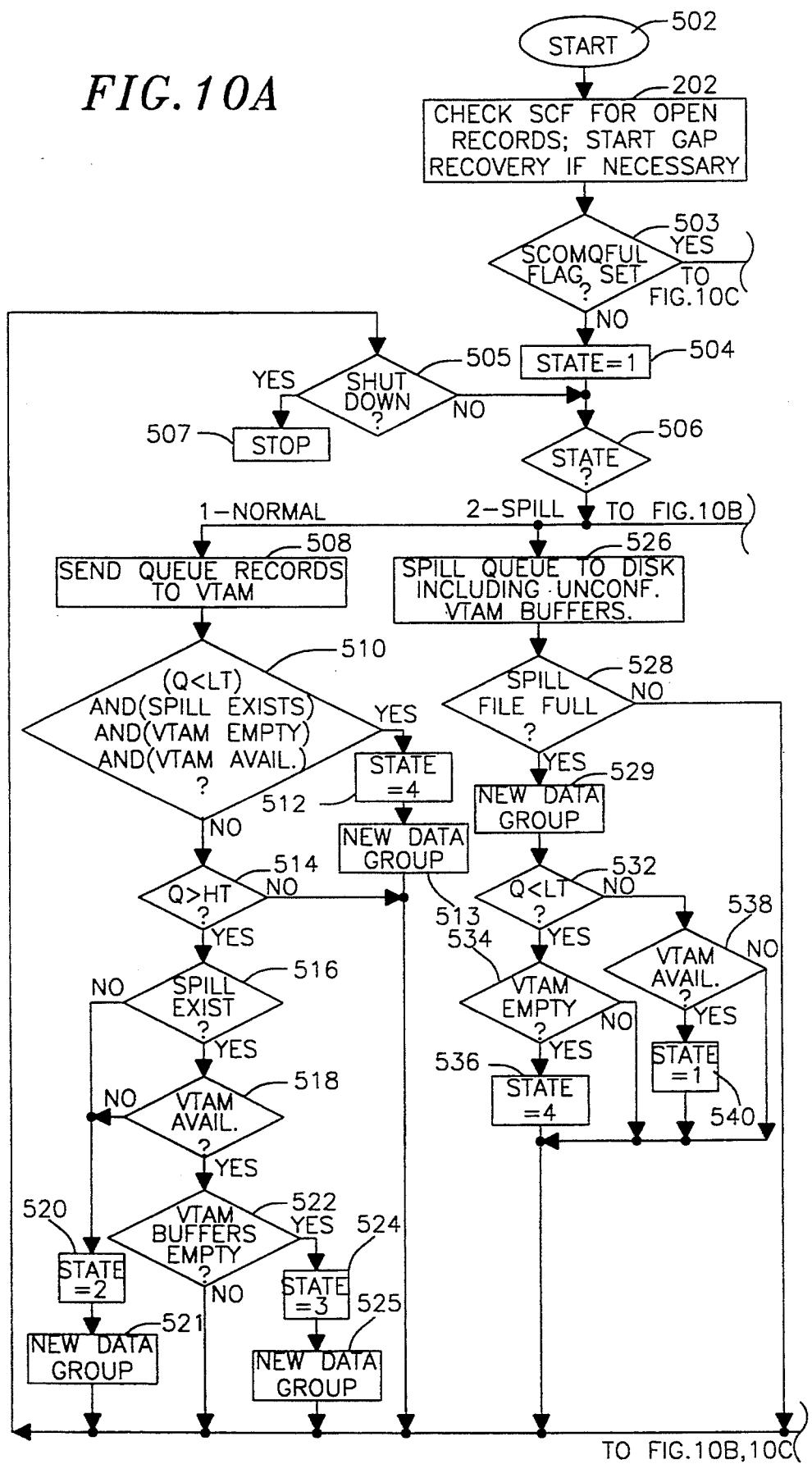
FIG. 10A is a logic flow diagram illustrating the queue handler operations while in states 1 and 2.
Figure 10B:
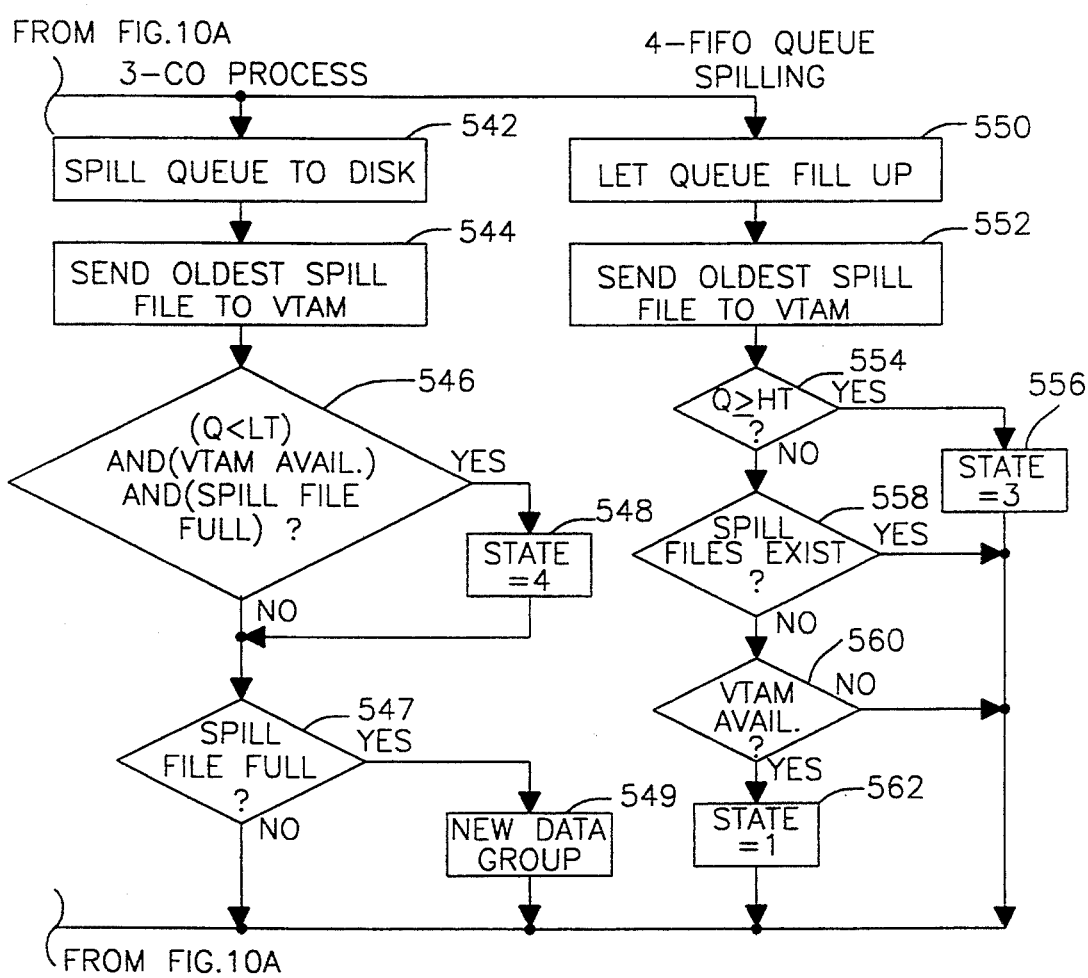
FIG. 10B is a logic flow diagram illustrating the queue handler operations while in states 3 and 4.
Figure 10C:
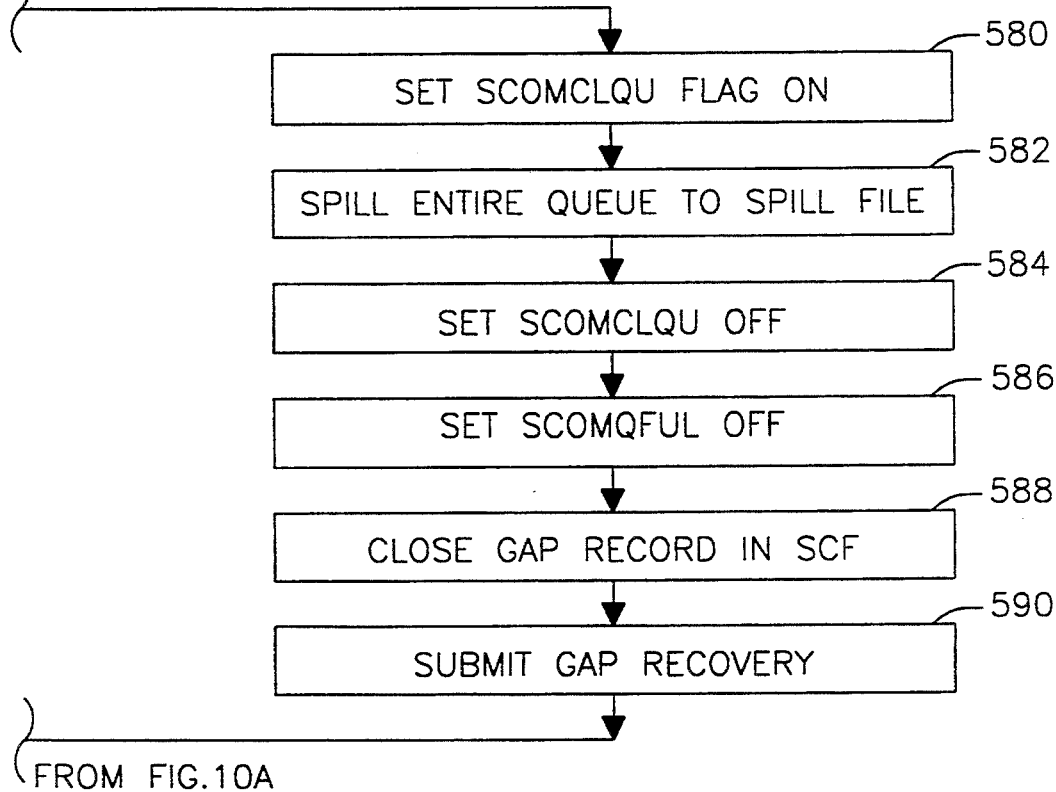
FIG. 10C is a logic flow diagram illustrating the queue handler operations when the queue fills.

Consider the operation in more detail with reference to Table 4B and FIGS. 10A, 10B, and 10C which depict the logic of the queue handler program E1DEQU 92. E1DEQU 92 starts at block 502 when E1DEQU 92 is attached by E1MAIN 94. At block 502, program ECVT 41 and the SCF 76 are set up as depicted in more detail in FIG. 5, and as discussed in Section IIIA, entitled, "Normal Operation of Sending and Receiving Data." The SCOM 98 flag SCOMQFUL is checked at block 503. If the flag is set, usually by the enqueuer 88, the FIFO queue 100 is full as indicated in FIGS. 9B and 9C and must be handled. This handling is discussed in more detail subsequently in connection with FIG. 10C.

Figure 9A:
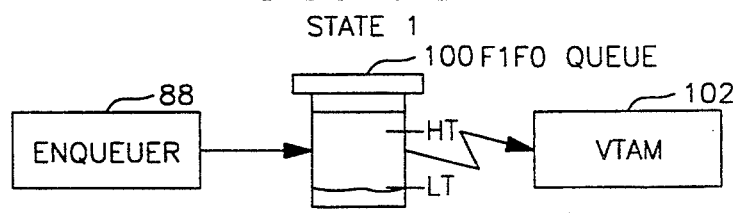
FIGS. 9A through 9D, are a block diagram showing the states of the queue handler.

If SCOMQFUL is not set, FIFO queue is not full, as depicted at FIG. 9A, and block 504 is entered where E1DEQU 92 is set to state 1. E1DEQU then repeatedly executes a loop starting with block 506 and ending at block 505 until a shutdown is requested by the operator at console 44.

Assume the system is at block 505. If a shutdown has been requested, control passes to block 507 and E1DEQU 92 stops. Otherwise control is passed to block 506 to check the state of E1DEQU. During flow block 507, E1DEQU closes the currently open data group record in SCF 76 by placing the current time and date from real-time clock 8 in the ending timestamp field of that data group record. This step is necessary since an open record indicates that E-NET1 is currently running or has improperly stopped.

E1DEQU 92 adds a live data group record to the SCF 76 as each new data group is created. As discussed previously, a new data group and data group number are created whenever continuity of data comes into question. The situations where a new data group is created is discussed subsequently along with the discussion of the logic accompanying the creation of new data groups.

Each time a T-record 51 is read from the FIFO queue 100, the T-record 51 is deleted from the FIFO queue, and is assigned a data group number and sequence number, which numbers are placed in the appropriate fields. More specifically T-record 51 49 is read from the FIFO queue 100 in a first-in first-out order. E1DEQU 92 keeps track of the current data group number and sequence number in that each time a T-record is read from the FIFO queue, the sequence number is incremented by 1. Each time a new data group is created, the sequence number is reset to 1. Both the data group number and the sequence number are written by E1DEQU to the T-record 51 (FIG. 8) being taken from the FIFO queue 100.

E1DEQU 92 also compresses and encrypts the data fields 49 of T-records 51 after removal from the FIFO queue, so all the data in the VTAM buffers 102 and in the spill files 93 is in the compressed and encrypted format, ready to be sent to the remote site. The processes of compressing and encrypting were discussed previously, as part of normal operations discussions in Section III. A.

Briefly, state 1, the normal state illustrated in FIG. 9A, is generally the state occupied by E1DEQU when no spill files 93 exist and the queue 100 is less full than the queue high threshold percentage value QUETHHI (HT in FIGS. 9A and 10) found in the E-NET1 parameters file 87. Although spill files 93 could exist while E1DEQU is in state 1, none are shown in FIG. 9A, since any existing spill files are ignored while E1DEQU is in state 1. This is the state to which E1DEQU will return eventually if VTAM is operating and data is entering the FIFO queue 100 at a rate lower than the maximum capacity of E-NET1. As long as E1DEQU stays in state 1, no new data groups are created.

Figure 9D:
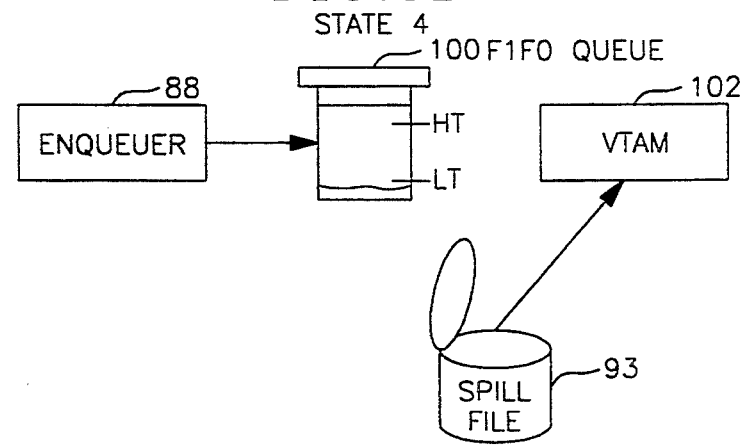

Consider state 1 in more detail. During block 506 (FIG. 10A), if the state is found to be state 1, E1DEQU proceeds to block 508. During block 508, E1DEQU moves as many T-records as possible from the FIFO queue 100 over to available VTAM buffers 102. The logic flow then proceeds to block 510, where E1DEQU makes a test or query. The query has four parts, all of which must be true: (1) is the FIFO queue less full than the queue low threshold percentage value (Lt in FIG. 9A) QUETHLO found in the E-NET1 parameters file 87, (2) is the SCOMSPRD flag of Table 4B set, indicating that data exists in spill files 93 and is ready to be transmitted, (3) is the SCOMSDT flag of Table 4B set, indicating that VTAM communications 64 is currently operating, and (4) are all VTAM buffers free or empty. If this multi-part query is true, E1DEQU flows to block 512, and the state is changed to state 4 (FIG. 9D). During block 513, the current data group record in the SCF 76 is closed, and a new live data group and live data group record are started. Control is then passed to block 505.

If the multi-part query is false, E1DEQU moves to block 514 and checks whether the FIFO queue 100 is as full as or fuller than the queue high threshold QUETHHI (HT in FIG. 9A). If the queue is not as full as the high threshold QUETHHI, E1DEQU remains in the normal state 1, and control passes to block 505. If the FIFO queue is as full as or fuller than the high threshold, E1DEQU checks the SCOM flag SCOMSPRD of Table 4B at block 516 for a spill file condition, and checks the SCOM flag SCOMSDT of Table 4B at block 518. If either of these flags is unset, the state is changed to the queue spilling state 2 at block 520. At block 521 E1DEQU creates a new spill data group. The new spill data group begins with the T-records from the unconfirmed VTAM buffers. Then control is passed to block 505. If both flags are set, E1DEQU then checks at block 522 to see if VTAM buffers 102 are not empty (i.e., is currently sending data), or if VTAM buffers 102 are empty (see subsequent discussion on how to detect if VTAM buffers are empty). If the VTAM buffers are empty, the state is changed to the co-process state 3 at block 524 and then at block 525 a new spill data group and spill data group record are created. If VTAM buffers are not empty E1DEQU stays in state 1, and no new data group and data group record are created. In either case, control passes to block 505.

E1DEQU determines that all VTAM buffers are empty (free) by scanning all the VTAM buffers to check the flag associated with each buffer. In an alternate embodiment, E1DEQU checks an occupied buffer linked list to see if the list is empty, indicating that no occupied buffers exist. The linked list approach may be preferable, for performance reasons, when using a large number of VTAM buffers.

Briefly, state 2, the queue spilling state of FIG. 9B, is the state where data is moved from the FIFO queue 100 to spill files 93 (FIG. 3) and no data goes to the VTAM buffers 102. E1DEQU transitions to state 2 when the VTAM buffers are not operating or the FIFO queue is full and no other spill files exist. Since state 2 is the only state that does not involve the use of VTAM buffers, it is the proper state for E1DEQU when VTAM is not operating. If VTAM buffers are operating and other spill files exist, state 2 is not the proper state, since the content of other spill files could be sent to the remote site via VTAM, and other states would be more appropriate. However, if a spill file is in the process of being filled but is the only spill file, state 2 is the appropriate state, given that the VTAM buffers cannot be sent a partially full file. A spill file might not be absolutely full, but if a T-record cannot completely fit into a spill file, the file is considered full. In some situations, a partially full file can be sent, but the requirement that the spill files fill before sending them simplifies operation of the spill file sending programs. From state 2, E1DEQU transitions to either state 1 or state 4.

Consider state 2 in more detail. During the flow of block 506, if the state is found to be state 2, E1DEQU proceeds to block 526 where data is quickly spilled from unconfirmed VTAM buffers 102 and FIFO queue 100 to a spill file 93. T-records from unconfirmed VTAM buffers followed by the FIFO queue are copied to a spill file 93. Unconfirmed VTAM buffers are copied to spill file 93, otherwise a case could arise where the data is sent to the remote site 12 but remote site mainframe 24 aborts before it writes the data safely to disk memory 17. This would mean that although the data was sent, the confirmation from the remote site to the central site was never received. If this condition persists, and only T-records from the FIFO queue are spilled to spill files 93, there is a chance that the central site mainframe 16 could abort, resulting in the total loss of the data in the VTAM buffer 102.

Since the T-records in the VTAM buffer 102 are older than the T-records from the FIFO queue 100, loss of the data in the VTAM buffer 102 would make the T-records from the FIFO queue useless, for reasons discussed previously. While this condition will occur very infrequently, it must be addressed since the usefulness of E-NET1 is in situations that happen, but that don't happen very often. When T-records are removed from unconfirmed VTAM buffers 102 by E1DEQU 92, the data group number field and the sequence number field are changed to the current data group number and sequence number. This places the T-records in a new data group, a spill type data group.

After the T-records are written to a spill file 93, E1DEQU at block 528 checks the status of the currently open spill file 93. If the spill file is not full, E1DEQU remains in state 2 and control is passed to block 505 since a spill file must be filled before it can be sent to the remote site. If the currently open spill file 93 is full, E1DEQU closes the full file at block 529, creates a new data group and data group record and opens a new spill file. Control is then passed to block 532, and the level of the FIFO queue is compared with the queue low threshold value QUETHLO at block 532 (LT in FIG. 9B). If the FIFO queue is below the low threshold, the VTAM buffers 102 are checked at block 534. If the VTAM buffers are empty, the state is changed to state 4 at block 536. Either way, control passes to block 505. If the FIFO queue is not below the low threshold, the SCOMSDT flag of Table 4B is checked at block 538. If the flag is unset, E1DEQU stays in state 2. If the flag is set, the state is changed to state 1 at block 540. Either way, control passes to block 505.

Although state 1, the normal state, is entered from state 2 while spill files still exist, E1DEQU will remain in state 1 only long enough to empty the FIFO queue below the low threshold. E1DEQU then transitions to state 4, and the spill files are sent.

Briefly, state 3, the co-processing state of FIG. 9C, is a state where data is moved from the FIFO queue 100 to spill files 93, while other spill files 93 are being moved into the VTAM buffers 102 and sent to the remote site. This state is arrived at from state 4 by having the FIFO queue 100 fill past the high threshold HT and having VTAM operational. E1DEQU transitions out of state 3 into state 4 when the queue drops below the low threshold LT, VTAM is operating, and all the spill files 93 are full.

Consider state 3 in more detail with reference to FIGS. 10a and 10b. When control is passed to block 506, if E1DEQU is in state 3, control moves to block 542 where E1DEQU spills the FIFO queue 100 to a spill file 93, then at block 544 sends the contents of the oldest spill file to the VTAM buffer 102. During block 546, E1DEQU checks that the conditions are right to transition to state 4. The condition tested in block 546 to enter state 4 is true if the FIFO queue is less than the queue low threshold LT, the SCOMSDT flag is set, and the currently filling spill file is full. If the condition is true, the state is changed to state 4 at block 548. If false, E1DEQU remains in state 3. During block 547, E1DEQU tests for a full spill file. This condition is always true if the state was just changed to state 4, since the condition for changing state includes having a full spill file. If the spill file is full, a new data group and data group record are created at block 549. Control is then passed to block 505.

Briefly, state 4, the FIFO queue filling state, is a state where data is not moved out of the FIFO queue 100, and spill files 93 are sent to the remote site via the VTAM buffers. This state is arrived at by having the queue less full than the low threshold LT. E1DEQU transitions to state 1 if VTAM is operating and no more spill files exist, but transitions to state 3 before then if the FIFO queue fills past the high threshold HT.

Consider state 4 in more detail with reference to FIGS. 10A and 10B. When control is passed to block 506, if E1DEQU is in state 4, control moves to block 550, where E1DEQU allows the FIFO queue to fill with data. During block 552, E1DEQU sends the existing spill files, oldest first, to the remote site via the VTAM buffers 102. During block 554 E1DEQU checks the level of the FIFO queue 100. If the FIFO queue is as full as or fuller than the queue high threshold HT, the state is changed to state 3, the co-processing state, at block 556, and control is passed to block 505. If in block 554 the FIFO queue is less full than the high threshold HT, E1DEQU checks the SCOM flag SCOMSPRD at block 558 and the flag SCOMSDT at block 560. If SCOMSPRD is unset and SCOMSDT is set, E1DEQU changes back to the normal state 1, at block 562. If available spill files do exist at block 358 (SCOMSPRD unset), or VTAM communications 64 is not available at block 560 (SCOMSDT unset), E1DEQU stays in state 4 until the FIFO queue fills above threshold HT, and at that point transitions to state 3 going from block 554 to block 556. In either case, control is then passed to block 505.

No new data groups or data group records are created in state 4. If a data group were created in state 4, the previous data group, which would have been created just before entering state 4, would always be empty since no data is ever read from the FIFO queue 100 during state 4.

Spill file handling by E1DEQU completes taking into account the possibility that other programs will create spill files besides E1DEQU such as the gap recovery program. The gap recovery program will be discussed below.

Within broader concepts of the invention, spill files need not be based transmitted to the remote site in a first-in, first-out basis, but could be output in any number of orders. Also, the trigger for the use of a spill file need not be a threshold level. For example, the use of spill files for containing data to be transmitted could be continuous, where any data in the FIFO queue is unconditionally sent to spill files, or where, instead of a threshold level triggering spilling, other indicators, such as the rate of data generation by the E-NET1 exit routine, or any number or combination of other factors.

Referring to FIGS. 10A and 10C if, when E1DEQU is started the SCOMQFUL flag is set, E1DEQU branches at block 503 to block 580. At that point, the SCOMCLQU (meaning "clear queue") flag set on. At block 582, E1DEQU moves the FIFO queue 100 T-records into spill file 93. Each spill file 93 is generally made to be the same size as the FIFO queue, so that this operation will fill exactly one full spill file. After spilling the FIFO queue, SCOMCLQU is set OFF in block 584, SCOMQFUL is set OFF at block 586, and the open gap data group record, which was created by the event that caused the SCOMQFUL flag to be turned on, is closed at block 588 by placing an ending timestamp and setting the "gap established" flag in the SCF 76 record for the gap. At block 590 E1DEQU initiates or "submits" 590 gap recovery for the newly closed gap, and returns to block 505, which is the normal return location for the other E1DEQU operations. As illustrated in FIGS. 10A and 10C, the FIFO queue full processing is independent of the state of E1DEQU.

Submitting is a method known in the art whereby one process initiates another process (by means of JCL), but where the submitted process executes independently of the submitting process, and executes in its own region, on the same mainframe computer or a different mainframe computer in the same complex. The submitting process does not wait for the submitted process to finish, but continues executing after "submitting" a request to the operating system to initiate the submitted process. In the case of E1DEQU submitting the gap recovery process 600 (FIG. 11), E1DEQU continues its own processing while the gap recovery process executes. When the gap recovery process completes, the operating system removes the region which the operating system created for the submitted process.

C. GAP CREATION

A "gap" is defined as a time interval in which an unknown amount of database activity, possibly none, occurred during which E-NET1 was not able to record and store T-records with certainty at the remote mainframe 24. A gap can be characterized as a time span of missing log dataset activity from one of the DBMSs tracked by E-NET1. The time span is characterized by a starting and an ending timestamp. There are several causes of gaps, and each cause may be detected by a different program within E-NET1. The details of each different program are discussed subsequently, however, each program handles gaps in essentially the same manner.

Generally, when a gap is first detected by any program, the detecting program creates a new gap data group record in the SCF 76 (Table 6) for that gap. Some of the fields of the gap data group record are filled in by the detecting program. The fields filled are the data group number (DG#), the starting timestamp (date and time), the DBMS ID and the DG Type flag indicating that the record is for a data group which contains gap data.

Part of the process, by each program, of detecting the gap is estimating the starting time of the missing data gap. Each cause of gaps, as discussed in subsequent detail, requires a slightly different means of estimating the starting time of the gap. Even if the exact starting time of the missing data is known, the time range of the gap is enlarged to ensure that all missing data is recovered.

To this end, the E-NET1 parameters file 87 (FIG. 8) contains a gap interval extender variable GAPINTX, which is in hundredths of seconds, the same as the timestamps. The starting timestamp of a gap in SCF 76 is set to a value earlier in time than the actual beginning time of the loss of data by the amount of the gap interval GAPINTX. For example, if the FIFO queue 100 overflows at 11:45:30.20 and the value of GAPINTX is 100 (see Table 8) indicating a gap interval extender of 1 second, the starting timestamp in the gap data group record is set to 11:45:29.20. This starting timestamp is used by gap recovery programs in that the gap recovery programs will recover a range of data beginning with data created on or after the time 11:45:29.20, thus ensuring that all the missing data is recovered. A gap due to queue overflow begins when the queue is unable to store a T-record, and the gap ends when the queue 100 is again able to receive T-records 51 from the enqueuer 88. If, continuing the example, the queue is restored at 11:47:13.00, the ending timestamp in the SCF gap data group record is set to 11:47:14.00.

Since gaps only occur when something goes wrong with the operation of E-NET1, there is a strong likelihood that the operations started to go wrong a short time before the detectable error occurred. These undetectable error periods can be easily recovered using the gap interval extender variable GAPINTX. Using the gap interval extender variable GAPINTX, some T-records could be duplicated at the remote site, but this is not a problem since DBMS recovery, discussed subsequently, is able to eliminate duplicate T-records.

The data group number for the new gap data group record is found by looking at the data group number (Table 6) of the last data group record in the SCF 76 and assigning the next data group number to the new data group. Since the SCF is ordered by data group, the last record will always have the largest data group number. The DBMS ID field for the gap data group record is determined by the detecting program as discussed below.

A gap could be caused by a) the mainframe 16, MVS 20, or the E-NET1 region 30 unexpectedly losing power or suffering an ABEND causing an unexpected stoppage of E-NET1, b) by the FIFO queue 100 overflowing, or c) by the operator choosing to execute a DBMS which has been configured to run with E-NET1 without having an active E-NET1 region. Note that gap is not created by faulty transmission of data, since the VTAM buffers are sent and resent until confirmed. Gaps are also not created due to the failure of the communications line 53, or any other communications device, since the data will be safely stored in spill files 93 until such time that the contents of the spill files can be sent to the remote site.

A gap due to unexpected stoppage of E-NET1 is detected by the program E1MAIN 94 (FIG. 3) when the system comes back up after the stoppage. As shown in block 204 of the logic diagram of FIG. 5, E1MAIN checks the SCF 76 for any open data group records. If E-NET1 is terminated normally just before E1MAIN is run, all data group records in the SCF will be closed (as defined above) when E1MAIN checks for open data group and DBMS control records at block 507 (FIG. 10A). However, if E-NET1 suffers an unexpected stoppage, E-NET1 would not have had a chance to close the open records, and very probably one or more T-records represented by the open data group record would also be lost.

If an open live or spill data group record (Table 5C) in the SCF 76 exists when E1MAIN starts up, E1MAIN will close the live or spill data group record, and change the status flags of the record to make it a gap data group record. At any given time, only one live or spill data group record is open. This is the record representing the data group that was last being filled. This record is closed by E1MAIN by inserting an ending timestamp equal to the current time.

Briefly, for each open DBMS control record in the SCF 76, E1MAIN closes the open DBMS control record and, as it does so, creates a new gap data group record for that DBMS control record. E1MAIN, in each new data group record, sets the DBMS ID of the new record equal to the DBMS ID field of the DBMS control record, sets the DG Type flag of the new record to indicate a gap, sets the starting timestamp for the new record equal to the starting timestamp of the DBMS control record moved back in time by the gap interval extender time, sets the ending timestamp of the new record to the current time, read from real-time clock 8 (which is some time after the system comes back up) moved forward in time by the gap interval extender time.

Checkpoint file 104 (FIG. 3) is used to minimize the number of T-records retransmitted when processing terminates abnormally and has a) a data group number, b) a sequence number, and c) a timestamp, all relating to the most recently check-pointed successfully transmitted T-record. The checkpoint file can be used to determine approximately how far along T-record transmission was when the system terminated. The data group number and sequence number and timestamp are the same as the T-record that was last successfully sent to the remote site 12. The checkpoint file is updated at regular intervals, as discussed above, and is not updated to reflect the transmission of any one T-record until all T-records prior to it have been received by the remote site. Thus, any gap recovery only need concern T-records generated after T-record indicated by the checkpoint file. To take advantage of this known point, if any gap records need to be created, the starting timestamp can be taken to be no earlier than the checkpoint file timestamp, so that no gap extends further back in time than the timestamp held in the checkpoint file.

Referring to FIG. 3, a gap caused by FIFO queue 100 overflow is detected by the enqueuer program E1QPOR 88. To this end if E1QPOR is unsuccessful in placing a T-record 51, passed from the exit routine 80, onto the FIFO queue 100, the enqueuer sets the SCOMQFUL flag in the SCOM area 98 to indicate that the FIFO queue is presently full. The enqueuer expects that E1DEQU will reset SCOMQFUL, but not before completely emptying the FIFO queue below the low queue threshold percentage (QUETHLO). Without this design feature, the enqueuer might be able to get every other T-record onto the FIFO queue as the FIFO queue is being emptied slowly, but a gap data group and gap data group record in SCF 76 would be created for every other T-record.

When the enqueuer 88 first fails in an attempt to put a T-record onto the FIFO queue 100, the enqueuer sets the SCOMQFUL, which alerts E1DEQU 92, which, when E1DEQU is executed, handles the situation. The exit routine 80 (FIG. 2) that was not able to send data to the enqueuer creates a new open gap data group record. The exit routine 80 fills the appropriate fields of the new gap data group record with the DBMS ID and DBMS type read from the DBMS parameter file 77 for that DBMS, as well as the starting timestamp derived from the rejected T-record, including an adjustment backward in time in the amount of the gap recovery interval. The exit routine 80 also sets the proper flag to indicate that the data group is now a gap data group.

Referring to FIG. 2, a gap can be caused by a DBMS being started without E-NET1 running, if E-NET1 is still not running when the exit routine 80 for that DBMS tries to write a block of data to E-NET1. Specifically, a gap data group record will be created when the exit routine 80 tries to send data to the enqueuer E1QPOR 88 via XMS 48. The exit routine 80 first queries the E-NET1 status flag ECVTACTV stored in ECVT 41 before sending T-record 51, to check if E-NET1 is active. If the E-NET1 ECVTACTV status flag in ECVT 41 indicates that E-NET1 is not active, the exit routine 80 creates a new gap data group record in the SCF 76 if an open gap data group record for the specific DBMS using the exit routine does not already exist.

The new gap data group record (Table 6) has a starting timestamp corresponding, not to the start up of the DBMS, but to the timestamp assigned by the DBMS to the first record in the T-record sought to be transferred. The starting timestamp is actually the time taken from the first record in the T-record adjusted back in time by the amount of the gap interval extender GAPINTX and is stored in the new gap data group record. Also, the DBMS ID field is filled in with the DBMS ID read from the T-record 51 that the exit routine 80 tried to send to E-NET1, and the DBMS type field is read directly from the code of the exit routine, since each type of DBMS requires a different exit routine.

The exit routine creates a gap data group record if it cannot send the T-record to the E-NET1 region even if E-NET1 was active when the DBMS was initiated. For subsequent T-records, a new gap record is not necessary if there is already an open gap data group record.

D. GAP RECOVERY

Briefly, as soon as the full extent of a gap is known, recovery of the missing data can be started. When the extent of the gap is known, the ending timestamp field in the SCF record 76 for that gap is filled in. The starting and ending timestamps define the extent of the gap data group record, and since the starting timestamp is always put in the gap data group record when it is created, gap recovery can be initiated by the same program that "closes" the gap data group record by filling in its ending timestamp field when the end of a gap is detected. The program that detects the end of a gap also sets the "gap established" flag, submits an independent gap recovery process, known in the art as a batch job, and after submitting the job, sets the "gap recovery submitted" flag.

If the gap is caused by the unexpected termination of normal processing, E1RECOV 92a, a subroutine of E1DEQU 92, which detected the gap upon start-up, will set the ending timestamp in the gap data group record to the current time taken from real-time clock 8. The logic of E1RECOV 92a is executed by E1DEQU each time E1DEQU is initially started. If the gap is caused by FIFO queue 100 overflow, E1DEQU 92 will set the ending timestamp to the time when E1DEQU turns off the queue full flag SCOMQFUL after successfully spilling the FIFO queue to spill files. If the gap is caused by a DBMS being used without E-NET1 being active, E1DEQU will also detect these gaps, since E1DEQU is the first program to be run by E1MAIN after E-NET1 is activated. E1DEQU will use the time of detection as the ending timestamp.

In each case, the variable GAPINTX is added to the ending timestamp to make the timestamp later.

Figure 11:
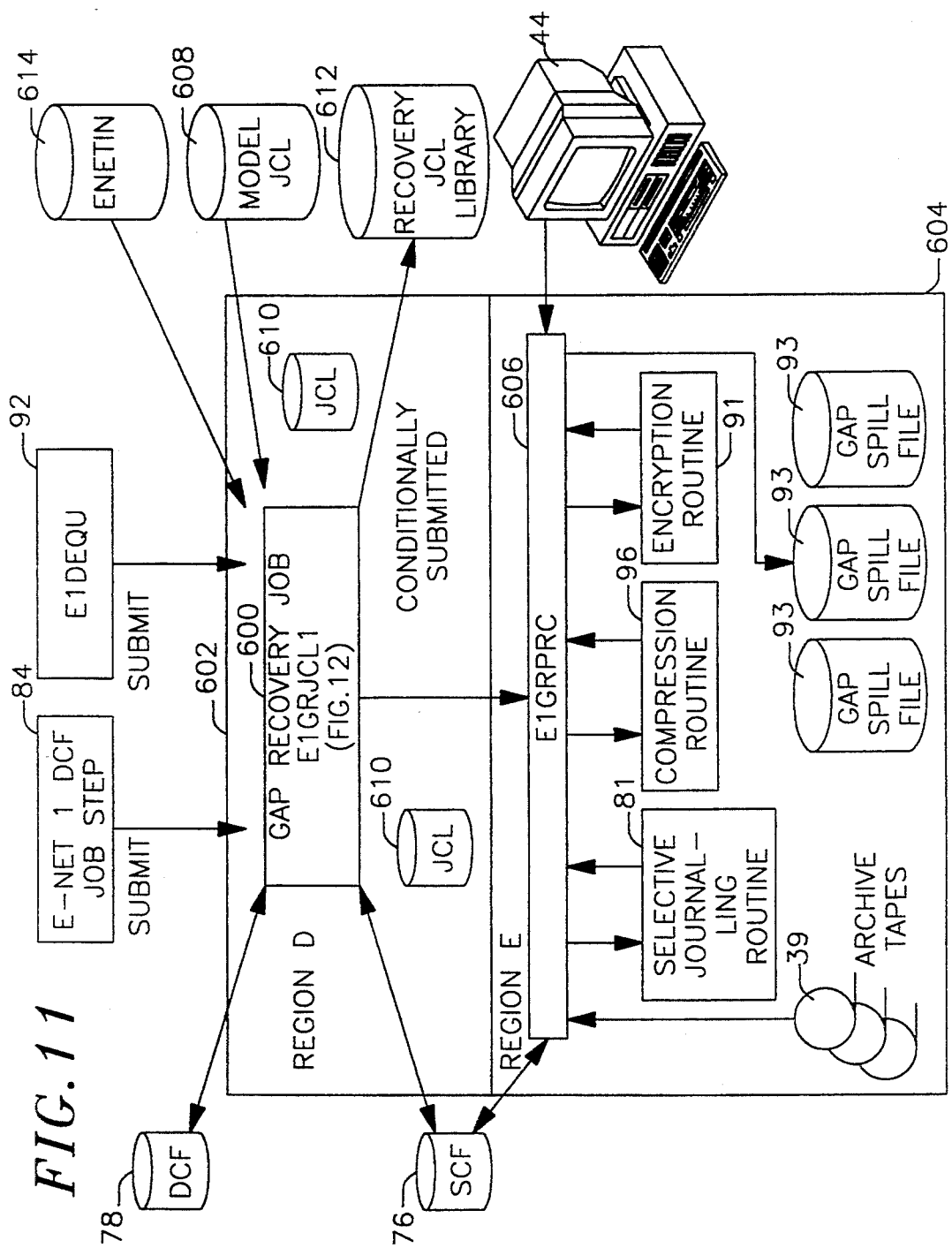
FIG. 11 is a block diagram of the gap recovery region.

Consider the gap recovery in more detail. FIG. 11 is a block diagram illustrating the components used with the gap recovery program E1GRJCL1, and the interconnection among data files. Until a gap data group record is closed, gap recovery cannot begin. A gap data group record is closed by E1RECOV 92a when the gap is caused by a mainframe 16 failure or by E-NET1 not being active when the exit routine 80 tries to pass data to E-NET1. A gap data group record is closed by E1DEQU 92 when the gap is caused by FIFO queue 100 overflow. The program which closes the gap then submits the gap recovery job is E1GRJCL1 600. The gap recovery job 600 runs independent of the program which invoked it, in its own region 602 assigned by MVS 20 as distinguished from Regions A, B, and C. After submitting the gap recovery job 600, the submitting program then sets the "gap recovery submitted" flag in the gap data group record just closed. The gap recovery job 600 in turn submits jobs to one or more copy programs to copy data from tape 39 to disk memory 18, spill file 93, which runs in yet other regions. Although many tape-to-disk copying programs can be submitted simultaneously, only one E region 604, and one tape to disk copying program E1GRPRC 606 is shown, for clarity.

The gap recovery job program E1GRJCL1 600 can also be submitted by the E-NET1 DCF jobstep 84. The jobstep 84 is part of the DBMS log Archive Job 82, which moves data from the log datasets 70, 74 onto tape 39. The DBMS Log Archive Job 82 generally runs in its own F region 27 (FIG. 2). Since E-NET1 waits for data to be written to tape 39 before starting gap recovery with that data, E1GRJCL1 will not always be able to start gap recovery. If the E-NET1 DCF jobstep when invoked by DBMS Log Archive Job 82, detects that the gap recovery program E1GRJCL1 is waiting for the data which has just been written to tape, E-NET1 DCF jobstep 84 will submit the gap recovery job E1GRJCL1 600 after the data is written to disk memory 18.

The purpose of E1GRJCL1 600 is to create JCL files from the information stored in the DCF 78 and the SCF 76 (FIG. 2). These JCL files are operated upon by the mainframe as discussed previously and as known in the art. The model JCL file 608 is created when E-NET1 is first installed and contains a model of what a JCL file created by E1GRJCL1 should look like. The JCL file 610 contains the instructions to perform the processes shown in E Region in FIG. 11. Once E1GRJCL1 600 creates the JCL file 610, it is stored in the recovery JCL library 612. The JCL file 610 is also optionally submitted as a job for processing by MVS 20. The option selection will be discussed subsequently. Regardless of whether the job is submitted as soon as it is created or if it is stored for later submission, the JCL file 610 is stored to the library 612 in case the mainframe aborts while the recovery job is running.

When the JCL file 610 is submitted, MVS 20 creates the gap recovery processing job E1GRPRC 606. A gap data group will be read from tapes 39, from locations determined by the DCF 78 (FIG. 2). The JCL file 610 contains a timestamp range, which is used to indicate the range of data to be read from tapes 39. Knowing the timestamp range, the location of data can be read from the records in DCF 78 corresponding to the timestamp range. The data read from the tape 39 is passed through three filters and there is written to a gap spill file 93. The first filter is the selective journalling routine 81 which is supplied by the user of E-NET1. This routine 81 is the same routine as used by the exit routine 80 in deciding which records to send to the enqueuer 88. This routine 81 eliminates records which the user has decided do not need the protection of E-NET1. The second filter is the compression routine 96, and the third filter is the user-supplied encryption routine 91. The purpose of the three filters is to get the data to be written into the gap spill file to be in the same format as if the data had been placed in the spill file through normal operations without gap recovery. The details of these routines are discussed previously, along with the discussion of normal operation of E-NET1 (Section III A).

E1GRPRC 606 is one example of a JCL file submission. E1GRPRC is started when E1GRJCL1 submits one of the JCL files stored in the library 612, and E1GRPRC will recover one gap data group. E1GRPRC 606 is submitted by E1GRJCL1 600 or by manual submission via an operator command from the console 44. The user-created file ENETIN 614 contains a line indicating the value of the variable SUBMJCL (TABLE 13) which E1GRJCL1 uses to determine whether or not to submit E1GRPRC. If SUBMJCL is "Y" E1GRPRC is submitted. If SUBMJCL is "N" E1GRPRC is not submitted. If SUBMJCL is "W" the operator is prompted at console 44 to decide whether or not to submit the job, and the operator's response is used to determine if E1GRPRC is submitted.

Figure 12:
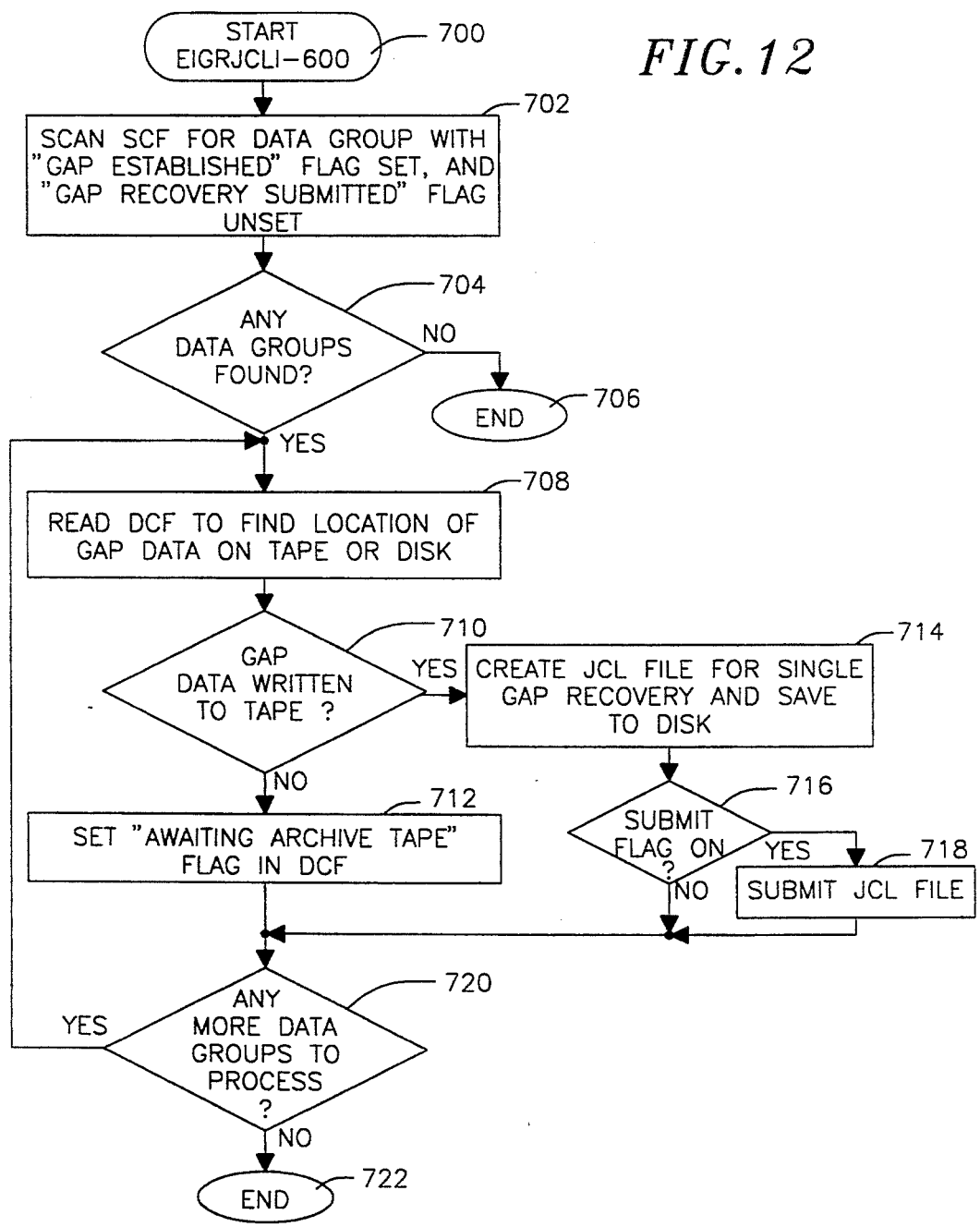
FIGS. 12 and 13 are logic flow diagrams showing the operation of the gap recovery programs.

FIG. 12 depicts the logic flow of the gap recovery program E1GRJCL1 600. The flow 700 begins when the program is submitted and MVS sets up a region in which the program will run. The first thing E1GRJCL1 does, in block 702, is to scan the SCF 76 for any data group records with the "gap established" flag (TABLE 5C, 6) set, indicating that the gap data group record has been closed, and the "gap recovery submitted" flag unset, indicating that gap recovery has yet to be done on this data group. The "gap established" flag is set by whichever program discovers the gap.

If no data groups are found needing to be recovered, i.e., no data group records in SCF 76 the flags set as mentioned above indicating the need for gap recovery, in block 704, E1GRJCL1 terminates at 706. If any data groups are found needing to be recovered, E1GRJCL1 moves to block 708 and tries to recover data one gap data group at a time, starting with the first gap found. At block 708, E1GRJCL1 reads the DCF 78 to determine if the data in the gap being recovered has been written to tape. If at block 710 the data from the gap has not yet been written to tape, E1GRJCL1 proceeds to block 712, and sets a flag in the DCF 78 record for the gap indicating that gap recovery is waiting for the data to be written to tape. The E-NET1 DCF jobstep 84 resubmits E1GRJCL1 for the gap data groups which have this flag set, after the data is written to tape and the tape location is written to the DCF 78.

If the data is already written to tape, E1GRJCL1 proceeds to block 714 and creates the JCL file 610 which is used later to move data from a specified location on tape 39 to a specified gap spill file 93. E1GRJCL1 also writes the JCL file 610 to the recovery JCL library 612. Then at block 716 E1GRJCL1 checks the value of the variable SUBMJCL in the file ENETIN 614. If SUBMJCL is "Y," or is "W," and the operator requests the job to be submitted, the job is submitted, at block 718.

Control then passes to block 720, where E1GRJCL1 checks to see if there are any more gap data groups to process. If there are, E1GRJCL1 moves to block 708 to repeat the process. If there aren't any more gap data groups to process, control passes to block 722, and E1GRJCL1 terminates.

The DCF 78 (Table 3) contains records showing where data is stored on tapes 39. Each record in the DCF 78 contains the location of data for a specific range of time and a specific DBMS. The range of time and DBMS are stored with each record. Since a gap data group record in SCF 76 contains a DBMS ID field and starting and ending timestamps (Table 5C, 6), the DCF record, and therefore the location on tape 39, can be found for any given gap data group which has a corresponding record in SCF 76.

In block 714 (FIG. 12), E1GRJCL1 reads the gap data group record for the gap to be recovered. E1GRJCL1 reads the starting and ending timestamps and the DBMS ID from the gap data group record and reads the DCF 78 to find the DCF records which correspond to the data to be recovered. This correspondence is found by comparing the timestamps and DBMS ID from the gap data group record in the SCF 76 to the timestamps and DBMS ID in the DCF 78. When the corresponding DCF 78 records are found, the location of the gap data group data is read from the Tape File Sequence # field and the Dataset Name field. The Tape File Sequence # and Dataset Name are written to JCL file 610, for later submission to MVS 20 for processing. E1GRJCL1 also reads the Spill Dataset Name Prefix from the E-NET1 parameters file 87 (Table 8), and concatenates this prefix to the gap data group number to form the gap spill file name. This spill file name is written to Spill File name field of the data group record (Table 5C), and is also written to the JCL file 610.

Figure 13:
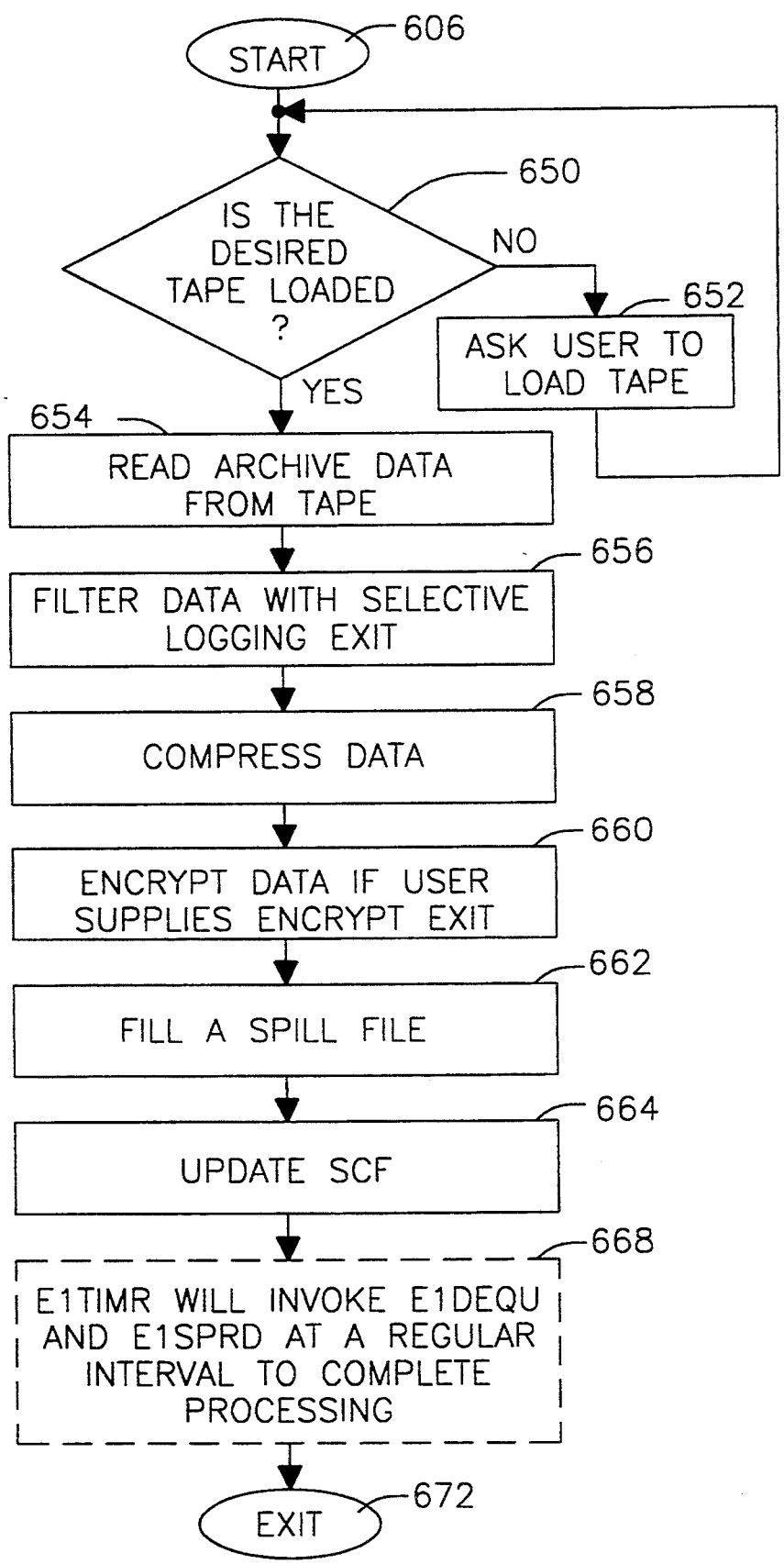

FIG. 13 depicts the logic flow of E1GRPRC 606. E1GRPRC 606 is executed by MVS 20 when JCL file 610 is submitted E1GRJCL1 600. The purpose of E1GRPRC 606 is to read data from tapes 39 and into a gap spill file 93, so that the gap data which was lost due to the gap can be sent to the remote site by storing it to a gap spill file which is subsequently transmitted to the remote site by E1SPRD.

At block 650, E1GRPRC queries tape drive 46 (FIG. 1) as to the tape 39 currently loaded in tape drive 46. If the tape specified by JCL file 610 is not loaded, at block 652 a message is sent to console 44a to request that the operator load to correct tape 39 into tape drive 46, and the tape drive 46 is again queried at block 650. If the correct tape is loaded, the contents of tape 39 are read at block 654 and the data within the timestamp range specified by JCL file 610 is moved from tape to disk memory 18. Unwanted data is removed from the read data at block 656 by the selective journalling routine 81 (FIG. 11). The data is then, at block 658, compressed by compression routine 96 (FIG. 11). At block 660, the data is encrypted by encryption routine 91 (FIG. 11) if the routine is supplied by the user.

The data thus processed is written at block 662 to a gap spill file 93 (FIG. 11). The gap spill file name is specified by the JCL file 610 which was used to initiate E1GRPRC 606. At block 664, E1GRPRC updates the SCF 76, specifically the gap data group record, by setting the "gap recovery complete" flag (Table 5C, 6).

The final step in gap recovery, shown logically as block 668, is for the newly created gap spill file contents to be transmitted to the remote site. This is not done by the gap recovery programs but is done by E1DEQU 92 and E1SPRD 95 (FIG. 3). E1TIMR 99, at regular intervals determined by logic internal to E1TIMR, will initiate the queue handler program E1DEQU 92, which will scan the SCF 76 and find any gap data group records that have a set "gap recovery complete" flag, but an unset "successful transmission" flag. The "successful transmission" flag is set by E1TRAN after sending the T-records in the data group to the remote site. If any gap data group records are found meeting the above criterion, the associated gap spill file then processed as an normal spill file as described in FIG. 10. At block 672, E1GRPRC terminates and control is passed back to MVS 20, which removes E region 604 (FIG. 11).

Within the broader concepts of the invention, if the volume of gap data to be recovered is quite large, as in cases where a problem causing a gap persisted for a very long period of time, or if a user has specialized requirements, the gap data could be physically transported to the remote site, rather than transmitting it electronically. Once physically transported to the remote site, the user could then load the gap data into the remote mainframe for normal processing as described herein.

E. DBMS RECOVERY

The goal of the DBMS recovery programs of E-NET1 is to convert the stored E-NET1 data at the remote site into log datasets. Log dataset stored at 74 of FIG. 1 can be recreated from the T-records 51 stored at the remote site 12 on tapes 61. The T-records cannot simply be copied from tape to disk for two reasons. The T-records, to increase communications throughput and security, have been compressed and possibly encrypted, and these transformations need to be reversed. Also, the tapes 61 may contain duplicate T-records in cases where T-records were received but not confirmed by the remote site, and subsequently retransmitted in a different data group. These duplicate T-records need to be removed from the recovered data.

Figure 14:
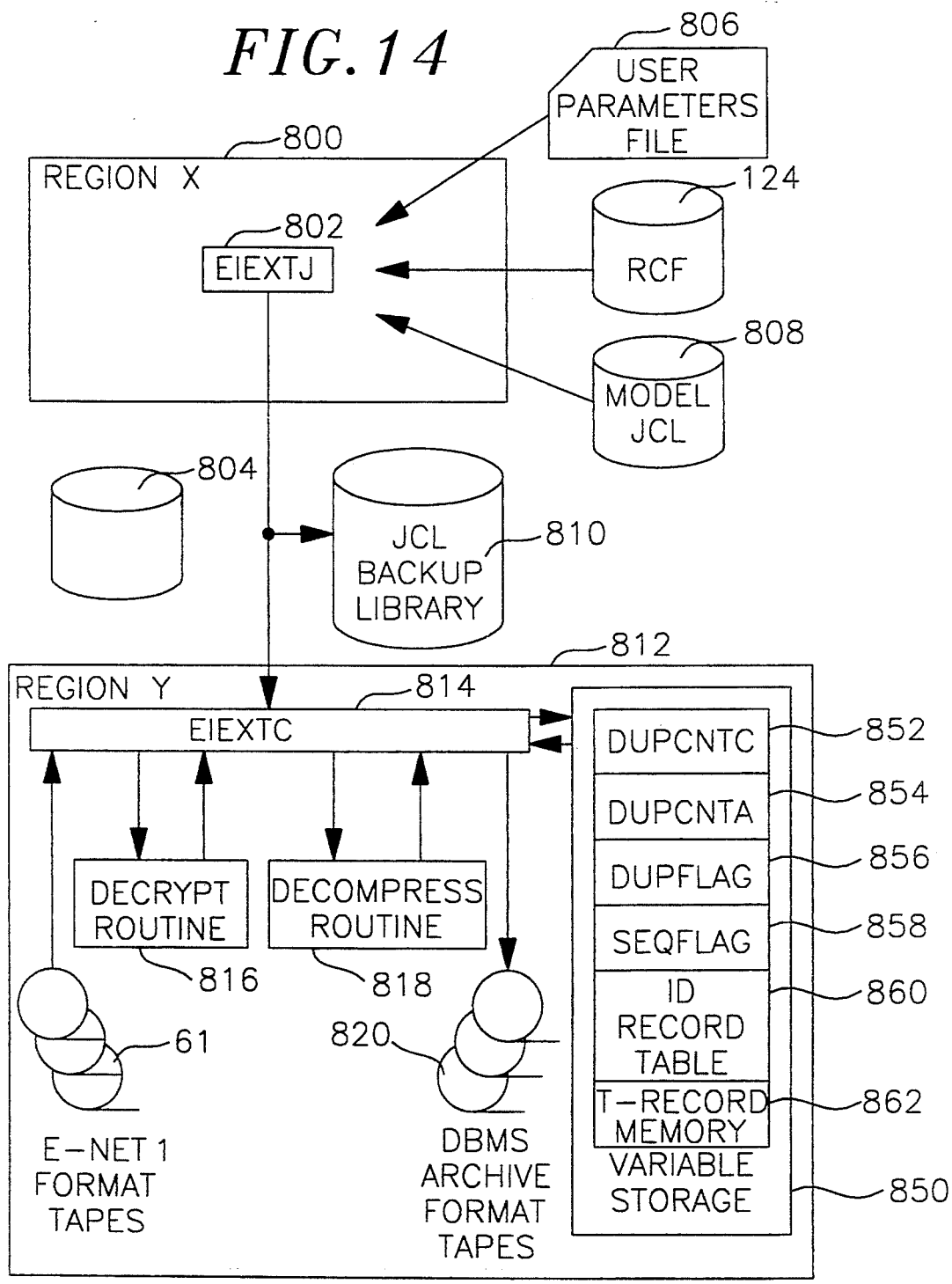
FIG. 14 is a block diagram of the recovery process.

FIG. 14 shows the DBMS recovery programs which are run on the mainframe at the remote site shown in FIG. 1. The recovery process is initiated by an operator at the console 44 (FIG. 1) by requesting that MVS 20 open a new X region 800 and initiate the program E1EXTJ 802. E1EXTJ 802 creates JCL files 804 which, when run, extract and reformat data from tapes 61 to DBMS archive format tapes 820. The operating parameters for E1EXTJ, such as the location of the desired T-records 51 on tapes 61, are determined by the contents of the RCF 124 and the user parameters file 806. E1EXTJ uses a model JCL file 808 as a template, and after modifying the JCL file 808 based on the contents of the user parameters file 806 and the contents of the RCF 124, E1EXTJ places a copy of the JCL file 804 in the backup JCL library 810. This library can be the same type of library as is used for the gap recovery JCL files, shown in FIG. 11 as library 612. The embodiment depicted in FIG. 14 uses a separate file to contain the user parameters, namely the user parameters file 806. An alternate embodiment would contain the user parameters within the JCL file used by MVS to initiate E1EXTJ. If and when the JCL file 804 is submitted, the operating system, MVS 20, initiates a new process in a new Y region 812. The new process 814 is called E1EXTC, E1EXTD, or E1EXTI, depending on the source DBMS listed in the parameters file 806. Variable storage 850 is used by E1EXTC 814 when performing the logic flow depicted in FIG. 15, discussed below.

Table 11 shows an example of the user parameters file 806. The DBMSORG variable (Table 11, line 1) indicates that the source of the data is CICS. The type of the source DBMS is used to determine which program to use to convert the data from tapes 61 to DBMS archive format tapes 820, as each DBMS requires a different conversion program The SUBMJCL variable is "Y", "N", or "W". In the example, "Y" is the value, indicating that once the JCL file 804 is created, the JCL file will be submitted. If the variable SUBMJCL were "N", the JCL file would not be submitted. If the variable SUBMJCL where "W", the operator would be prompted via the console 44 to choose whether or not the JCL file 804 should be submitted. The starting and ending dates (STARTDT, ENDDATE) and times (STARTIM, ENDTIME) are used by E1EXTJ to determine the range of extraction from tapes 61. It is likely that the tapes 61 used by E1EXTC 814 will contain data that is beyond the range of interest. The range of interest is usually from the time when the latest full image backup was made to the present. A tape 61 could have log data pre-dating before the latest image backup. The particular model JCL file 808 that is used to create E1EXTC is determined by the variable MODLJCL. In the example shown in Table 11 and FIG. 14, the source of the data is a CICS database, so the submitted job 814 is named E1EXTC.

E1EXTJ 802 reads the RCF 124 to get the location of the data range on tapes 61 specified by the starting and ending date and time variables in the user parameters file 806. The created JCL file 804 contains instructions indicating the location of the data on tapes 61, the type of DBMS used, and the range to be extracted.

Figure 15A:
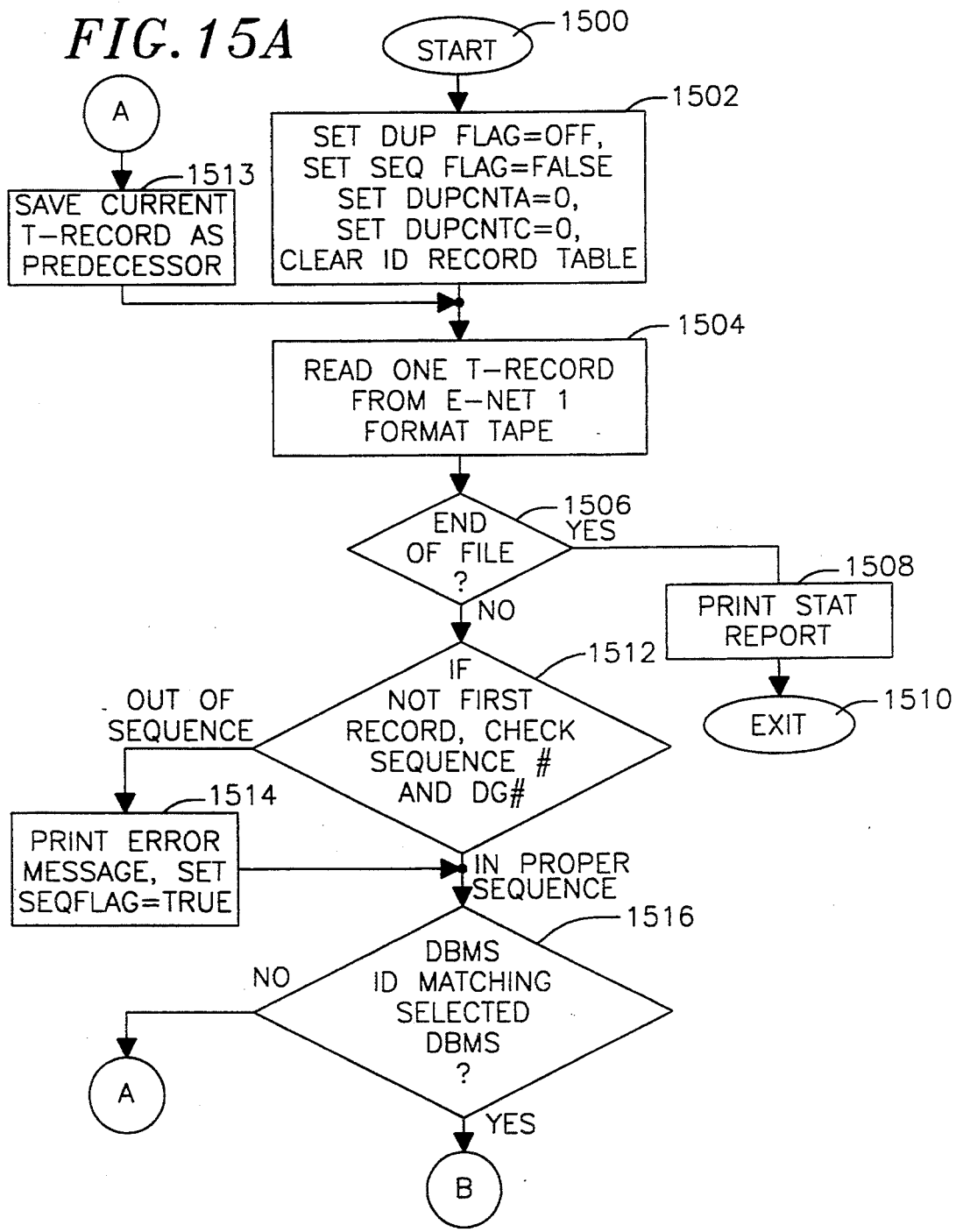
FIGS. 15A and 15B are a logic flow diagram (in parts A, B) showing the flow of the DBMS recovery program E1EXTC.
Figure 15B:
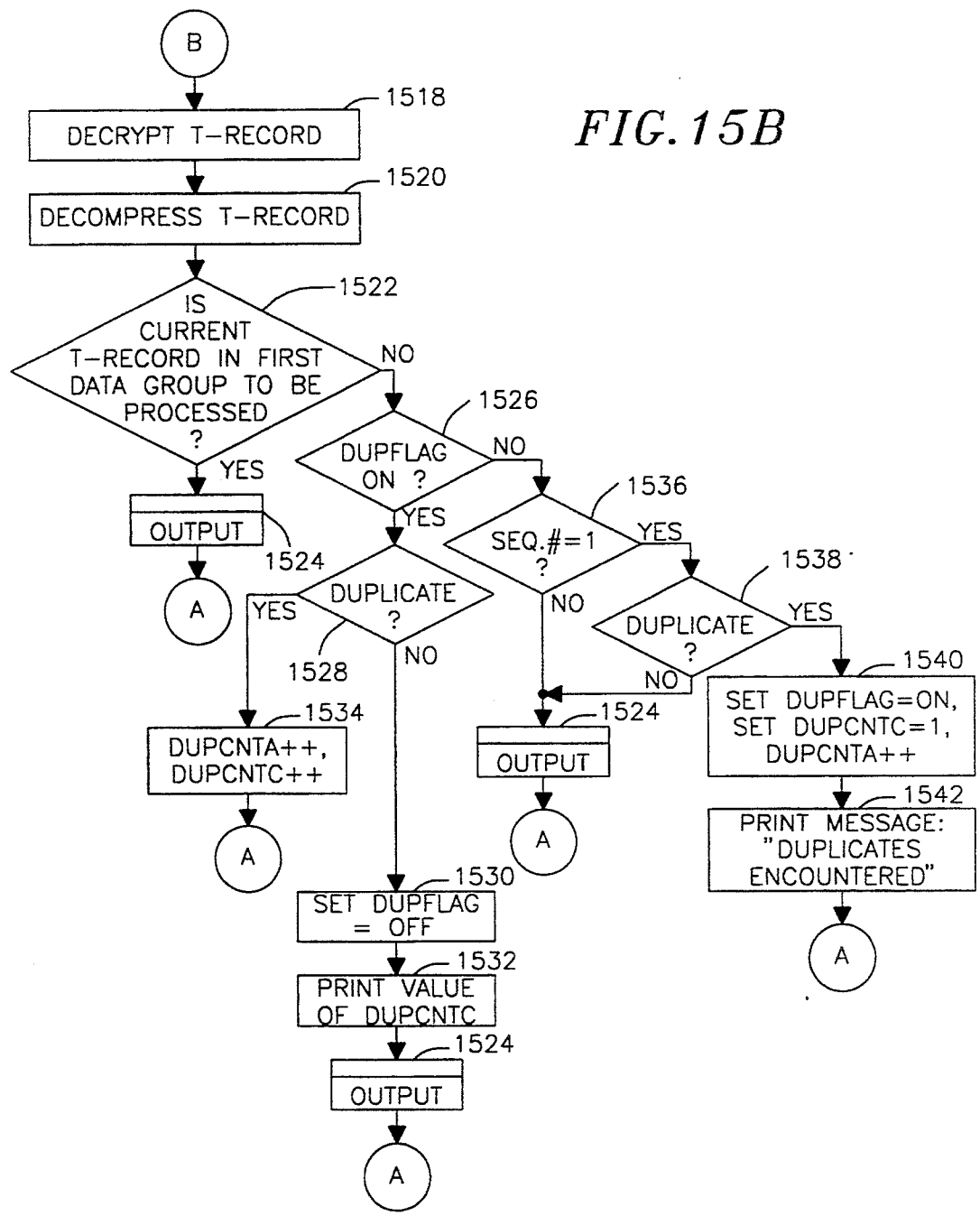

FIG. 15 (including FIG. 15A and 15B) depicts the logic flow of the program E1EXTC, which is essentially the same as E1EXTD and E1EXTI. The flow starts at block 1500, when E1EXTC is invoked by E1EXTJ, or by the operator invoking E1EXTC using the JCL file 804 stored in the JCL backup library 810. E1EXTC then proceeds to block 1502, where E1EXTC initializes the internal variables stored in variable storage 850 (FIG. 14). The internal variables (depicted in FIG. 14) are: DUPCNTC 852, which is initially set to 0, and keeps a count of the number of duplicate T-records 51 found in the current data group; DUPCNTA 854, which is initially set to 0, and keeps a count of the accumulated number of duplicate T-records 51 found; DUPFLAG 856, which is initially set to OFF, and is used to control the flow of E1EXTC; SEQFLAG 858, which is initially set to false, and is used to indicate if any T-records 51 have been read out of order from tapes 61; and the ID Record Table 860, which is initially cleared of all its entries; and T-record Memory 862, which is initially cleared.

E1EXTC then, at block 1504, reads one T-record 51 from the tape 61 containing E-NET1 formatted change log data. All of the processing steps described subsequently loop back to this step eventually. If during block 1506 a T-record 51 cannot be read because all the T-records to the end of the file have been read, E1EXTC terminates. Before terminating, E1EXTC, during block 1508 prints a status report showing the total number of duplicate T-records found, DUPCNTA 854 and the value of SEQFLAG 858, and exits at block 1510.

If E1EXTC can read another T-record, control instead passes to block 1512, where the current T-record 51 is checked against its predecessor T-record, which is stored in T-record Memory 862 (FIG. 14) to check if the current T-record is in proper sequence with respect to its predecessor. Proper sequence is defined by the data group number and sequence number of the two T-records. Except for the first T-record in a data group, each T-record in a data group must have the same data group number as its predecessor and a sequence number that is one higher than the sequence number of its predecessor. The first T-record of a data group must have a sequence number of 1 and a data group number one larger than its predecessor T-record. An example of a correct series of T-records is (data group#-sequence#: 1-1, 1-2, 1-3, 1-4, 2-1, 2-2, 2-3, 2-4, 2-5). If any T-record is out of order, an error message is printed at block 1514, and SEQFLAG 858 is set to indicate that the input T-records were out of sequence and E1EXTC continues but the output T-records are not likely to be usable, since forward recovery generally requires every T-record in order to be reliable.

When invoked, E1EXTC (FIG. 14) requires a parameter to indicate which DBMS is being recovered. In the example T-record 51 (FIG. 8), the DBMS ID 308 field is "COO1". At block 1516, this field is checked against the parameter supplied initially to E1EXTC by E1EXTJ 802 and the user parameters file 806 (FIG. 14, Table 11). If E1EXTC is used to recover the data for the DBMS identified as "COO1" the T-record shown in FIG. 8 is processed and T-records with other values in the DBMS ID field are not processed. At this point, control passes back to the portion of the program that reads the next record (point A). The DBMS ID field identifies the label given by the user to the DBMS that originally created the data. The first character, "C", identifies the T-record as being from a CICS DBMS.

Referring again to FIG. 15A, if the current T-record is not for the desired DBMS, control passes back to point A, and at block 1513, the current T-record is saved in T-record Memory 862, to become the predecessor T-record for the next T-record read. Point A is the point to where all logic flow beyond block 1512 returns.

If the current T-record has the desired DBMS ID, the data field 49 of the T-record is decrypted at block 1518 (FIG. 15B). Block 1518 is performed only if the user has attached its decrypt exit routine 816 (FIG. 14). For this recovery process to yield useful results, the decrypt routine 816 must convert the input T-record 51 data field 49 (FIG. 8) into the data field 49 as it was before it was encrypted by the encryption exit routine 91. Generally, if the data field 49 was not encrypted, the decryption routine is not needed. Once decrypted, the T-record data field 49 is then decompressed at block 1520.

If the current T-record 51 is in the first data group to be processed, it cannot be a duplicate of anything, since two T-records in the same data group cannot be duplicates of each other and no other data groups have been processed. If this is the case at block 1522, the output routine 1524 is called, and E1EXTC jumps to point A. The details of the output routine block 1524 are discussed subsequently and in connection with FIG. 16.

If the current T-record is not in the first data group to be processed, control passes to block 1526, and the DUPFLAG 856 is checked. If DUPFLAG is ON, it indicates that the predecessor T-record 51 stored in T-record Memory 862 is a duplicate of a T-record read earlier. Due to the methods of creating duplicate T-records, if a T-record is not a duplicate of an earlier T-record, all later records in the same data group are not duplicates of any earlier T-records either.

An example of the creation of duplicate T-records shows why this is so. Duplicate T-records only occur when E-NET1 fails, for whatever reason, to send a T-record to the remote site without receiving a confirmation, when in fact the T-record was received. Since any such failure leads to a question of continuity of T-records, E-NET1 creates a new data group after detecting such a failure. If several T-records 51 in data group 1 are sent to remote site 12, recorded to tapes 61, but confirmation of this fact was not received by central site 10, E-NET1 would, at that point, create a new data group, i.e. data group 2. The first T-records of data group number 2 are the last T-records of data group number 1 which did not get confirmed. These T-records are sent again to remote site 12, but in a different data group, thereby causing duplicate T-records to be stored on tapes 61. After the duplicate T-records are sent, subsequent T-records, created later than the duplicated data and with higher sequence numbers, but the same data group number, namely 2, are sent to remote site 12 to be stored on tape 61. Significantly, the later T-records are not duplicates of any earlier T-records, and any T-records following a unique T-record in the same data group will not be duplicates of any earlier T-records, since once the T-records are again being received without error from the central site 10, E-NET1 will not duplicate any T-records without first creating a new data group. By this logic, if DUPFLAG 856 is set to OFF, indicating that the predecessor T-record stored in T-record Memory 862 was not a duplicate of any earlier T-record, then the current T-record cannot be a duplicate if it is not the first T-record in the data group.

Referring back to FIG. 14, the ID Record Table 860 consists of multiple entries of ID records. The entries consist of data identifying the contents of the data field 49 of each T-record 51 processed by E1EXTC. The table is initially empty. As each T-record 51 is read from tapes 61, decrypted and decompressed, E1EXTC scans the data field 49 of the T-record 51 for data patterns that are unique to that particular data field. The format of these data patterns is discussed below. The data pattern is stored as an entry in the ID Record Table 860. One embodiment of this table contains space for 50,000 such data patterns, and after 50,000 T-records are processed, the data pattern for the oldest T-record is deleted to make space for the data pattern for the newest T-record. The user of E-NET1 is free to select the size of this table for optimum resource usage and performance.

The ID Record Table 860 is used in the detection of duplicate T-records. While a T-record can normally be uniquely identified by its data group number and sequence number, data fields 49 cannot be identified uniquely by data group number and sequence number, since the very same data field 49 may appear in more than one T-record and thus have more than one data group number and sequence number. Since any given data field 49 of a T-record 51 will have a unique data pattern, the data pattern uniquely identifies the data field 49.

The format of the data pattern, and thus the ID Record Table entry, varies for each different DBMS. For CICS, the data patterns consist of data known in the art as "8045 label records". For IMS, the data patterns consist of data known in the art as "4303 records". For IDMS, the data patterns consist of data known in the art as "TIME records". The actual form or nomenclature of these data patterns is unimportant. Significantly, a data pattern, which is imbedded in the data field of a T-record, originally created by the DBMS itself, serves to uniquely identify the data field, regardless of its data group number or sequence number. Some DBMSs will require a combination of several data from the data field 49 to make up a unique data pattern.

Referring back to FIG. 15B, if DUPFLAG 856 is ON at block 1526, control passes to block 1536, otherwise control passes 1528. At block 1536, if the sequence number field of the current T-record is 1, control passes to block 1538, otherwise control passes to block 1524 and then back to point A.

At blocks 1528 and 1538 the current T-record is checked against the ID Record Table 860 to see if the data field 49 of the current T-record is a duplicate of any earlier read T-records. To do this, E1EXTC reads the data pattern from the data field 49 of the current T-record, and scans the ID Record Table 860 for an entry having the same data pattern.

If an entry was found in the ID Record Table matching the data pattern of the T-record immediately previous to the current record, the search for the data pattern of the current T-record starts at the entry in the ID Record Table 860 where such matching data pattern was found, since any duplicate of the current T-record must have been received after a duplicate of the T-record which came before the current T-record.

At block 1528, if the current T-record is unique, control passes to block 1530, where DUPFLAG is set to OFF, and the value of DUPCNTC 852, the number of duplicates found in the current data group, is printed at block 1532. Since no other T-records 51 in the current data group can be duplicates, the number of duplicates in the current data group is known at this point. The non-duplicated T-record is then output at block 1524 and E1EXTC jumps to point A. However at block 1528, if the data pattern of the current T-record is found in the ID Record Table 860, control passes to block 1534, DUPCNTC 852 and DUPCNTA 854 are incremented, and E1EXTC jumps to point A, without outputting the duplicate T-record.

If DUPFLAG 856 was set to ON at block 1526, the sequence number field 312 (FIG. 8) of the current T-record is checked at block 1536. If the sequence number is not 1, the current T-record does not need to be checked for duplication (as explained above), so the current T-record is output at block 1524 and E1EXTC jumps to point A. If the sequence number is 1, indicating the first T-record in the data group, control passes to block 1538. There, the data pattern of the data field 49 of the current T-record is checked against the entries in the ID Record Table 860 for duplicate data patterns, as described previously. If the current T-record is not a duplicate of an earlier T-record, the current T-record is output 1524 and E1EXTC jumps to point A.

At block 1538, if the current T-record, being the first record of a data group, is a duplicate, control is passed to block 1540, where DUPFLAG is set ON, DUPCNTC (number of duplicates in the current data group) is set to 1, and DUPCNTA is incremented by one. Then, at block 1542, message indicating the found duplicate is printed, and E1EXTC jumps to point A. If the current T-record is not a duplicate of an earlier T-record, the output routine 1524 is called before E1EXTC jumps to point A.

Figure 16:
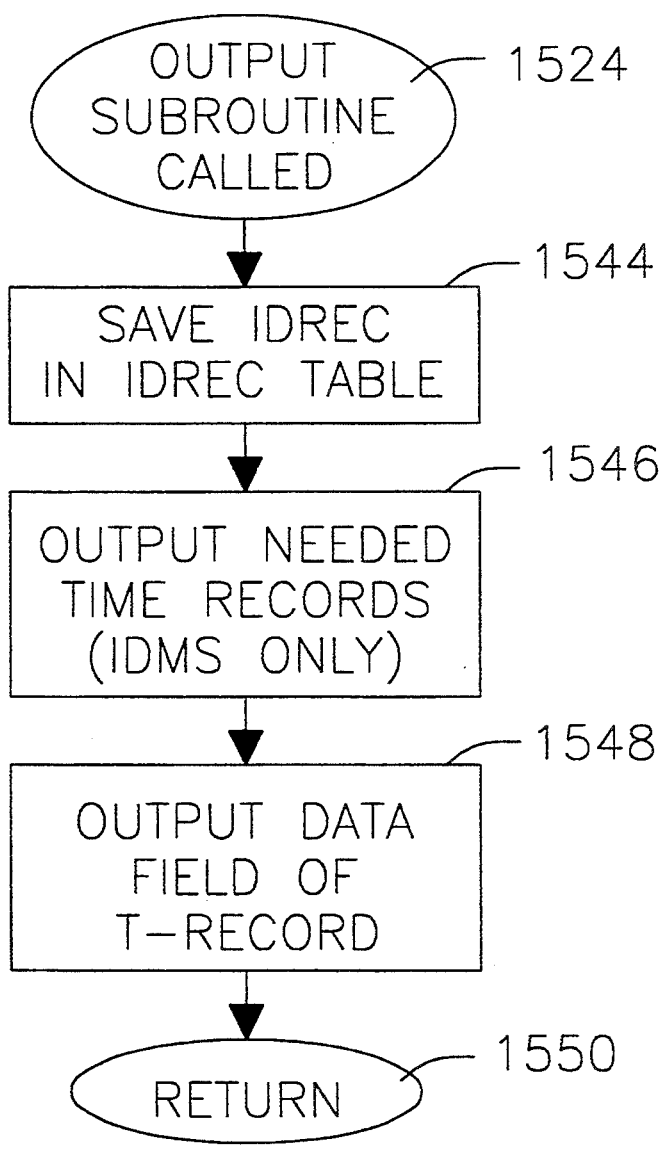
FIG. 16 is a logic flow diagram of the T-record output routine.

FIG. 16 is a flow diagram of the output routine 1524. This output routine does not output T-records, which are the E-NET1 format for data storage, but outputs the data contained in the data fields 49 of the T-records, in the format normally expected by the selected DBMS. Once a T-record is determined to be a unique record from the selected DBMS, the data pattern from the data field 49 of the T-record is saved as an entry in the ID Record Table 860 at block 1544.

Block 1546 is only used with IDMS (while running E1EXTI). IDMS tracks its log data with a sequential record number. Some of the records originally created by IDMS might not have been sent through the E-NET1 system due to the selective journalling exit 81 (discussed previously), resulting in log data which appears to the IDMS forward recovery program (explained in connection with FIG. 18) to have portions missing. To avoid this, dummy records are output with the proper sequential record numbers. These extra records are "TIME records" which only mark time and do not affect the output of the forward recovery program. To determine how many dummy records to output, E1EXTI compares the IDMS sequential record numbers in T-record saved in the T-record Memory 862 (FIG. 14) and in the current T-record.

During block 1548 of the output routine 1524, data is output from the data field 49 of the current T-record 51, in the proper format for the selected DBMS, exactly as if the journalling routine 66 had originally written the log data to log dataset 74, log data which in turn would have been written to archive tapes 39. Control then returns at block 1550 to the calling program.

The end result of this recovery process is DBMS archive tapes in the format of the selected DBMS as if the tapes were the original DBMS archive format tapes 39 created by the DBMS Log Archive Job 82.

F. EXAMPLE OF SPILL FILE USAGE

FIGS. 17A through 17H show an example of using spill files to prevent loss of data during a break in the communications link. At the left of each figure, the real-time clock 8 is shown to indicate the passage of time and to show the source of the timestamps in the SCF and RCF.

Figure 17A:
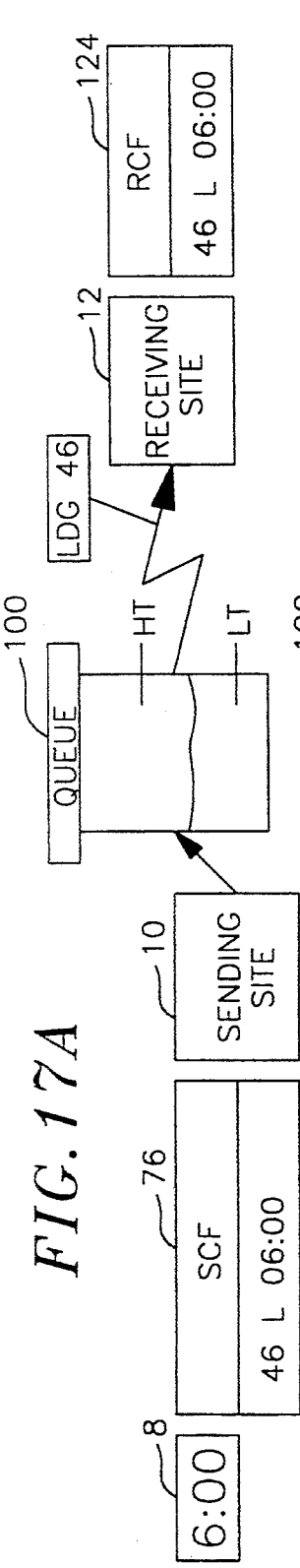

FIG. 17A shows the state of the queue handler 92 at 6:00 am. The actual time is not relevant, but is shown to indicate the passage of time. In the example, E-NET1 was started at 6:00, at which time communication between sites is occurring, indicated by an arrow between queue 100 and receiving site 12. When E-NET1 starts, a new data group is assigned, data group 46. The last time E-NET1 was active, in this example, E-NET1 was using data group 45.

Since communication is occurring, T-records can be moved from the queue 100 to the receiving site 12, where the data is stored to disk, and logged into the RCF 124. In the SCF data group record 46, the "L" indicates that the Live Data Group flag is set to indicate that the T-record did not derive from a spill file, but came directly from the queue. The queue handler is at this point in state 1, and will stay in this state until a problem occurs with the communication line or the queue.

Figure 17B:
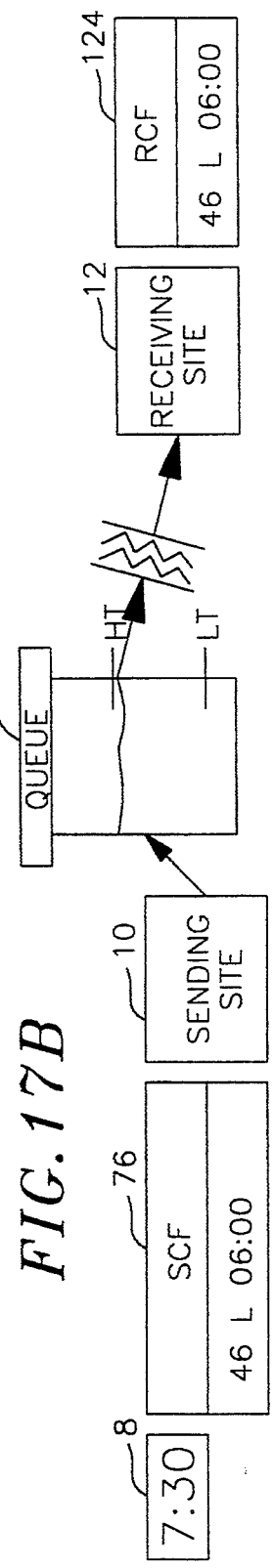

FIG. 17B depicts the loss of communications at 7:30. While T-records are being created at the central site (sending site), the T-records are placed onto the queue. If T-records are sent to the receiving site, no T-records are removed from the queue and the queue will eventually fill past the queue high threshold QUETHHI, which is the event that triggers the opening of a spill file. The queue handler at this point is still in state 1, but will not remain in state 1 if the queue fills past the threshold.

Figure 17C:
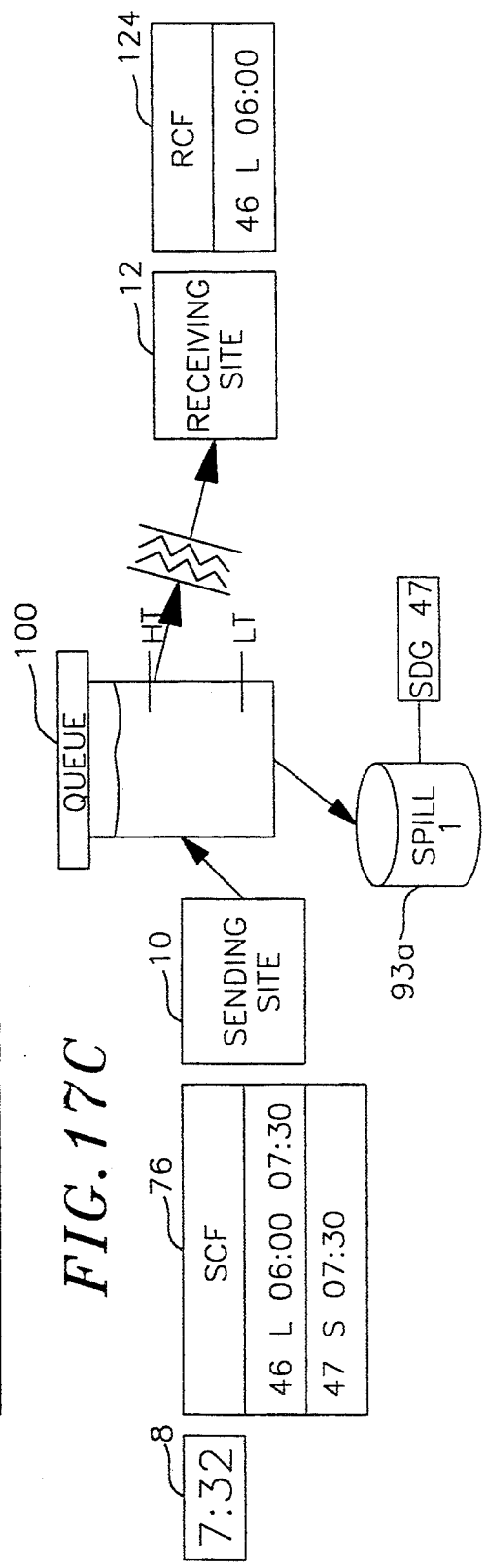

FIG. 17C depicts the queue filling past the queue high threshold at 7:32. Since the last T-record successfully sent to the remote (receiving) site 12 was sent at 7:30, just before the break in communications, data group 46 is closed with an ending timestamp of 7:30, and a new data group record in SCF 76 and data group 47 is created. A spill file 93a is created, and all T-records that have not been sent and confirmed as part of data group 46 are moved into the file. All of the T-records in spill file 93a are part of data group 47. Some of the T-records that were part of data group 46 are now in data group 47. Some of the T-records that are in both data groups were sent but not confirmed, and these T-records will appear at the receiving site twice, once under each data group. This will not be a problem, since duplicated T-records will be filtered out during DBMS recovery, if recovery is done. The receiving site has not yet updated the RCF to show the end timestamp of data group 46, since the fact that the group has been closed cannot be communicated to the receiving site. A new record in the SCF is shown for data group 47. The Spill Data Group flag is set for this record, indicated by an "S" in FIG. 17C. Eventually, spill file 93a will be filled with data from the queue 100. The queue handler 92, at this point, is in state 2.

FIG. 17D shows the creation of a second spill file at 7:34. The break in communications still exists. Spill file 93a, containing data group 47, has been closed, and spill file 93b has been created. The last T-record in data group 47 was written at 7:34, so the SCF T-record for data group 47 is closed with an ending timestamp of 7:34, and a new data group, 48, is opened with a starting timestamp of 7:34. Data group record 48 is also created in the SCF 76. The Spill Data Group flag is set in the data group record for data group 48 in SCF 76. The queue handler 92 at this point is still in state 2, and will stay in this state until communications are re-established.

FIG. 17E shows the re-establishment of communications between sites at 7:38. Before sending any data across the link, the current data group, 48, is closed by giving the SCF data group record 48 an ending timestamp of 7:38, and creating a new SCF record for live data group 49. Before sending the first T-record of a data group, E1TRAN 97 (FIG. 3) sends a data group header T-record. A data group header T-record is identified as such by having 10 H (hex) in its Record Type field 304 (FIG. 8). A data group header T-record does not contain data in its data field 49. The data header T-record contains 49 in its Data Group Number field 310, indicating that it is the data group header T-record for data group 49. Spill file 93b is also closed. The queue handler again takes T-records off the queue, but now sends the T-records directly to the receiving site.

FIG. 17F shows the transmission of data group 47, at 7:45. The queue handler 92 was able to send T-records from the queue to the receiving site faster than the queue was being filled, so at 7:45, data group 49 was closed, and data group 47 was sent to the receiving site when the queue became less full than the queue low threshold, LT. Although data group 49 was closed at 7:45, the ending timestamp of data group 49 is 7:44, since the last T-record from that data group was created at 7:44, and no T-records were created in the time between 7:45 and the closing of group 49. The queue handler at this point is in state 4. In state 4, no new data groups are created, even after closing the last group, 49. This state will continue until all spill files are sent or the queue fills past the high threshold. Since a header T-record for data group 47 is sent before any data from the spill file 93*a*, the receiving site was able to update the RCF with timestamps for data group 47.

FIG. 17G shows the transmission of data group 48, at 7:46. No data is being removed from the queue, so it is getting fuller, but still is less than the queue high threshold. A header record for data group 48 is sent before any T-records from the spill file 93*b*. The queue handler at this point is in state 4. This state will continue until spill file 48 is sent or the queue fills past the queue high threshold.

Figure 17H:
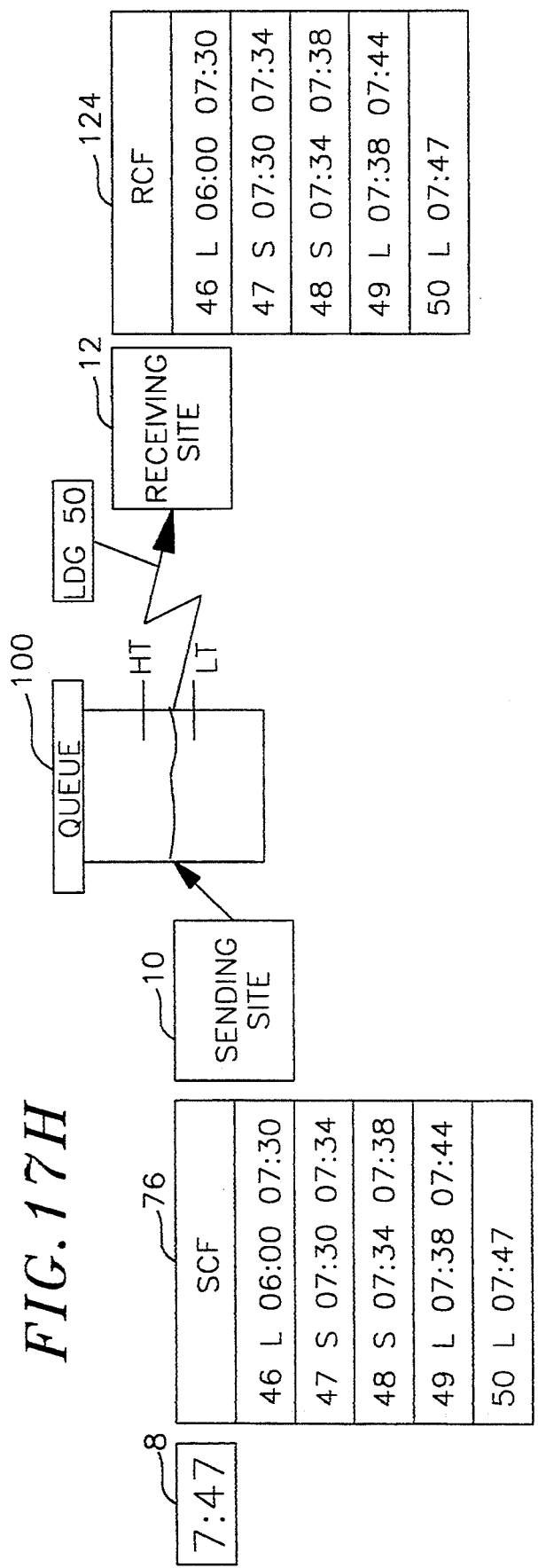

FIG. 17H shows the return to the normal state, state 1, at 7:47. After spill file 93*a* was completely sent, data group 50 was created, and a data group record was added to the SCF indicating that the group started at 7:47, and that the data is live data. A header T-record is sent to the receiving site, allowing the RCF to be updated. The queue handler will remain in state 1 until communications break again, the queue fills past the queue high threshold, or E-NET1 is shut down.

In the present example, data group numbers changed as each spill file was created. If E-NET1 at the sending site kept the data flowing to receiving site in order, the data group number could stay the same, since the continuity of data would not be in question. The advantages to having the data groups change is that once the link has been re-established, the live data can be sent ahead of the spill files. An alternate embodiment may use the same data group number for live data and continuous spill file data.

G. E-NET1 SHUTDOWN

E-NET1 shutdown at the sending site is accomplished by the operator using console 44 to send one of two commands, Shutdown and Quick Shutdown, to E1MAIN 94. Shutdown performs the same function as Quick Shutdown, but does not stop E-NET1 until all outstanding gaps have been recovered and all spill files have been sent to the remote site 12. E1MAIN, upon receiving the command, will set the ECVT flag, ECVTSHUT. The exit routine 80 looks at ECVTSHUT each time an attempt is made to write a T-record to XMS 48 (FIG. 2), and if the flag ECVTSHUT is set, the exit routine 80 does not attempt to write the T-record, but creates a gap data record in the SCF 76. Normally, this should never happen, since the DBMS regions should always be brought down (stopped) before E-NET1 is shut down.

E1MAIN (FIG. 3) also informs each of the attached processes: E1DEQU, E1TRAN, and E1WARN, that E-NET1 is shutting down. E1MAIN does this by setting the SCOMSHUT flag (Shutdown pending flag) in the SCOM block or the SCOMSHTQ flag (Quick Shutdown pending).

If a normal Shutdown is done, E1DEQU will first close all open SCF records, then send the remaining T-records from the queue 100 and spill files 93 to the VTAM buffers. Gap recovery jobs will be submitted for all unrecovered gap data groups, and new spill files may get created. The queue 100 will not get any more new T-records, since E1QPOR will not accept any more T-records if SCOMSHUT is set. E1QPOR will not even be called, since the exit routine 80 can tell from the ECVTSHUT flag that E-NET1 is in the process of shutting down. E1DEQU will not terminate until all spill files 93 and the queue 100 are moved to VTAM buffers and E1TRAN has terminated.

E1TRAN will continue sending VTAM buffers until all buffers have been sent and confirmed. Once all buffers are sent, E1TRAN will set the SCOM flag, SCOMTRSH (E1TRAN SHUTDOWN/SHUTQWIK DONE flag). E1TRAN will wait for E1DEQU, to see if E1DEQU will be sending any more T-records. When E1DEQU finishes sending all of the T-records in spill files 93 and the queue 100, and sees that the SCOMTRSH flag is set, E1DEQU will terminate E1TRAN and set the SCOMDQSH flag (E1DEQU SHUTDOWN/SHUTQWIK DONE flag), and wait to be terminated by E1MAIN. E1MAIN, after setting the SCOMSHUT flag, will wait for the SCOMDQSH flag to be set by E1DEQU, and when set will terminate E1DEQU, and then terminate E1QPOR, which doesn't do anything during shutdown. At this point, an operator, if desired, would issue the Terminate command at operator console 44, which would cause the termination of E1MAIN, E1WARN, and E1TIMR.

After a normal shutdown, the remote site has the latest log data, up to the moment of the Shutdown command being issued, which should be after the last DBMS was stopped. While this is an ideal situation, a normal shutdown will never complete if inter-site communications are not working. In this case, a Quick Shutdown must be done.

If a Quick Shutdown is done, E1DEQU will close all open SCF records, but will not submit any gap recovery jobs. E1DEQU will create a new spill file and flush the unconfirmed VTAM buffers and any data in the queue to the new spill file. If E1TRAN was not transmitting a spill file, either transmitting from the queue, or just waiting for data, E1TRAN sets the SCOMTRSH flag and waits for E1DEQU to terminate it. If E1TRAN is sending a spill file, the file is completely sent first, then E1TRAN sets the SCOMTRSH flag and waits for termination. E1DEQU, after flushing the buffers and queue, waits for the SCOMTRSH flag to be set, then terminates E1TRAN and sets the SCOMDQSH flag. After setting the SCOMSHTQ flag and waiting for the SCOMDQSH flag to be set, E1MAIN will terminate E1DEQU and E1QPOR.

When E-NET1 is restarted after a Quick Shutdown, any needed gap recovery jobs will be submitted, and the existing spill files will be sent.

H. DATABASE SHADOWING OPERATION

FIG. 18 illustrates an example of database shadowing. Central site mainframe 16 collects the T-records 51 to send off to the remote site mainframe 24, as described previously. The remote site mainframe stores the T-records in E-NET1 format on tapes 61, as discussed previously. In the usual manner of recovery, after a disaster has occurred at the central site, the E-NET1 format tapes 61 would be processed by the recovery program 814 to generate tapes 820. The regenerated tapes 820 can be substituted for tapes 39, in the case where the tapes 39 were destroyed in the disaster. Tapes 39, or tapes 820, are used as input into the DBMS roll-forward utility 1800, discussed previously. This utility recreates the base data set 72 from the log data that is read from the tapes.

If the delay between a disaster and the recreation of the base data set 72 in the form of dataset 1802, is unacceptable, the dataset 1802 can be kept current by having the data from tapes 61 constantly converted and being input into the DBMS roll-forward utility 1800. Thus, when a disaster did strike, very little time would be needed to restart a DBMS application, since the recreated data set 1802 is always kept up to date, as a ready substitute for base dataset 72.

The method described in FIG. 18 can also be used in the absence of a disaster. If the base dataset 72 is large, and an exact copy of the base dataset 72 is needed at a remote location, where transfer of the entire base dataset 72 many times a day would be impractical, the invention could be used to keep a remote dataset up to date with respect to the base dataset 72 at the central site.

IV. SUMMARY

In summary, one aspect of the present invention is a method of logging a complete series of journal data to a remote site (FIG. 1–70,74), where there may be a gap in the series of data, which would have to be recovered so that the gap can be filled in with the data belonging in the gap. This is done by copying the journal data (FIG. 2–80,48; FIG. 3–48,88,100) as it is being produced by a DBMS; transmitting the copied journal data to the remote site (FIG. 3–92,102,97,64); testing for the occurrence of gaps in the data sent to the remote site (FIG. 3–92; FIGS 6, 7, 10C); and retrieving (FIG. 11–39,606,93) a copy of the data belonging in the gap and transmitting (FIG 3–95,102,97,64) the data to the remote site.

Included in this method, a data group number is assigned to the group of data in the copied data which, in the series, is adjacent to and outside of the gap (Table 6) and a data group number is assigned to the group of data belonging in the gap. These assigned numbers are written to the SCF (FIG. 3–76) which tracks various information relating to each data group.

When the data is transmitted to the remote site, the data is place in a T-record (FIG. 8) format, which contains, among other fields, a field indicating the data group number of the data group to which the transmitted data belongs. When gap data is finally sent to the remote site (FIG. 11; FIG. 3), the gap data group number is likewise sent with the data in the T-record format.

Since gaps are abnormal events, which will not occur in normal operation, extra care is taken when recovering the data for a gap. To ensure that every single block of data belonging in the gap is recovered, the range of the gap, as determined by the values of the timestamps (Table 6) stored in the SCF (FIG. 3–76) for the gap are expanded by the gap interval extender value (Table 8) which may cause the gap to encompass data that is also in other data groups, but will ensure that all copied data is in at least one data group.

Each data group will be delimited by a timestamp, which indicates where the data group ends and the adjacent data group begins. A representation of this timestamp is stored in the SCF.

Each data group has a starting and an ending timestamp (Table 5C). Representations of the timestamps are stored in the SCF.

The timestamps indicating the range of data belonging in a data group are used, among other things, in retrieving missing gap data from tapes (FIG. 11—39,600,606,93) where the data is stored in chronological order.

A unique consecutive number is associated with each data group, and identifies and distinguishes the data group (Table 6).

The unique identifier, the data group number, is transmitted to the remote site along with data (FIG. 8–49) from the data group identified by the data group number (FIG. 8–310), in the T-record (FIG. 8) format.

The copied data is arranged into a series of data blocks, sometimes referred to as T-records (FIG S), and each data group comprises a number of these data blocks. Each data block has a timestamp indicating when the data in the T-record was originally generated (FIG. 8–316). The data group itself also has timestamps (Table 5C, Table 6) which can be used, among other things, to determine if a given block of data belongs in a given data group. This ability is important when retrieving data which is to be associated with a given gap data group.

To ensure that data recovered for a gap data group is entirely recovered, some data which is beyond the time range of the gap is recovered. When the boundaries of the gap data group are discovered (see Table 6), the timestamp for the beginning of the gap is set to a time earlier than the determined boundary of the gap, and the timestamp for the end of the gap is set to a time later than the determined boundary of the gap. The determined boundaries for a gap vary depending on the cause of the gap. For example, for gaps caused by queue overflows, the determined boundary for the beginning of the gap is the timestamp from the first data block which would cause the overflow condition if placed on the queue (FIG. 7–248,244) and the determined boundary for the end of the gap is the time read from the real-time clock (FIG. 1–8) at the time the queue was cleared (FIG 10C–588).

The amount of time by which the beginning and ending timestamps of the gap data group record (Table 5C; Table 6) are changed is known as the gap extender value. This number is a user definable variable whose value is stored in the E-NET1 parameters file and is named GAPINTX (see Table 8, entry number 9).

To limit potential recovery requirements, a checkpoint file (FIG. 3–104) is maintained. This file contains a data group number, a sequence number, and a timestamp all relating to a data block. The checkpoint file relates to a block which was successfully transmitted to the remote site, and for which the remote site was sent a confirmation indicating that the block was received and successfully saved to disk memory at the remote site, and in addition that confirmation has been received for all blocks prior to the block represented in the checkpoint file. The checkpoint file is updated every multiple number of times a confirmation is received, such multiple determined by the value of the variable CKPTINT in the E-NET1 parameters file (see Table 8, entry number 15). The checkpoint is used, among other things, to determine how far back in past data must be retrieved to recover the data in a gap data group. Since all data older than the data block pointed to by the checkpoint file is known to have been safely received at the remote site and stored to disk memory, gap recovery need not be done for data blocks older than the checkpoint file. In this way, the amount of data to be recovered for a gap might be reduced.

Although the checkpointed data block can be identified by only the data group number and sequence number, the checkpoint file also contains a timestamp from that data block to assist in gap boundary calculations.

While the gap data could begin to be recovered as soon as the gap is discovered, it is preferred that gap recovery begin only after the end of the gap is determined (FIG. 10A-202; FIG. 10C-590).

Another aspect of the present invention is a method of logging a complete series of data to a remote site (as shown in FIGS. 2 and 3), where such data is created at a central site, and the recovery of momentary gaps in the transmitted data. The improvements embodied by this method include copying the journal data as it is being stored at the central site (FIG. 2-80); testing for a gap in the copied data (FIG. 3-92a; FIGS. 6, 7, 10C); creating a data group identifier for a group of data in the copied data which, in the series is outside of the gap (FIG. 6-228; FIG. 7-244); creating a data group identifier (FIG. 6-228; FIG. 7-244) for the gap; and transmitting to the remote site for logging, a copy of any of the data (FIG 3-92,102,97,64).

Yet another aspect of the present invention is a method for logging at a remote site, for future recovery in the event of a failure at the central site, a copy of a complete series of journal data, the journal data being computed at the central site, from a complete series of transactional data, the method being characterized in that there may be a gap in the copy of the journal data received at the remote site, the method comprising the steps of creating data group numbers to identify each data group, where each gap has its own assigned data group number (see Table 6), and transmitting the data group numbers along with the transferred data blocks for that data group (FIG. 8).

The detection of gaps can be done at the remote site, but the preferred embodiment detects gaps at the central site which creates the data.

Yet another aspect of the invention is the creation of a controls record, or multiple control records, (FIG 3-76; Table 5A, 5B, 5C, 6) for use in gap recovery by forming a copy of a series of data blocks to be transmitted to a remote site, and forming one or more data group records in a sending control file, where a data group record exists for each data group. The data group record contains a data group number (see Table 6) which uniquely identifies the record and uniquely identifies which data group is associated with the record. This method allows for the detection of the presence of a gap in the data and creates one data group record for the data coming before a gap, one record for the data in the gap, and one record for the data coming after the gap.

Each data group record also contains a flag (Table 6) indicating whether the corresponding data group consists of missing gap data or normally copied data.

Each data group record also contains a starting timestamp indicating the point in time which is the start of the data group, and an ending timestamp indicating the extent in time to which the data group extends.

At the point in time when a gap occurs, the latest data group ends, and the next data group, a gap data group, begins.

Prior to being transmitted to the remote site, the copied data is stored in a first-in first-out queue (FIG 3-100). If the queue fills up past a predetermined high threshold level (Table 8, entry number 14), the data in the queue will be moved to a spill file (FIG. 3-93; FIG. 9B; FIG. 10A-514).

When data is moved from the queue to a spill file, a new data group number (FIG. 10A-521,525) is created and assigned to the data in the spill file. Data created just before the data in the spill file belongs in the data group having a number just previous to the data group number of the spill data group, and data created just after the data in the spill file belongs in the data group having a number just after the data group number of the spill data group.

If the central site can transfer data to the remote site and spill files exist at the central site, the data in the queue, in some cases, will be sent a new spill file (FIG. 9C; FIG. 10B-542), while simultaneously the central site will be transferring the data in the other spill files to the remote site (FIG. 9C; FIG. 10B-544).

If the level of data in the queue falls below a predetermined low threshold (Table 8, entry number 13), the central site will cease moving data from the queue to a spill file, and transmit the data from the spill files to the remote site without creating any new spill files (FIG. 9D; FIG. 10A-512; FIG. 10B-550,552).

The data transferred to the remote site is temporarily stored in communication buffers (FIG. 3-102).

Yet another aspect of the present invention is a method for recreating the original data from journal data stored on readable tapes (FIG. 14-61) at the remote site without using the database which was the source of the original data. This is accomplished by reformatting the data from tapes at the remote site into a form usable by a roll-forward recovery utility program (FIG. 14-814,816,818; FIG. 15-1504); detecting duplications in the data on the tapes (FIG. 14-850; FIG. 15-1528,1528); removing any duplications detected in the data on the tapes (see FIG. 15); recording the data to other tapes (FIG. 14-820) without the duplications; and processing the newly recorded data with a roll-forward recovery utility program (FIG. 18-1800) to recreate a copy of the original data (FIG. 18-1802).

TABLE 1A

PRIOR ART
[TABLE 1A -] Base Dataset 72 (current as of 07/20/89)

| Account No. | Credit Limit | Balance | Interest Rate |
|---|---|---|---|
| ... | | | |
| 01-6054 | $500 | $12.50 | 5.5% |
| 01-6055 | $0 | $45.67 | 5.5% |
| —> 01-6056 | $6,000 | $645.00 | 6.3% <— |
| 01-6057 | $9,500 | $789.34 | 6.3% |
| ... | | | |

TABLE 1B

PRIOR ART
[TABLE 1B-] Base Dataset 72 (as backed up on 07/01/89)

| Account No. | Credit Limit | Balance | Interest Rate |
|---|---|---|---|
| ... | | | |
| 01-6054 | $700 | $300.50 | 6.0% |
| 01-6055 | $0 | $85.67 | 5.5% |
| —> 01-6056 | $1,000 | $100.00 | 8.0% <— |
| 01-6057 | $4,500 | $405.25 | 6.0% |
| ... | | | |

TABLE 1C

PRIOR ART
[TABLE 1C -] Change Log Dataset (for the period 07/01/89 to 07/20/89)

| Line # | Change Time | Account No. | Changed Field | Value Change |
|---|---|---|---|---|
| 1 | 07/03/89 04:04 | 01-6056 | Credit Limit | +$1,500.00 |
| 2 | 07/03/89 05:05 | 01-6055 | Interest Rate | −0.5% |
| 3 | 07/03/89 09:09 | 01-6056 | Balance | −$40.00 |
| 4 | 07/05/89 10:13 | 01-6056 | Interest Rate | −0.2% |
| 5 | 07/05/89 12:44 | 01-6054 | Balance | −$41.00 |
| 6 | 07/06/89 06:10 | 01-6056 | Credit Limit | +$2,000.00 |
| 7 | 07/06/89 13:57 | 01-6056 | Balance | +$45.00 |
| 8 | 07/06/89 22:04 | 01-6056 | Interest Rate | −1.2% |
| 9 | 07/07/89 13:23 | 01-6056 | Credit Limit | −$1,000.00 |
| 10 | 07/07/89 23:01 | 01-6057 | Credit Limit | −$450.00 |
| 11 | 07/10/89 05:34 | 01-6054 | Balance | +$20.00 |
| 12 | 07/10/89 06:48 | 01-6055 | Credit Limit | +$2,000.00 |
| 13 | 07/10/89 07:40 | 01-6056 | Balance | +$100.00 |
| 14 | 07/10/89 09:17 | 01-6055 | Balance | +$40.00 |
| 15 | 07/10/89 11:20 | 01-6056 | Balance | +$160.00 |
| 16 | 07/12/89 10:00 | 01-6056 | Credit Limit | +$2,500.00 |
| 17 | 07/14/89 10:04 | 01-6056 | Balance | +$210.00 |
| 18 | 07/14/89 14:25 | 01-6054 | Balance | +$60.00 |
| 19 | 07/14/89 15:33 | 01-6056 | Interest Rate | −0.3% |
| 20 | 07/14/89 16:40 | 01-6055 | Interest Rate | −0.2% |
| 21 | 07/17/89 11:20 | 01-6056 | Balance | −$70.00 |
| 22 | 07/17/89 16:40 | 01-6056 | Balance | +$210.00 |
| 23 | 07/17/89 18:20 | 01-6057 | Balance | −$10.00 |
| 24 | 07/17/89 21:07 | 01-6054 | Balance | +$410.00 |
| 25 | 07/18/89 04:56 | 01-6056 | Balance | +$730.00 |
| 26 | 07/19/89 11:10 | 01-6056 | Balance | −$500.00 |
| 27 | 07/19/89 12:01 | 01-6056 | Balance | −$300.00 |
| 28 | 07/19/89 18:06 | 01-6057 | Balance | −$30.00 |

TABLE 2A

PRIOR ART
[TABLE 2A -] Recreating the Current Balance from Prior Balance and All Applicable Change Log Records:

| Change Time Prior Value | Change | Balance as of Change Time $100.00 Prior Value | Change Log Line # |
|---|---|---|---|
| 07/03/89 09:09 | −$40.00 | 60.00 | 3 |
| 07/06/89 13:57 | +$45.00 | 105.00 | 7 |
| 07/10/89 07:40 | +$100.00 | 205.00 | 13 |
| 07/10/89 11:20 | +$160.00 | 365.00 | 15 |
| 07/14/89 10:04 | +$210.00 | 575.00 | 17 |
| 07/17/89 11:20 | −$70.00 | 505.00 | 21 |
| 07/17/89 16:40 | +$210.00 | 715.00 | 22 |
| 07/18/89 04:56 | +$730.00 | 1445.00 | 25 |
| 07/19/89 11:10 | −$500.00 | 945.00 | 26 |
| 07/19/89 12:01 | −$300.00 | 645.00 | 27 |
| Recreated Current Value | $645.00 | | |

TABLE 2B

PRIOR ART
[TABLE 2B -] Attempted Recreation of the Current Balance from Prior Balance with Change Log Records Missing:

| Change Time | Change | Balance as of Change Time | Correct Balance | Amount of Error |
|---|---|---|---|---|
| Prior Value | | $100.00 | $100.00 | $0.00 |
| 07/03/89 09:09 | $−40.00 | 60.00 | 60.00 | 0.00 |
| 07/06/89 13:57 | +45.00 | 105.00 | 105.00 | 0.00 |
| 07/10/89 07:40 | +100.00 | 205.00 | 205.00 | 0.00 |
| 07/10/89 11:20 | +160.00 | 365.00 | 365.00 | 0.00 |
| (missing record) | | | 575.00 | 210.00 |
| 07/17/89 11:20 | −70.00 | 295.00 | 505.00 | 210.00 |
| 07/17/89 16:40 | +210.00 | 505.00 | 715.00 | 210.00 |
| 07/18/89 04:56 | +730.00 | 1235.00 | 1445.00 | 210.00 |
| 07/19/89 11:10 | −500.00 | 735.00 | 945.00 | 210.00 |
| 07/19/89 12:01 | −300.00 | 435.00 | 645.00 | 210.00 |

TABLE 3

DCF 78 DATA STRUCTURE

| Field Name | Byte Length | Format |
|---|---|---|
| TABLE 3A: ARCHIVED DATA RECORD FORMAT | | |
| KEY Log/Journal # (IDs the file) | 2 | halfword |
| Starting Date | 4 | fullword |
| Starting Time | 4 | fullword |
| DATA Control Flags | 1 | 8 bit flags |
| 10000000 - data set has been catalogued | | |
| 01000000 - data set resides on tape | | |
| 00100000 - data set resides on disk | | |
| 00000100 - gap recovery is awaiting archive | | |
| 00000010 - archive journal flag (?) | | |
| 00000001 - primary journal flag (?) | | |
| Label Type | 3 | hex |
| Tape File Sequence # | 2 | halfword |
| Tape Density | 1 | hex |
| Record Format | 4 | char |
| Logical Record Length | 2 | halfword |
| Block Size | 2 | halfword |
| Dataset Name | 44 | char |
| Volume Serial Count | 1 | binary number |
| First 5 volume names | 30 | char |
| Unit type | 8 | char |
| Expiration Date | 6 | char julian date |
| Additional Data Fields | | |
| (IDMS only) IDMS Journal Name | 16 | char |
| (CICS only) CICS Startup Time | 4 | fullword |
| (CICS only) CICS Volume Seq # (1 or 2) | 4 | fullword |
| TABLE 3B: DCF CONTROL RECORD FORMAT | | |
| KEY Log/Journal # (IDs the file) | 2 | halfword |
| Starting Date | 4 | fullword |
| Starting Time | 4 | fullword |
| DATA Last Key Archived | 10 | char |
| "Jobstep 2 has run" flag | 1 | byte |
| 10000000 - Jobstep 2 ran | | |
| # of Jrnl Offloads Pending | 2 | halfword |
| Entries to be Offloaded | 160 | char |

TABLE 4A

E-NET COMMUNICATIONS VECTOR (ECVT) TABLE 41

| Variable Name | Range of Values | Meaning |
|---|---|---|
| ECVTACTV | SET, RESET | SET => E-NET is active |
| ECVTINIT | SET, RESET | SET => E-NET is initializing |
| ECVTSHUT | SET, RESET | SET => E-NET queue is closed; E-NET is shutdown or in process of shutting down |
| ECVTPCN0 | XMS pointer | pointer to enqueuer (88) in XMS table |

TABLE 4B

E-NET SYSTEM COMMUNICATIONS (SCOM) TABLE 98

| Variable Name | Range of Values | Meaning |
|---|---|---|
| SCOMQMTY | SET, RESET | SET => Queue (100) is presently empty |
| SCOMQFUL | SET, RESET | SET => Queue (100) presently full |
| SCOMSHUT | SET, RESET | SET => SHUTDOWN IS PENDING |
| SCOMQRST | SET, RESET | SET => QUEUE RECORD STAGED |
| SCOMSTOP | SET, RESET | SET => STOPTRAN IS PENDING |
| SCOMTRNR | SET, RESET | SET => E1TRAN IS INITIALIZED |
| SCOMABTR | SET, RESET | SET => ABORTTRAN IS PENDING |
| SCOMTRNA | SET, RESET | SET => E1TRAN IS ACTIVE |
| SCOMDOWN | SET, RESET | SET => SHUTDOWN IS COMPLETE |
| SCOMQWMO | SET, RESET | SET => QUEUE WARNING MSG OUTSTANDING |

TABLE 4B-continued

E-NET SYSTEM COMMUNICATIONS (SCOM) TABLE 98

| Variable Name | Range of Values | Meaning |
|---|---|---|
| SCOMQWMN | SET, RESET | SET => QUEUE WARNING MSG NEEDED |
| SCOMQWTR | SET, RESET | SET => E1WARN SHOULD TERMINATE |
| SCOMSDT | SET, RESET | SET => VTAM SESSION OPERATIONAL |
| SCOMTRLS | SET, RESET | SET => VTAM TRAILER SENT |
| SCOMCLQU | SET, RESET | SET => CLEAR QUEUE FLAG ON |
| SCOMTRSH | SET, RESET | SET => E1TRAN SHUTDOWN/SHUTQWIK DONE |
| SCOMDQSH | SET, RESET | SET => E1DEQU SHUTDOWN/SHUTQWIK DONE |
| SCOMSPRD | SET, RESET | SET => SPILL FILES READY FOR TRANSMISSION |
| SCOMSHTQ | SET, RESET | SET => SHUTQWIK IS PENDING |
| SCOMGRIP | SET, RESET | SET => GAP RECOVERY IS IN PROGRESS |
| SCOMHDRS | SET, RESET | SET => HEADER HAS BEEN SENT |
| SCOMSACT | SET, RESET | SET => SPILL READER ACTIVE |

TABLE 5
SCF 76 DATA STRUCTURE

| | Field Name | Byte Length | Format |
|---|---|---|---|
| | TABLE 5A - SCF CONTROL RECORD STRUCTURE | | |
| KEY | Data Group # | 4 | fullword (set to 0) |
| | DBMS ID | 8 | char (set to hex 0s) |
| DATA | Control Flags<br>10000000 - This data set is bad<br>01000000 - The other data set is bad | 1 | 8 bit flags |
| | TABLE 5B - DBMS CONTROL RECORD STRUCTURE | | |
| KEY | Data Group # | 4 | fullword (set to 0) |
| | DBMS ID | 8 | char |
| DATA | DBMS Type<br>"C" - DBMS is CICS<br>"D" - DBMS is IMS<br>"I" - DBMS is IDMS | 1 | char |
| | Starting Timestamp | 8 | MVS timestamp |
| | Ending Timestamp | 8 | MVS timestamp |
| | Status<br>10000000 - successful transmission<br>01000000 - data group is live data<br>00100000 - data group is spill data<br>00010000 - data group is gap data<br>00001000 - gap established<br>00000100 - gap recovery submitted to E1GRJCL1<br>00000010 - gap recovery complete<br>00000001 - (unused) | 1 | 8 bit flags |
| | Spill File name | 44 | char |
| | Second DCF (?) | 44 | char |
| | IMS message ID (?) | 8 | char |
| | Selective Journal Exit Name | 8 | char |
| | TABLE 5C - DATA GROUP RECORD STRUCTURE | | |
| KEY | Data Group # | 4 | fullword |
| | DBMS ID | 8 | char (0's unless gap data) |
| DATA | DBMS Type<br>"C" - DBMS is CICS<br>"D" - DBMS is IMS<br>"I" - DBMS is IDMS | 1 | char |
| | Starting Timestamp | 8 | MVS timestamp |
| | Ending Timestamp | 8 | MVS timestamp |
| | Status<br>10000000 - successful transmission<br>01000000 - data group is live data<br>00100000 - data group is spill data<br>00010000 - data group is gap data<br>00001000 - gap established<br>00000100 - gap recovery submitted to E1GRJCL1<br>00000010 - gap recovery complete<br>00000001 - (unused) | 1 | 8 bit flags |
| | Spill File name | 44 | char |

TABLE 6
EXAMPLE SCF 76 CONTENTS

| | KEYS | | DATA | | | |
|---|---|---|---|---|---|---|
| | DG # | DBMS ID | DG TYPE | STARTING TIMESTAMP | ENDING TIMESTAMP | STATUS |
| #1 | 0 | 0 | | (control info about SCF) | | |
| #2 | 0 | I001 | | (control info about tool DBMS) | | |
| #2 | 0 | X002 | | (control info about X002 DBMS) | | |
| #3 | 1 | I001 | GAP | 8:00 | 8:05 | awaiting recovery |
| #3 | 2 | 0000 | LIVE | 8:05 | 8:10 | transmitted to VTAM |
| #3 | 3 | 0000 | SPILL | 8:10 | 8:15 | transmitted to VTAM |
| #3 | 4 | 0000 | SPILL | 8:15 | 8:20 | |
| #3 | 5 | I001 | GAP | 8:20 | 8:23 | |
| #3 | 6 | X001 | GAP | 8:21 | 8:23 | |

1 = SCF Control Record (Table 5A)
2 = DBMS Control Records (Table 5B)
3 = Data Group Records (Table 5C)

| | | |
|---|---|---|
| Data Cluster VSI Length | 2 | halfword |
| Data Cluster VSI Level # | 4 | fullword |
| Index cluster VSI start | 66 | char |
| Key of last IDMS record archived | 10 | char |
| Reserved for SHARE opt. 3.3 | 70 | char |

TABLE 7
DBMS parameter file 77 for CICS

Field Name

E-NET sending region ID - indicates which E-NET region to use
DBMS ID code - ID for a particular DBMS

TABLE 8
Example E-NET Parameters File 87

| VARIABLES, VALUES | DESCRIPTION |
|---|---|
| LOGONID = ENETTRNT | VTAM LOGON ID FOR SENDING REGION |

TABLE 8-continued

Example E-NET Parameters File 87

| VARIABLES, VALUES | DESCRIPTION |
|---|---|
| DESTNID = ENETTRNR | VTAM DESTID FOR RECEIVING REGION |
| ENETSID = ENT1 | SUB-SYSTEM NAME FOR SENDING REGION |
| BYTESEC-32760 | ESTIMATED BYTES/SECOND LOGGED BY DBMS |
| CUSTHID = ENET1-DEFAULT-ID | USER NAME FOR HEADER RECORD |
| CUSCODE = EC | CUSTOMER CODE FOR DATA IDENTIFICATION |
| BUFSIZE = 40828 | BUFFER SIZE IN BYTES |
| BUFFNUM = 10 | NUMBER OF BUFFERS |
| GAPINTX = 10 | GAP INTERVAL EXTENDER IN 1/10 SECS |
| NETSIZE = 0 | VTAM RU SIZE IN BYTES |
| QUESIZE = 4096 | QUEUE SIZE IN KBYTES |
| QUEWARN = 80 | QUEUE WARNING PERCENTAGE |
| QUETHHI = 60 | HIGH THRESHOLD PERCENTAGE |
| QUETHLO = 10 | LOW THRESHOLD PERCENTAGE |
| CKPTINT = 1000 | CHECKPOINT INTERVAL |
| TIMRINT = 300 | TIMER INTERVAL IN SECONDS |
| SPILLPF = ENET.ENT1.SPILL | SPILL DATASET NAME PREFIX |
| SPVOL01 = VOL001 | SPILL ALLOCATION VOLUME SERIAL NO. |
| SPVOL02 = VOL002 | SPILL ALLOCATION VOLUME SERIAL NO. |
| SPVOL03 = VOL003 | SPILL ALLOCATION VOLUME SERIAL No. |
| SPVOL04 = VOL004 | SPILL ALLOCATION VOLUME SERIAL NO. |
| SPVOL05 = VOL005 | SPILL ALLOCATION VOLUME SERIAL NO. |

TABLE 9

RCF 124 DATA STRUCTURE

| | Field Name | Byte Length | Format |
|---|---|---|---|
| KEY | Starting Data Group # | 4 | fullword |
| | Starting Sequence # | 4 | fullword |
| DATA | Ending Data Group # | 4 | fullword |
| | Ending Sequence # | 4 | fullword |
| | Starting Timestamp | 8 | MVS timestamp |
| | Ending Timestamp | 8 | MVS timestamp |
| | Dataset Name | 44 | char |
| | Unit Type | 8 | char |
| | Volume Serial Number | 6 | char |
| | File Sequence Number | 2 | halfword |

TABLE 10

Example RCF 124 DATA

| KEYS | | | | DATA | | | | |
|---|---|---|---|---|---|---|---|---|
| START | | END | | TIMESTAMP | | DATASET | VOL | FILE |
| DG | SEQ # | DG | SEQ # | STARTING | ENDING | NAME | SER # | SEQ # |
| 1 | 1 | 1 | 1299 | 8:00 | 9:00 | DATA001 | 110 | 002 |
| 1 | 1300 | 1 | 1503 | 9:01 | 9:35 | DATA002 | 117 | 001 |
| 2 | 1 | 2 | 306 | 9:36 | 9:43 | DATA003 | 234 | 001 |

TABLE 11

Example User Parameters File 806

| VARIABLES, VALUES | DESCRIPTION |
|---|---|
| DBMSORG = C001 | IDENTIFIES DATA SOURCE AS A CICS REGION |
| ENETSID = ENT1 | |
| SUBMJCL = Y | ELEXT? JOBS SHOULD BE SUBMITTED |
| STARTDT = yyddd | |
| STARTIM = hhmmssth | |
| ENDDATE = yyddd | |
| ENDTIME = hhmnssth | |
| MODLJCL = xxxxxxxx | |

TABLE 12

DCF 78, SCF 76, and RCF 124 CONTROL RECORD STRUCTURE

| | Field Name | Byte Length | Format |
|---|---|---|---|
| KEY | Log/Journal # (IDs the file) | 2 | halfword |
| | Starting Date | 4 | fullword |
| | Starting Time | 4 | fullword |
| DATA | Control Flags | 1 | 8 bit flags |
| | 10000000 - This data set is bad | | |
| | 01000000 - Other data set is bad | | |
| | Data Cluster VSI Length | 2 | halfword |
| | Data Cluster VSI Level # | 4 | fullword |
| | Index cluster VSI start | 66 | char |
| | Key of last IDMS record archived | 10 | char |
| | Reserved for SHARE opt. 3.3 | 70 | char |

What is claimed is:

1. A method of logging a complete series of journal data, which is sequentially created and is stored in a computing machine system at a central site, to a remote site, the method being characterized in that there may be a gap in the series of data, created at the central site, that is being received at the remote site, the method comprising the steps of:
   a) copying the journal data being stored at the central site;
   b) transmitting the copied journal data to the remote site;
   c) detecting a gap in the complete series of journal data that is in the copied journal data transmitted to the remote site; and
   d) identifying groups of data (data groups) in the series of journal data being transmitted at the remote site and creating an ending timestamp for each data group indicating an ending of the corresponding data group.

2. A method of logging a complete series of journal data, which is sequentially created and is stored in a computing machine system at a central site, to a remote site, the method being characterized in that there may be a gap in the series of data, created at the central site, that is being received at the remote site, the method comprising the steps of:
   a) copying the journal data being stored at the central site;
   b) transmitting the copied journal data to the remote site;
   c) detecting a gap in the complete series of journal data that is in the copied journal data transmitted to the remote site; and
   d) creating an ending timestamp for the gap in the copied journal data indicating, in the series of journal data, an ending time for the gap in the series of journal data.

3. A method of logging a complete series of journal data, which is sequentially created and is stored in a computing machine system at a central site, to a remote site, the method being characterized in that there may be a gap in the series of data, created at the central site, that is being received at the remote site, the method comprising the steps of:
   a) copying the journal data being stored at the central site;
   b) transmitting the copied journal data to the remote site;
   c) detecting a gap in the complete series of journal data that is in the copied journal data transmitted to the remote site; and
   d) identifying groups of data (data groups) in the series of journal data being transmitted at the remote site and creating a beginning timestamp indicating a beginning of the corresponding data group and an ending timestamp for each data group indicating an ending of the corresponding data group.

4. A method of logging a complete series of journal data, which is sequentially created and is stored in a computing machine system at a central site, to a remote site, the method being characterized in that there may be a gap in the series of data, created at the central site, that is being received at the remote site, the method comprising the steps of:
   a) copying the journal data being stored at the central site;
   b) transmitting the copied journal data to the remote site;
   c) detecting a gap in the complete series of journal data that is in the copied journal data transmitted to the remote site; and
   d) creating a beginning and an ending timestamp for the gap in the copied journal data indicating, in the series of journal data, a beginning and ending time for the gap in the series of journal data.

5. A method of logging a complete series of journal data, which is sequentially created and is stored in a computing machine system at a central site, to a remote site, the method being characterized in that there may be a gap in the series of data, created at the central site, that is being received at the remote site, the method comprising the steps of:
   a) copying the journal data being stored at the central site;
   b) transmitting the copied journal data to the remote site;
   c) detecting a gap in the complete series of journal data that is in the copied journal data transmitted to the remote site;
   d) identifying data groups in the series of journal data being transmitted to the remote site and creating for each said data group and each said gap a different one of a sequence of incrementally valued data group numbers;
   e) arranging the series of journal data created at the central site into a series of data blocks occurring in a sequence in time and each such data group comprises a plurality of such data blocks;
   f) creating a beginning and an ending timestamp indicating a beginning boundary and an ending boundary of the data blocks in each such data group and in each such gap, which are adjacent in the series;
   g) retrieving, from the complete series of journal data at the central site, a copy of any of the journal data which goes in such gap upon detecting such gap; and
   h) transmitting the copy of the journal data which goes in such gap to the remote site.

6. The method of claim 5 wherein the step of creating the timestamps for the gap comprises the step of extending the time for each boundary by a gap extender value to thereby form the timestamps.

7. A method of logging a complete series of journal data, which is sequentially created and is stored in a computing machine system at a central site, to a remote site, the method being characterized in that there may be a gap in the series of data, created at the central site, that is being received at the remote site, the method comprising the steps of:
   a) copying the journal data being stored at the central site;
   b) transmitting the copied journal data to the remote site;
   c) detecting a gap in the complete series of journal data that is in the copied journal data transmitted to the remote site;
   d) creating at least one data group identifier for a group of journal data (data group) in the copied journal data which, in the series, is adjacent to and outside of the gap;
   e) creating a data group identifier (gap data group identifier) for a group of the journal data that is in the gap;
   f) storing in a check point file an indication of time, in the series of journal data created at the central site, for any of such data groups;
   g) using the indication of time stored in the check point file to create a time of occurrence indication (data group time of occurrence indication) for said data group and a time of occurrence indication for said gap (gap time of occurrence indication);
   h) retrieving, from the complete series of journal data at the central site, a copy of any of the journal data which goes in such gap upon detecting such gap; and
   i) transmitting the copy of the journal data which goes in such gap to the remote site.

8. The method of claim 7 wherein the series of journal data created at the central site is arranged into a series of data blocks and each of the data groups comprises a plurality of the data blocks, the method comprising the steps of creating a sequence of incrementally valued data block identifiers, a different one of such data block identifiers for each of individual ones of the data blocks and comprising the step of storing, as the indication of time in the check point file, a timestamp indicating the time of the data blocks in the series of journal data created at the central site.

9. The method of claim 8 comprising the step of forming an indication confirming that such last one of the data blocks has at least been received at the remote site and the step of storing in the checkpoint file is performed in response to such confirmation.

10. The method of claim 9 wherein the step of forming an indication comprises the step of confirming that such last one of the data blocks has been safely and completely stored at the remote site.

11. A method for creating a control record for future machine recovery of gaps in a copy of a complete series of journal data formed sequentially in time by a computing machine from a complete series of transactional data and transmitted to a remote site, the method comprising the steps of:
 a) forming a plurality of data group records, at least one such data group record being formed for each of a plurality of different data groups in the series of journal data;
 b) detecting the presence of a gap in the copy of the journal data that has been transmitted to the remote site;
 c) creating one said data group record for a boundary of each such gap; and
 d) forming an ending timestamp in one of said data group records indicative of the end of the corresponding data group conditioned upon the presence of a gap being detected following such data group.

12. The method of claim 11 comprising the step of creating another said data group record for the gap upon the detection of such gap.

13. A method for creating a control record for future machine recovery of gaps in a copy of a complete series of journal data formed sequentially in time by a computing machine from a complete series of transactional data and transmitted to a remote site, the method comprising the steps of:
 a) forming a plurality of data group records, at least one such data group record being formed for each of a plurality of different data groups in the series of journal data;
 b) detecting the presence of a gap in the copy of the journal data that has been transmitted to the remote site;
 c) creating one said data group record for a boundary of each such gap; and
 d) creating an ending timestamp in the data group record for the series of journal data which indicates a time preceding any such gap and creating a beginning timestamp, in the data group record for the gap, which indicates a time for the starting of the corresponding gap in the series of journal data.

14. A method for creating a control record for future machine recovery of gaps in a copy of a complete series of journal data formed sequentially in time by a computing machine from a complete series of transactional data and transmitted to a remote site, the method comprising the steps of:
 a) forming a plurality of data group records, at least one such data group record being formed for each of a plurality of different data groups in the series of journal data;
 b) forming a timestamp in each said data group record indicative of a time in the sequence of journal data for the corresponding data group;
 c) detecting the presence of a gap in the copy of the journal data that has been transmitted to the remote site;
 d) creating one said data group record for a boundary of each such gap; and
 e) forming an ending timestamp, for each data group record in such gap, which indicates a time that is outside of the time for the gap in the series of journal data to insure that upon such future machine recovery all data in each such gap is recovered.

15. A method for creating a control record for future machine recovery of gaps in a copy of a complete series of journal data formed sequentially in time by a computing machine from a complete series of transactional data and transmitted to a remote site, the method comprising the steps of:
 a) forming a plurality of data group records, at least one such data group record being formed for each of a plurality of different data groups in the series of journal data;
 b) forming a timestamp in each said data group record indicative of a time in the sequence of journal data for the corresponding data group;
 c) detecting the presence of a gap in the copy of the journal data that has been transmitted to the remote site;
 d) creating one said data group record for a boundary of each such gap; and
 e) forming a timestamp for a beginning and an ending of the corresponding data group, for each data group record in such gap, which indicates a time that is outside of the time for the gap in the series of journal data to insure that upon such future machine recovery all data in each such gap is recovered.

16. The method of claim 14 or 15 wherein the step of creating a timestamp comprises the step of modifying a value representing the time of a boundary of the gap by a gap extender value.

17. A method of logging a complete series of journal data, which is sequentially created in time and is stored in a computing machine system at a central site, to a remote site, the method being characterized in that there may be a gap in the series of data, created at the central site, that is being received at the remote site, the method comprising the steps of:
 a) copying the journal data being stored at the central site into a series of data group records, each data group record comprising the complete series of journal data created during a time interval;
 b) the step of copying comprising the step of marking a boundary of the series of journal data in each data group record with a data group identifier, which identifies a boundary of such series of journal data, once said data group record contains the complete series of journal data for the corresponding time interval;
 c) detecting a condition occurring in the computing system, at the central site, pursuant to which there may be a gap in the complete series of journal data being copied and sent to the remote site;
 d) upon detecting the condition pursuant to which there may be such a gap, creating a gap said data group record with said data group identifier, the step of creating the gap data group record comprising the step of retrieving for the gap data group record from the complete series of journal data formed at the central site, a copy of all of the series of journal data created at the central site during a gap time interval extending at least between the time the condition is detected and the time for the end of the series of journal data in the preceding data group record for which there is one of said data group identifiers for a complete series of journal data; and e) transmitting each said data group record and said gap data group record to the remote site.

18. The method of claim 17 wherein the step of marking each data group record with a data group identifier comprises the step of marking each data group record with an ending timestamp for the last journal data in the corresponding data group record.

19. The method of claim 18 wherein the step of transmitting comprises the step of transmitting each said data group record and said gap data group record over at least one automatic electronic data communication system.

20. The method of claim 19 wherein the step of transmitting comprises the step of transmitting each said data group record and said gap data group record over the same automatic electronic communication system.

21. The method of claim 18 wherein the step of creating the gap data group record comprises the step of creating the gap data group record with said journal data (data group) in the copied journal data which, in the series, is adjacent to and outside of the gap time interval.

22. The method of claim 21 wherein the step of transmitting comprises the step of transmitting to the remote site a representation of each of said data group identifiers, including the gap data group identifier.

23. The method of claim 21 comprising the step of creating a time of occurrence indication (data group time of occurrence indication) for said data group record and a time of occurrence indication for said gap data group record (gap time of occurrence indication).

24. The method of claim 23 comprising the step of storing, at the central site, a representation of the data group identifier, the gap data group identifier, the data group time of occurrence indication and the gap time of occurrence indication.

25. The method of claim 24 comprising the step of transmitting a representation of the data group identifier, the gap data group identifier, the data group time of occurrence indication and the gap time of occurrence indication to the remote site.

26. The method of claim 18 wherein the step of retrieving for the gap data group record and transmitting comprises the step of copying and transmitting additional data in the series of journal data which, is in the series of journal data created at the central site and is outside of the time for the data in the gap time interval.

27. The method of claim 17 wherein the step of marking an end of the series of journal data in each data group record with a data group identifier comprises the step of marking each data group record with a beginning timestamp corresponding to the end of the previous data group record.

28. The method of claim 18 wherein the step of retrieving comprises the step of using the timestamp for locating the copy of the data which goes in the gap from the stored journal data.

29. The method of claim 4, comprising the step of creating for each said data group record and gap data group record a different one of a sequence of incrementally valued data group numbers.

30. The method of claim 21 or 29 wherein the series of journal data created at the central site is arranged into a series of data blocks and each of the data groups records comprises a plurality of the data blocks, the method comprising the steps of creating a sequence of incrementally valued data block identifiers, a different one of such data block identifiers for each of individual ones of the data blocks.

31. The method of claim 30 comprising the step of storing representations of the data group records identifiers and the data block identifiers at the central site.

32. The method of claim 30 comprising the step of transmitting a representation of the data group record identifiers and data block identifiers in association with the corresponding data group records and data blocks respectively to the remote site.

33. The method of claim 29 wherein the series of journal data created at the central site is arranged into a series of data blocks occurring in a sequence in time and each such data group records comprises a plurality of such data blocks, the method comprising the step of creating an indication of a boundary in the series of data group records between data group records which are adjacent in the series.

34. The method of claim 33 wherein the step of creating an indication of the boundary comprises the step of creating at least one timestamp indicative of a time for the boundary.

35. The method of claim 34 wherein the step of retrieving and transmitting any of the journal data in a gap occurs after the time during which the gap occurred in the series of journal data and using the at least one timestamp for the step of retrieving the data.

36. The method of claim 17 comprising the steps of;
a) temporarily storing in a buffer, comprising a first-in, first-out queue, a copy of the journal data before it is transmitted to the remote site; and
b) storing the copy of the journal data in sequence in a first-in, first-out order in the queue and transmitting the stored journal data from the queue in such order to the remote site.

37. The method of claim 36 comprising the step of detecting when the amount of journal data stored in the queue is above a threshold level and upon such detection, storing the journal data from the queue into a spill file.

38. The method of claim 37 comprising the step of creating at least one data group record corresponding to the journal data in the spill file.

39. The method of claim 38 comprising the step of transmitting the journal data from the spill file to the remote site along with the corresponding data group record.

40. The method of claim 39 wherein the step of transmitting the journal data from the spill file to the remote site is initiated after the spill file is filled with stored journal data above a threshold level in the spill file.

41. The method of claim 40 comprising the step of storing the journal data from the queue into one said spill file and simultaneously transferring the journal data to the remote site from a second said spill file, filled using the step of storing in a spill file.

42. The method of claim 37 wherein the step of storing journal data in a spill file from the queue is halted upon the amount of the stored journal data in such queue falling below a predetermined level.

43. The method of claim 37 comprising the step of temporarily storing the journal data being transferred to the remote site in a further buffer during such transmission.

44. The method of claim 17 comprising the step of creating the journal data by a plurality of databases running simultaneously at the central site.

45. The method of claim 17 comprising the step of creating the data group identifiers as incrementally ordered sequence numbers from one data group record to another.

46. The method of claim 17 wherein the step of detecting a condition occurring in the computing system comprises the step of testing, upon system start-up, the most recent data group identifier for an indication of a complete series of journal data.

47. The method of claim 17 wherein the step of copying the journal data comprises the step of copying the journal data into a memory at the central site and the step of detecting a condition occurring in the computing system comprises the step of detecting an overflow of the system memory.

48. The method of claim 17 wherein the computing machine system comprises a database program for logging journal data and a discrete computer program for executing the recited steps, and wherein the step of detecting a condition at the central site comprises detecting when journal data has been logged at the central site by the database program during a time interval when the discrete computer program was not initialized to execute the recited steps.

49. A system for logging a complete series of journal data, which is sequentially created in time and stored in a computing machine at a central site, to a remote site, the system being characterized in that there may be a gap in the series of data, created at the central site, that is being received at the remote site, the system comprising:

a) means for copying the journal data as it is being stored at the central site into a series of data group records, each data group record comprising the complete series of journal data created during a time interval;

b) the means for copying a series of data group records comprising means for marking an end of the series of journal data in each data group record with a data group identifier, which identifies a boundary of such series of journal data, once said data group record contains the complete series of journal data for the corresponding time interval;

c) means for detecting a condition occurring in the computing system, at the central site, pursuant to which there may be such a gap in the complete series of journal data being copied and sent to the remote site;

d) means operative, upon detecting the condition pursuant to which there may be such a gap, for creating a gap data group record with said data group identifier, the means for creating the gap data group record comprising means for retrieving for the gap data group record from the complete series of journal data formed at the central site, a copy of all of the series of journal data created at the central site during a gap time interval extending at least between the time the condition is detected and the time for the end of the series of journal data in the preceding data group record for which there is one of said data group identifiers for a complete series of journal data; and e) means for transmitting each data group record and gap data group record to the remote site.

* * * * *

UNITED STATES PATENT AND TRADEMARK OFFICE
CERTIFICATE OF CORRECTION

PATENT NO. : 5,412,801

DATED : May 2, 1995

INVENTOR(S) : James C. de Remer; Thomas D. Childers; James T. Flesher

It is certified that error appears in the above-indentified patent and that said Letters Patent is hereby corrected as shown below:

On the Title Page, Item 56, U.S. PATENT DOCUMENTS, change "4,084,231  11/1978..." to -- 4,084,231  4/1978... --

Item 56, OTHER PUBLICATIONS, change "Geneal" to -- General --.

ABSTRACT, line 9, after "detected" change "of" to -- by --.

In the Drawings, FIG. 16, Sheet 18, delete "FIG. 16 OUTPUT LOGIC" (first occurrence).

Column 1, line 42, change "make" to -- makes --.
Column 3, line 32, after "example" insert -- of --.
Column 5, line 68, change "Associates Computer International, Inc." to -- Computer Associates International, Inc. --.
Column 7, line 38, change "Jul. 7," to -- Jul. 1, --.
Column 10, line 60, before "order" insert -- the --.
Column 10, line 61, after "actions" insert -- are --.
Column 15, line 11, after "Table 6)" delete the period.
Column 20, line 19, change "VTAMcommunications" to -- VTAM communications --.
Column 20, line 43, change "the-creation" to -- the creation --.
Column 21, line 26, after "applicable to" insert -- the --.
Column 24, line 6, change "Lt" to -- LT --.

UNITED STATES PATENT AND TRADEMARK OFFICE
CERTIFICATE OF CORRECTION

PATENT NO. : 5,412,801

DATED : May 2, 1995

INVENTOR(S) : James C. de Remer; Thomas D. Childers; James T. Flesher

It is certified that error appears in the above-indentified patent and that said Letters Patent is hereby corrected as shown below:

```
Column 31, line 22, after "recovery job" delete "is".
Column 32, line 21, after "routines" change "are"
           to -- were --.
Column 34, line 19, before "normal" change "an"
           to -- a --.
Column 35, line 19, change "where" to -- were --.
Column 41, line 11, after "group" delete the comma.
Column 41, line 36, before "receiving" insert -- the --.
Column 42, line 35, before "complete" insert -- be --.
Column 43, line 34, change "FIGS" to -- FIGS. --.
Column 43, line 36, change "FIG" to -- FIG. --.
Column 43, line 46, change "place" to -- placed --.
Column 44, line 14, change "(FIG S)" to -- (FIG. 8) --.
Column 44, line 41, change "(FIG 10C-588)" to
           -- (FIG. 10C-588) --.
Column 45, line 14, after "gaps" insert
           -- is created --.
Column 45, line 24, change "FIG" to -- FIG. --.
Column 45, line 67, change "FIG" to -- FIG. --.
Column 46, lines 38,39, change "FIG. 15-1528,1528
           to -- FIGS. 15-1528,1534 --.
Column 48, line 55, before "presently" insert -- is --.
Column 50, Table 6, line 6, change "tool" to -- I001 --.
```

UNITED STATES PATENT AND TRADEMARK OFFICE
CERTIFICATE OF CORRECTION

PATENT NO. : 5,412,801
DATED : May 2, 1995
INVENTOR(S) : James C. de Remer; Thomas D. Childers; James T. Flesher It is certified that error appears in the above-indentified patent and that said Letters Patent is hereby corrected as shown below:

Column 52, line 40, insert:

TABLE 13 - Example ENETIN File 614

SUMBJCL = Y.

Column 56, line 66, before "data" delete "said".
Column 58, line 1, change "claim 4" to -- claim 18 --.

Signed and Sealed this

Twentieth Day of August, 1996

Attest:

BRUCE LEHMAN

Attesting Officer                Commissioner of Patents and Trademarks